United States Patent
Mandzsu, Sr. et al.

(10) Patent No.: US 12,097,531 B2
(45) Date of Patent: Sep. 24, 2024

(54) ANTISLIP FLEXIBLE MATERIALS AND METHODS FOR THEIR MAKING AND USE

(71) Applicant: FLEXINNOVA KFT, Fot (HU)

(72) Inventors: Jozsef Mandzsu, Sr., Budapest (HU); Zoltan Mandzsu, Budapest (HU); Jozsef Mandzsu, Jr., Fot (HU)

(73) Assignee: FLEXINNOVA KFT, Fot (HU)

( * ) Notice: Subject to any disclaimer, the term of this patent is extended or adjusted under 35 U.S.C. 154(b) by 477 days.

(21) Appl. No.: 17/466,810

(22) Filed: Sep. 3, 2021

(65) Prior Publication Data

US 2022/0055066 A1 Feb. 24, 2022

Related U.S. Application Data

(62) Division of application No. 16/304,587, filed as application No. PCT/HU2017/000029 on Apr. 20, 2017, now Pat. No. 11,529,647.

(30) Foreign Application Priority Data

May 26, 2016 (HU) ...................................... 1600341

(51) Int. Cl.
*B05D 5/08* (2006.01)
*B05D 1/28* (2006.01)
(Continued)

(52) U.S. Cl.
CPC ................ *B05D 5/08* (2013.01); *B05D 1/28* (2013.01); *B29C 59/02* (2013.01); *B32B 5/024* (2013.01);
(Continued)

(58) Field of Classification Search
CPC .......... Y10T 156/1089; B29C 66/7392; B29C 66/73921; A44B 18/0061; A44B 18/0015;
(Continued)

(56) References Cited

U.S. PATENT DOCUMENTS 2,917,223 A 12/1959 Le et al.
3,283,992 A 11/1966 Hanson et al.
(Continued)

FOREIGN PATENT DOCUMENTS

| DE | 3437414 A1 | 4/1986 |
|----|------------|--------|
| DE | 19938828 A1 | 3/2001 |
| HU | 0202948 A2 | 5/2004 |

OTHER PUBLICATIONS

Notice of Allowance and Fees Due (PTOL-85) Mailed on Aug. 17, 2022 for U.S. Appl. No. 16/304,587.
(Continued)

*Primary Examiner* — Carson Gross
(74) *Attorney, Agent, or Firm* — Kaplan Breyer Schwarz, LLP

(57) ABSTRACT

A method for forming an antislip material. A flexible thermoplastic carrier is provided. A hot release surface is provided. Provided is a first layer of discrete thermoplastic particles, sifting on the hot release surface. The discrete particles are above their softening temperatures, providing in the first layer a tackiness. The method includes contacting the carrier with the tacky first layer for sticking the first layer to the carrier, and thereafter removing the carrier, and therewith the tacky first layer stuck to the carrier, from the release surface. Thereby the carrier is provided with a hot, preferably discontinuous and/or elastomeric antislip coating. With a heat energy of the hot coating a bond is formed between the carrier and the coating. The removing of the carrier includes pulling the carrier out of the contact with a pulling-out force. The temperature of the hot release surface is above the melting temperature of the carrier. The carrier would be spoiled, if heated completely to the temperature of the release surface and simultaneously pulled with the pulling-out force. Therefore the contacting time is kept shorter than a minimum time required by a heat of the hot (Continued)

release surface for spoiling the carrier. Flat-topped roughening projections can be included in the antislip coating.

42 Claims, 20 Drawing Sheets

(51) Int. Cl.
| | |
|---|---|
| *B29C 59/02* | (2006.01) |
| *B29C 65/00* | (2006.01) |
| *B32B 5/02* | (2006.01) |
| *B32B 27/08* | (2006.01) |
| *B32B 27/12* | (2006.01) |
| *B32B 27/14* | (2006.01) |
| *B32B 27/32* | (2006.01) |
| *B32B 27/34* | (2006.01) |
| *B65B 5/04* | (2006.01) |
| *B65D 33/00* | (2006.01) |
| *C08J 7/04* | (2020.01) |
| *D06N 3/00* | (2006.01) |
| *D06N 3/04* | (2006.01) |

(52) U.S. Cl.
CPC .............. *B32B 27/08* (2013.01); *B32B 27/12* (2013.01); *B32B 27/14* (2013.01); *B32B 27/32* (2013.01); *B32B 27/34* (2013.01); *B65B 5/045* (2013.01); *B65D 33/005* (2013.01); *C08J 7/0427* (2020.01); *D06N 3/0006* (2013.01); *D06N 3/0038* (2013.01); *D06N 3/045* (2013.01); *B29C 2059/028* (2013.01); *B29C 66/7392* (2013.01); *B29C 66/73921* (2013.01); *B32B 2250/24* (2013.01); *B32B 2255/02* (2013.01); *B32B 2264/0257* (2013.01); *D06N 2201/12* (2013.01); *D06N 2205/10* (2013.01); *D06N 2209/106* (2013.01); *D06N 2211/20* (2013.01)

(58) Field of Classification Search
CPC ......... B65B 43/04; B65B 43/06; B65B 5/045; B65B 5/061; B65B 5/067
See application file for complete search history.

(56) References Cited

U.S. PATENT DOCUMENTS

| | | | |
|---|---|---|---|
| 6,444,080 | B1 | 9/2002 | Mandzsu et al. |
| 6,962,635 | B2 | 11/2005 | Tuman et al. |
| 7,044,989 | B2 | 5/2006 | Welygan et al. |
| 7,314,662 | B2 | 1/2008 | Lefebvre et al. |
| 7,765,774 | B2 | 8/2010 | Mandzsu et al. |
| 2008/0060173 | A1* | 3/2008 | Zhang ................ A44B 18/0011 24/442 |
| 2008/0140043 | A1 | 6/2008 | Mandzsu et al. |
| 2015/0335105 | A1* | 11/2015 | Hertlein ............ A61F 13/15756 24/442 |
| 2019/0299248 | A1 | 10/2019 | Mandzsu et al. |
| 2022/0008954 | A2 | 1/2022 | Mandzsu et al. |

OTHER PUBLICATIONS

Final Rejection Mailed on Apr. 26, 2022 for U.S. Appl. No. 16/304,587.
Authorized Officer: Fageot, Philippe, International Preliminary Report on Patentability issued in PCT application No. PCT/HU2017/000029, Apr. 16, 2018.
Requirement for Restriction/Election Mailed on May 5, 2021 for U.S. Appl. No. 16/304,587.
Non-Final Rejection Mailed on Sep. 10, 2021 for U.S. Appl. No. 16/304,587.

* cited by examiner

ANTISLIP FLEXIBLE MATERIALS AND METHODS FOR THEIR MAKING AND USE

CROSS REFERENCE TO RELATED APPLICATIONS

The present application is a divisional of U.S. patent application Ser. No. 16/304,587, which is a 371 of international application PCT/HU2017/000029, which claims the priority benefit of Hungarian application P1600341, the entire disclosures of which are incorporated herein by reference.

FIELD

On the one hand, a first aspect of the invention relates to methods for using discrete thermoplastic particles heated to a tacky state for making an antislip, preferably roughened coating layer on a surface of a thermoplastic flexible carrier suitable for use, for example, as an antislip flexible packaging material. On the other hand, further aspects of the invention relate to antislip flexible packaging bags or wraps, with an outer surface having roughening projections, and methods for their manufacture and use.

BACKGROUND

Advantages of flexible thermoplastic packaging materials, such as films and woven or nonwoven fabrics, include that bags and wraps made therefrom can be recyclable, they (both films and fabrics) can be heat-shrinkable onto contents for a tight package, they can be formed or fixed or closed with clean and fast heat-binding or fusing or welding etc. They, however, can be too slippery. That can cause stacks of bagged or wrapped goods to lose their shapes, even to fall apart, in transport. That can also cause, for example, a worker walking atop a block of timber, wrapped in plastic timber wrap, to slip and fall especially if there is moisture, snow or ice on it. Non-thermoplastic, for example, kraft paper bags can also be too slippery for some purposes, especially with fine dust contamination. There are possibilities to decrease a slipperiness of a surface of a flexible material. One can provide a non-slippery (for example, elastomeric) substance in the surface providing a high-enough coefficient of friction even if the surface is smooth. Such solutions can provide high values both in static and kinetic coefficient of friction. Such solutions can work well, but they can be sensitive to such contaminants as a surficial presence of fine dust, moisture, ice or grease, or, for example, a slip agent migrating to the outer surface of the antislip layer from the packed-up contents. It is, however, also possible to provide, for example in a bag, a roughened outer surface whose antislip protrusions create at least some antislip mechanical interlock with suitable features of a surface of another bag. That can work even if the substance thereof is not non-slippery (e.g., elastomeric) in itself. We note that roughening projections smaller than about 10 or at most 15 micrometres are usually used for antiblocking purposes, and it is roughening projections larger than about 10 or 15 micrometres that are usually used for antislip purposes. Such solutions can typically provide good static coefficient-of-friction values, and perhaps not so good kinetic ones. Further, it is possible to exploit both effects simultaneously, by applying a non-slippery (e.g., elastomeric) substance in the antislip protrusions themselves. Antislip flexible materials can also be used in non-packaging fields, for example as roof underlayments, geomembranes, sanitary covering materials for the building industry, or sanitary underpads in human health care or in veterinary medicine. Further, it is possible to include the providing of the antislip feature in the making of the web itself such that when the film or fabric is first born it is already antislip. For example, an elastomeric component can be used in the extrusion, or a roughening additive can be blended into the polymer-to-extrude. That integrated manufacturing approach has drawbacks. For example, it can be very difficult to simultaneously optimise the antislip parameters and optimise the manufacturing parameters of the film or fabric itself. On the other hand, it is possible to provide a ready-made web, for example of film or fabric, and make it antislip in a subsequent, independent operation. That typically includes either an embossing of the web or forming an antislip (e.g., elastomeric and/or rough) coating layer on the web. That independent manufacturing approach has advantages. It makes it possible to optimise the antislip parameters of the product independently from the manufacturing parameters of the web itself. In addition, it makes it possible to first optimally source, and store, a larger supply of a commodity web and then convert antislip products from it customised, and with a fast response, to individual customer requests.

In any case in general, it can be considered to be a drawback if the antislip flexible (e.g. packaging) material does not provide any one or more of a suitable apparent (static and/or kinetic) coefficient of friction, a suitable flexibility, a suitable isotropy of the friction, a suitable isotropy of the flexibility, a suitable wear resistance of the antislip surface and a suitable contamination-resistance of the antislip feature. In case a packaging material can be used to heat-shrink around the contents of the package then it is considered to be a drawback if its heat-shrinking behaviour is compromised by its antislip features, for example, if the packaging material loses (when it is made antislip) some or all of its homogeneity, or isotropy, of shrinking. A heat shrinkability of the antislip roughening projections in themselves can be a drawback, because they could deform the packaging material because of their undesired shrinking from the heat, for example when the flexible material is fused, for example, a bag or wrap is formed from it and/or closed by fusing or welding, or when the packaging material is heat-shrunk to the contents of the package or when a bag of antislip heat-resistant (for example paper) material with heat-shrinkable antislip roughening projections gets filled with hot contents like cement, or when a load of packages packed in antislip bags is covered with a shrink hood that is heat-shrunk onto the load. It is a drawback if the antislip roughening projections lose their shapes too easily (either due to their mentioned inherent heat shrinking, and/or due to their becoming too liquefied and thus too much exposed to an effect of surface energies and beading out) in response to a heat during the mentioned fusing, shrinking or hot filling. It is also a drawback if during a (manual or other) slitting, or cutting (for example, cutting to size or shape), of the flexible (e.g. packaging) material one has to face an essentially inhomogeneous or anisotropic resistance of the (e.g. film or fabric) material to the slitting or cutting, possibly caused by the antislip features. Another drawback can be a lack of economy, for example due to a use of antislip components in surface areas where they are not exploited, or due to heating up such parts of a web as would not have to be heated up for the particular purpose, or due to a use of an unnecessarily thick or heavy antislip layer or due to a use of a too expensive machine, process step, and/or material component. Any solutions based on features hindering recycling (for example, using rough mineral particles for an antislip roughening) are disadvantageous. Methods, for making antislip flexible materials, that inherently hinder a use of cheap recycled materials as raw material are considered disadvantageous. Such hindering can be caused, for example, by the fact that recycled materials can have parameters of a wider and more uncertain range than virgin ones or can have a shorter time of resistance against oxidation or degradation, and can also contain traces of contaminants (such as ink residues or fine dust) possibly making them unsuitable for more sophisticated devices or process steps.

Examples for the "integrated manufacturing approach" follow. In U.S. Pat. No. 7,314,662 solid particles are mixed, in the extruder, into the film's melted substance to form protrusions in the surface of the film. As a drawback of such solutions, the embedded particles break the uniformity and even the continuity of the film layer in which they are embedded, possibly weakening it. Also, only a part of each particle protrudes from the film. A desirable undercut of the antislip protrusions is usually impossible to provide and they are relatively blunt-shaped. Further, the size of the protrusions, as well as the number of protrusions per surface area, is very limited. Further, the whole perimeter of the film tube must be roughened. Further, the method can not be used for roughening non-thermoplastic webs. U.S. Pat. No. 6,444,080 and HU 0202948A2 and U.S. Pat. No. 7,765,774 together describe that solid thermoplastic powder particles are blown onto the hot, tacky surface of a blown film bubble under its freezing line. The particles stick to the tacky film surface. A heat energy of the hot, molten film is used for fusing the stuck particles to the film. It has the advantage that the particles do not necessarily weaken the wall because they do not have to enter the wall. The protrusions can have sharply protruding shapes, with undercuts, providing a shearing interlock with similar protrusions of another film. They can even provide an effective antislip mechanical interlock with a fibrous engaging material, such as an ordinary nonwoven. In addition, unlike hook and loop fasteners, the nonwoven can be lifted off, vertically, from the rough surface without difficulty, i.e., the engaging system can have essentially zero lifting or peel-strength. The solution also has disadvantages. The blowing-on, or sprinkling, of the particles makes it difficult to control the actual configuration of the particles along the film surface. The particles can not be pressed onto the hot bubble surface for a stronger fixing-by-fusing, therefore the roughening protrusions can have very small footprints and can tend to break off too easily. For the same reason, they can be prone to leaning to the side, around their foot, in response to a shearing load thus losing their interlocking capacity. The protrusions are of non-uniform heights, having randomly pointed tops which can make the product feel rough to the touch and difficult to write on with a pen or stick on a label or tape, and a printing of the roughened surface may also not be beautiful enough. The protrusions, in a side view, look like powder particles having a shape generally similar to a sphere that looks as though somewhat embedded into the base surface. They are of various heights. An example protrusion shape is illustrated in FIGS. 1c and 1d of HU 0202948A2 (side elevations of a single protrusion, from two perpendicular directions): as can be seen, the shape of the protrusion is somewhat irregular, and we note that its top is not flat which can be seen from its FIG. 1d. Another example protrusion shape is illustrated in FIG. 3. of U.S. Pat. No. 7,765,774 (side elevation of an antislip protrusion). To engage with a fibrous engaging material, each protrusion should enter deeply into the nonwoven so that their widest (as meant in their side view) part can catch some fibres. It means that it is not enough if the top of the protrusion reaches the fibrous engaging material. Due to the mentioned embedded-sphere-like shape, their widest (as meant in side view) part is usually somewhat closer to the base surface than to the top of the protrusion, therefore it is too close to the base surface and it is not close enough to the top of the roughening protrusion. In addition, taller protrusions prevent shorter ones from penetrating the fibrous engaging material by keeping the fibrous engaging material (or the facing film, to which the fibrous engaging material is adhered) away from the smaller protrusions, acting like spacers. That can lead to only few of the protrusions becoming active with the fibrous engaging element. Similarly, to interlock with each other the abutting opposing rough films should abut on each other perfectly otherwise the widest (as meant in side view) parts of each protrusion can not catch each other, and the tallest protrusions act like undesired spacers. The product can be sensitive to protrusions getting impressed, forming depressions under them in the film surface, because that further decreases the free heights of their undercuts, i.e., the distances between their widest (as meant in side view) parts and the base surface. The free height can further be decreased in an undesired way by a buildup of fine dust or snow. Though protrusions of such shape provide an antislip interlock with an opposing identical rough bag surface, interestingly, they can appear to increase the slip over a smooth surface, for example a smooth bag surface. We believe that it is the result of the total abutting surface of the product being extremely small, namely it is constituted by the small top areas of the (few tallest) protrusions. Further, it is not easy to make a film tube that is only roughened on one side, due to its asymmetry in the film blowing. Further, the blown, tacky film can inherently not be printed before the roughening. The U.S. Pat. No. 6,444,080 document mentions the possibility of re-melting a pre-made film for using it instead of the melted film in the blown-film-bubble, but that would be very difficult to achieve without warping and spoiling the film and it would also be uneconomical to reheat the film. Also, the solution can not be used for roughening a packaging fabric or a non-thermoplastic web.

Examples for antislip packaging materials according to the "independent manufacturing approach" are as follows. In DE 3437414 A1 embossing pins are used to raise individual points of the film, in U.S. Pat. No. 3,283,992 linear ribs are raised from the original surface and U.S. Pat. No. 2,917,223 describes an antislip bag with mating embossments. Drawbacks thereof include that a desirable sharp character, preferably even with undercuts, of the roughening protrusions can not readily be provided, especially in case of embossing woven fabrics, further, the substance of the antislip protrusions is inherently identical with that of the wall, and the hollow, not solid, embossed protrusions are not strong enough (for example, can be compressed flat), and the wall can be weakened. Further, with antislip protrusions of rib-like, elongated shape (as seen in a top view thereof) generally a desirable isotropy (i.e., providing uniform antislip engagement in all shearing directions) of the antislip surfaces may not be provided and also a flexibility of the packaging material can be compromised. Further, with mating embossments the antislip effect may only work in few particular orientations, not being isotropic at all.

DE 19938828 (A1) describes a method for providing a plastic film with non-slip finish. A pattern of a high-coefficient-of-friction material is deposited onto the film. For example, a hot melt adhesive is melted up and dripped from the air onto the film. A drawback of the solution appears to be that it is difficult to simultaneously control the configuration of the drops along the surface and the temperature of the hot melt at the moment it contacts the film. It is particularly difficult to provide an efficient and economical monolayer of the drops on the film. Further, not any compressing of the melt with the film, during the bonding, is mentioned. Further, hot melt adhesives as well as applicators suitable for such application are expensive and in their respect a use of recycled materials, in the melt, is not favoured. Further, such hotmelt adhesives as are suitable for the mentioned purpose, if left exposed and especially if facing with another similar surface, can tend to block if the bags are stored in a warm storehouse. It is especially a problem if such a blocking of the empty, yet-unfilled bags arises. The method is dedicated to decreasing the slip on a basis of a high-coefficient-of-friction substance and it is not suitable to be set to alternatively be used for making an antislip coating based, or partly based, on a mechanical interlock of a roughened surface.

SUMMARY

There is still a need for methods and antislip flexible material products alleviating one or more of the mentioned drawbacks of the background art. In regard of our method inventions and method embodiments, for forming antislip flexible materials, and further in regard of our product inventions for antislip packaging bag or wrap products, our objectives further include one or more of the following:

- providing new methods for making a flexible material antislip with the independent manufacturing approach, which provides independence from a manufacturing of the flexible material itself;
- methods useful for converting films, fabrics and flexible composites even if they are heat-sensitive;
- methods suitable for flexibly setting a ratio of a friction based on a surficial substance and a friction based on a mechanical interlock of roughening projections, possibly also influencing the kinetic and static friction;
- methods without an inherent need for expensive equipment and raw materials like those usually used for example with hot melt printing or melt extrusion;
- methods in which it is possible that the material of the antislip coating can be kept molten for a very short time only, to prevent oxidation or degrading even with cheap raw materials;
- methods in which even recycled raw materials might be favourably used in the antislip coating;
- methods capable of high line-speeds, for example above 50 m/min, for example about 80 or 160 or even more m/min;
- methods flexible in speed, possibly adaptable for stand-alone as well as in-line operation with various existing manufacturing and converting technologies of various speeds;
- methods producing antislip materials with an apparent friction easily and flexibly settable between wide limits for example through setting the closeness and/or shape of their antislip protrusions;
- methods that can add material to a carrier material with heat-bonding (preferably with fusing or welding), which can be fast and clean and compatible with recycling;
- methods that can maximise and/or more precisely control the added heat useful for the heat bonding, for example through maximising and/or precisely controlling the temperature of an added hot material at the moment it is actually added;
- methods that can add great, but only local, charges of heat energy, for the heat bonding, without an overall melting or spoiling of the carrier, resulting in stronger and blocking-resistant heat-bonds, preferably even without an inherent need for a forced cooling of the carrier;
- methods that can form a strong bond between an added material and a carrier material due to using a combination of heat-bonding (preferably fusing or welding) and a mechanical compression between the added material and the carrier material;
- methods that can add antislip features both to porous and non-porous flexible materials,
- methods that can add antislip features to a flexible material without essentially compromising its strength, flexibility, heat shrinkability, isotropy of flexibility, and/or isotropy of heat shrinking behaviour,
- methods that can provide antislip features without penetrating and/or weakening the flexible carrier and simultaneously working with only a possibly small amount of added material, with an efficient exploitation of the added material for the antislip purpose;
- manufacturing methods better suiting the need for a beautiful printing of the antislip products, and such products;
- methods, for making antislip products with antislip protrusions, including a possibility to set or fine-tune a shape of the protrusions,
- (methods for making) antislip products with antislip protrusions that may not have an essential inherent heat shrinkability in themselves,
- (methods for making) antislip products with antislip protrusions that can at least partly survive a heating or heat-shrinking of the antislip product, due to a relatively low melt index of the antislip protrusions,
- (methods for making) antislip products with antislip protrusions that work well in a mechanical interlock due to the antislip protrusions having a shape of an undercut and/or sharply protruding character;
- (methods for making) antislip products with antislip protrusions that can work well in a mechanical interlock simultaneously also providing an acceptable or improved friction on smooth surfaces for example through excluding small-tipped or pointed shapes in the antislip protrusions;
- (methods for making) antislip products with contamination-resistant antislip protrusions that can effectively catch a counterpart fibrous material or roughened material without a need for a deep penetration of the protrusions into the counterpart fibrous material or roughened material;
- (methods for making) antislip products with antislip protrusions that can effectively catch a counterpart fibrous material without causing difficulties in lifting or peeling the counterpart fibrous material from the antislip product (for example with a relatively wider foot of the antislip protrusions);
- (methods for making) antislip products having a low and/or isotropic slitting- or cutting-resistance;
- (methods for making) antislip products with a possibility of antislip roughening projections that are more wear resistant (for example with a relatively wider foot);

(methods for making) antislip products roughened with antislip roughening projections that can be easier to write on, or stick on a label or tape, and can feel smoother to the touch;

(methods for making) antislip products roughened with antislip roughening projections that can be universal in their interlock for example due to a real random size and/or distribution of the projections;

(methods for making) antislip products more resistant to blocking in a warm storehouse;

improved economy;

combinations combining a plurality of the mentioned objective-aspects for possible synergistic effects;

methods for use of the mentioned products;

Our recognition includes a combination of several aspects, as follows. If we want to add and heat-bond a hot polymer layer to a cold film or fabric carrier, a heat energy of the added layer must be high enough for forming a heat bond. Namely, if the cold carrier does not become hot enough at least where the bond is to be formed, the bond can remain too weak, even if the bond is purely based on a hot-melt adhesion of the added layer (which, however, is not even necessarily the best solution for our objectives). The thinner the added layer, the lesser heat it can bring, for successfully heating up the cold film or fabric. If, in accordance with the needs of an economical and flexible antislip coating, we select a low average surface weight of the added coating, we can still reliably maintain the necessary heat energy by maintaining a considerably high and precisely controlled temperature thereof. If we want to avoid a later blocking of the product (for example in a warm storehouse), and therefore want to use high-melting-point polymers in the added layer, the necessary temperature of the coating layer is even greater, which is especially true if we want to expressly weld the coating layer to the carrier instead of applying a pure hot-melt adhesion. But even if the bond is not (purely) a weld, a suitably strong and non-blocking bond can need such high temperatures of the bonded parts as melts both of the bonded parts at the place of the bonding. The need for an expressly high temperature in the coating is further increased if we want avoid applying a very strong or robust compression between the (e.g. film or fabric) carrier and the hot coating, either for preventing the coating from penetrating the fabric and/or for preventing discrete melt particles in the coating from being pressed too thin and flat. Very thin continuous coating layers can usually be difficult to bond to a carrier at a high temperature because they can lose their heat energy with cooling before a heat bond is finished. If, however, we provide the hot coating in a form of discrete hot particles instead of a very thin continuous layer of the same apparent surface weight then the heat can be more efficiently exploited for the local heat-bonds of the particles, even if the particles are finally compressed to form a flat surface, because the particles have a local thickness greater than the average "thickness" (calculated from surface mass) of the coating layer, therefore they can carry a greater local heat energy charge, because they have a higher volume-to-surface ratio than a thin film (the volume storing the heat energy while the surface dissipating it). In addition, a low-surface-mass layer of discrete particles is easy to form (for example with powder scattering) without a molecular orientation in it while a continuous thin film layer, of the same low surface mass, is really difficult to make without a molecular orientation in it, which is important, for example, in the regard of an intact or isotropic heat-shrinkability of the product. The discrete layer can be formed with cheaper machinery and from cheaper (possibly even recycled) materials than a thin continuous layer. Forming a discrete layer can handle higher viscosities in the melt than forming a thin continuous layer. In our case the hot discrete particles can typically be of a significantly (for example, orders-of-magnitude) higher viscosity than usual inks or other liquid hot-melt polymer compositions used in ordinary printing operations. In addition, for example powder scattering can be used with much higher line speeds then hot-melt printing. Therefore in our case one can freely choose, substantially just by selecting a compression value, to either form a continuous (for example elastomeric) final layer or a discontinuous layer, for example a layer of discrete roughening projections, from a layer of the hot discrete particles provided. If we provide the molten, tacky particles distributed, and sitting, on a hot release surface then we can simultaneously provide a suitably controlled distribution of the material along the surface and a suitably high and controlled temperature thereof up to the moment of their transferring to the carrier (the particles are essentially not allowed to cool before they are transferred to the film or fabric). Namely, if we contact the carrier with the hot particle layer that is sitting on the hot release surface, a very short contacting time can be enough for transferring the hot particles from the release surface to the carrier. If we exploit that fact, and select a sufficiently short contacting time before removing the heat sensitive (and freshly coated) (e.g. film or fabric) carrier from the hot release surface than the hot release surface, though exposed between the hot particles sitting on it, does not have enough time to heat the carrier to an undesired extent, even if the release surface is so hot as would readily melt the carrier if given enough time. This way the amount of heat transferred to the freshly coated carrier can be, nearly or virtually even perfectly, restricted to the useful amount of heat carried within the hot coat and the carrier can be protected from the potentially harmful heat transferred (e.g. radiated and/or conducted and/or convected) from the hot release surface itself. Rotating-winding technologies readily provide the possibility of very short nip contacts and the possibility of easily finding the suitable contacting time by trying different line speeds. At the end of the contact and before the separation, the molten particles simultaneously contacting the cold carrier and the hot release surface will have adhesion levels with both the carrier and the release surface. As we found, the hotter the release surface, the weaker the adhesion between the release surface and the particles. (To illustrate this: if softened polyethylene particles are held between, and in symmetrical contact with both of, two release surfaces, one of them being colder than the other, but both release surfaces of temperatures above a softening temperature of the particles, then when they are separated, the particles will stay with the colder release surface and get released from the hotter one.) It means that the hotter the release surface at the separation, the easier it is to separate the molten particles from the release surface, which also leads to preferring an expressly hot release surface. On the other hand, as we found, the colder the front surface of the carrier, the stronger the adhesion between the front surface and the tacky particles during the contacting. It means that the colder the front surface at the separation, the easier it is to prevent the molten or softened particles, touching the front surface, from being detached from the front surface, which leads to preferring an expressly short contacting time, in order of preventing the front surface from essentially getting heated up before the end of the contacting time. A choice of the substance of the hot particles as well as of their size and closeness in combination with a choice of an extent of their compression provide the method with a great flexibility. A suitable simultaneous selection of the surface weight and temperature of the hot particle layer and of the carrier, the method can be free of a need for any pre-heating of the carrier or any forced cooling, and such suitable selections seem to be very practicable with flexible films and fabrics ordinarily used for example as packaging materials. Further, we recognised that such forming of antislip roughening projections on the carrier can be used for providing projections of uniform height, each projection having its widest (i.e., widest in side view,) part close to or at its flat top, whose benefits include that such a projection can catch a fibre of a fibrous engaging material as soon as the two get into a contact, there is not any need for the projection to deeply penetrate the fibrous material. Analogously, two such mentioned rough surfaces also interlock with each other much better. This leads to virtually all of the roughening projections uniformly taking part in the shearing interlock, greatly increasing the efficiency and shear strength of the interlock, without generating any difficulties at lifting off the interlocking parts. This kind of configuration, as we found, can have further benefits, as will become apparent later herein. Some further parts of our objectives and recognition will be described later herein.

In a first aspect, the essence of a method invention is a method for forming an antislip flexible material, comprising:
  providing a flexible carrier having a front surface,
  the provided carrier at least partly including a thermoplastic first polymer,
  the carrier having at the providing a temperature sufficiently low to keep the first polymer from melting or softening,
  providing a hot release surface of a first temperature,
  providing a first layer of discrete particles including a thermoplastic second polymer, sitting on the hot release surface and projecting from the hot release surface to corresponding terminal ends,
  in the provided first layer the discrete particles being at least partly of or above a second temperature, the second temperature being above a softening temperature of the second polymer, providing in the first layer a tackiness of at least the particle terminal ends,
  bringing into an, at least partial, contact, and keeping in the contact for a contacting time, the front surface of the provided carrier with the tacky first layer sitting on the hot release surface for at least partly sticking the first layer to the front surface, and thereafter
  removing the carrier, and therewith at least partly the tacky first layer stuck to its front surface, from the release surface thereby providing the carrier with a coating of a hot state, and
  utilising a heat energy of the hot coating forming a bond between the carrier and the coating,
  thereby providing an antislip coated flexible material including the carrier and the coating bonded thereto;
  the removing of the carrier including pulling the carrier out of the contact with a pulling-out force,
  the method further comprising
  providing the first temperature above the softening temperature of the second polymer, and
  providing the first temperature above any one or both of a melting temperature and a softening temperature of the first polymer;
  selecting, for the providing, a carrier that is spoiled (for example through one or more of breaking, stretching, shrinking, and warping) if heated completely to the first temperature and simultaneously exposed to the pulling-out force; and
  selecting the contacting time shorter than a minimum time, which minimum time is determined such that the spoiling of the carrier by exertion of heat by the hot release surface is limited to a predefined allowable extent.

The product which is made directly by the method, i.e., the antislip coated flexible material, can be, for example an antislip packaging material, for example one or more antislip packaging bags or packaging wraps or an antislip packaging material on the reel, or other, for example, non-packaging antislip coated flexible material. The flexible carrier can be any suitable carrier, for example a film, a coated and/or uncoated woven and/or nonwoven fabric and/or any compositions, laminates etc. thereof. The carrier can be of a multiwall structure or it can be of a single wall. The carrier can be, for example, a single wound sheet material, or it can be a tube, or a gusseted tube, or a centre folded web or any other suitable configuration. The tube can be an originally formed tube (for example, a blown film tube or a circularly woven tube) or a tube formed, from a sheet web, for example with a lengthwise sewing or welding or adhering of web edges. Further, the carrier can be an endless carrier, typically stored on reels and processed with unwinding and rewinding, or, the carrier can consist of individual units, for example, individual bags or sheets of material. The first polymer, as well as the second polymer, is thermoplastic and can respectively include one or more homopolymers and/or copolymers, for example a blend thereof etc. The first polymer, as well as the second polymer, may further comprise, for example, pigments, light absorbers, light stabilizers, antioxidants, fillers, plasticizers, rheological additives, or mixtures thereof etc. The whole carrier can be of the first polymer or at least one or more parts of the carrier contain the first polymer. The front surface can include first polymer or can be free of first polymer. The carrier can, in general, further contain non-thermoplastic components, that can be, for example, structural layers and/or surficial coatings, for example ink-print layers. When the carrier is provided, it is cold enough to keep its first polymer from melting or softening. For example the carrier of room temperature is provided, i.e., a pre-heating of the carrier is in general not necessary, though possible. The release surface can be constituted by a surface of a sheet, or belt, or drum, or roll, or any suitable structure. Its shape (for example flat belt), surface morphology (for example smooth) and chemical composition (for example fluorocarbon) are preferably formed to facilitate a release of a hot, tacky polymer. If the release surface is on an outer side of an endless (for example glass fabric) belt then the inner side of the belt should preferably also be provided with a release surface for its better sliding on plates, preferably heating plates. The heating plates can be planar or preferably slightly convex for a positive belt-contact. With respect to great line speeds achievable with the method, it is preferable to avoid a complete exclusion of air in the contact between the inner surface of the belt and the (heating) plates that it slides on, to avoid a blocking of the belt. This avoiding can be done, for example, with an inclusion of some texture in the contact or with providing a thin air pillow in the contact etc. The release surface is hot, which can be provided, for example, by heating the mentioned sheet or belt etc. from its underside and/or heating the release surface with an (infra-red) lamp-light irradiation of the release surface and/or with an electromagnetic heating and/or providing hot gas and/or hot (heat-radiating) surfaces around the release surface etc. The provided first layer is discontinuous and contains the discrete particles including the thermoplastic second polymer.

The particles can, in general, be foamed or hollow, however solid particles are usually more preferable. The particles can totally consist of the second polymer or they can further include other constituents, too. The particles can have the form of, for example, powder granules, droplets, chips, micropellets, fibre-sections and/or any other suitable particle shapes. A particle, sitting on the release surface, can include, for example, one (e.g. more or less melted) powder granule, but it is also possible that a particle, sitting on the release surface, includes a plurality of such, joined, powder granules, "joined" meaning that adjacent powder granules no longer have a distinct boundary layer when viewed under magnification. For example, there can be discrete particles each consisting of two or three joined powder granules, respectively. The terminal end is the top end, farthest from a foot, of a particle with respect to the release surface on which the particle is sitting. The discrete particles are at least partly of or above the second temperature, which means that some or all particles have one or more parts, or their entireties at or above the second temperature. The second temperature being above the softening temperature of the second polymer makes the second polymer tacky. A tackiness is provided in the first layer, and particularly at least in the terminal ends of the mentioned some or all particles. In a practicable case, for example, all particles are hot and tacky in their entireties. A tackiness of the particles can help maintain a suitable distribution of the particles along the release surface by fixing them there against slipping or rolling about. The front surface is brought into an at least partial contact with the tacky first layer while the tacky first layer is sitting on the hot release surface. The contact being at least partial means that at least one or more parts (or the whole) of the front surface are brought into the contact with at least one or more parts (or the whole) of the tacky first layer. For example, some of the discrete particles take part in the contact while others (for example the smallest ones) do not. The establishing of the contact typically involves the front surface exerting a positive force on the tacky first layer. The configuration, of the discrete particles sitting on the hot release surface and projecting from the hot release surface to corresponding terminal ends, inherently helps the front surface to form a solid contact with the discrete particles while simultaneously staying away from, or at least avoiding a strong contact with, the hot release surface exposed between the discrete particles. (For example this feature distinguishes the current solution from known solutions in which molten particles, provided for contacting, sit completely within indentations of hot gravure-roll or similar surfaces.) During a short time interval of the mutual contact, the contacting time, the tacky first layer (or, as we said, one or more parts thereof) can form an adhesion with the front surface and can start to transfer heat into the front surface while, on the other hand, the hot release surface can still provide a hot backup contact against a cooling-off of the first layer even though only for a very short period of time. As a result, the first layer at least partly sticks to the front surface, which means that there can also be one or more such places where the first layer does not stick to the front surface, however, in practice, the whole contacting surface of the first layer should preferably be made to stick to the front surface, which can be facilitated, for example, with a suitable, for example moderate, compression therebetween. When the carrier is removed from the hot release surface, therewith at least partly the tacky first layer, stuck to its front surface, is also removed from the release surface, which means that one or more parts of the tacky first layer can remain on the release surface even at such places where the first layer stuck to the front surface. At such places, for example, the whole thickness or only a part of the thickness of the first layer can stay on the release surface instead of going away with the front surface. In practice, however, such parts of the first layer, remaining on the release surface instead of clinging to, and going away with, the first surface, should be eliminated or at least minimised, for example by suitable surface characteristics of the release surface and/or by a suitable flexibility of the carrier and/or by a suitable homogeneity in the sizes of the discrete particles (i.e. by using a very narrow size interval of the discrete particles). The removing of the tacky first layer from the hot release surface includes a relative motion between the (initially contacting) first layer and the release surface. The direction of the relative motion, at least as long as the first layer and the release surface are still in contact, is preferably essentially perpendicular to the release surface, but it is also possible to provide another direction. In an industrial implementation both the carrier and the release surface could travel with their respective line speeds and the mentioned, essentially perpendicular, removing would correspond to none of the carrier and the release surface being essentially faster than the other. If, however, we need an essentially non-perpendicular removing direction, we can provide one of the speeds somewhat faster than the other or even an essential lateral relative displacement can be provided between the carrier and the release surface during the removing. The mentioned essentially non-perpendicular removing can be used to form an essentially non-isotropic structure of the coating, for example a coating, including roughening projections inclining in one direction, can be formed. Such a non-isotropic configuration of the coating can be used for providing a non-isotropic frictional behaviour of the product: for example the antislip coated flexible material can show a lower friction against a slip in one direction and an enhanced friction in the opposite direction. Such a non-isotropic product could be used, for example, as a roof underlayment on which an essentially unidirectional walking friction is needed, or for another example, as a geomembrane for lining an inclined ground surface providing a non-slip engagement with a covering fibrous geotextile for keeping the geotextile against gravity on the slope. The hot first layer remaining on the front surface, removed from the release surface, provides a hot coating on the carrier. At forming the bond between the carrier and the coating the utilising of the heat energy of the hot coating can practicably mean that the whole heat energy that can be conducted from the coating into the carrier is used to heat the front surface and simultaneously as well as later both the carrier and the coating are allowed to spontaneously cool. It is also possible that a forced cooling is applied to the coating and/or to the carrier, especially if the carrier is relatively lightweight and the coating is relatively heavy. The bond formed utilising the heat energy can be any kind of a bond needing the heat, i.e., heat bond, for example, adhesive bond and/or fused bond and/or welded bond etc. The forming of the bond is usually completed when a cooling of the carrier and of the coating is finished, for example when they cool down to ambient temperature, though a considerable bonding strength can already be provided in the formed bond well before the complete cooling-down, depending on the kind, and parameters, of the bond. It is also possible that the forming of the bond is finished later than the mentioned cooling-down. The carrier, provided with the coating bonded thereto, is made to constitute an antislip coated flexible material. The coating can occupy the whole front surface of the carrier, on the macro scale, but it is also possible that the carrier has one or more places, forming shapes, where the front surface has the coating, on the macro scale. For example the coating can occupy one or more stripes or spots in an endless carrier or one or more stripes or spots in the outer surface of one or more side panels of a bag on the macro scale. It is possible, for example, that the coating includes a substance of a suitably high coefficient of friction, for example, an elastomer, in which case even a perfectly flat and smooth coating, formed for example by strongly compressing the hot first layer, can be antislip. Further, if, for example, the mentioned contacting includes suitably low compressive pressures between the front surface and the discrete particles of the first layer then the flexible material can be made antislip by forming a suitable non-smooth, i.e., rough, coating on it, with or without an elastomeric substance in the coating. The rough coating can be formed to include such roughening projections as provide an antislip mechanical interlock with another similar roughened surface or with a fibrous skid-proofing material. As used herein, the word "interlock" refers to a connection of parts in which the motion of a part is limited and/or restricted by another. For a desired configuration, for example, suitable sizes of the particles and their suitable closeness, in the first layer, could be selected in a suitable way. For example, if larger particles sit on the release surface farther from each other then it is easier to form a discontinuous, or rough final coating and if small particles are distributed on the release surface with a great surface closeness then it is easier to form a continuous final coating. It is not required that the continuous coating be a completely homogeneous coating, but it can even be formed with a smooth flat surface. It can, however, help prevent the antislip coated flexible material from blocking if the coating is not perfectly smooth but inherits some of the discontinuous pattern of the original first layer. Further, it is possible to apply a relatively low compressive pressure, between the front surface and the discrete particles, at a first place of the front surface and a greater compressive pressure at another place of the front surface in order to form areas of the antislip coated flexible material with a coating of varied roughness and varied thickness. That can be implemented, for example, by exerting the compression in a nip, between two rolls, varying the compression force in time, for example, periodically. The varying of the compression force can, for example, be provided with varied hydraulic compression and/or with providing, for example, at least one of the niprolls with a compressing surface of varied hardness along its perimeter. That can be used, for example, for providing a film tube with a coating that is smoother (or literally smooth) at places corresponding to tops and bottoms of bags-to-be-formed, the coating being rougher therebetween, such configuration possibly gaining utility, for example, in the manufacturing of block-bottom valve bags. A selection of the suitable thermoplastic second polymer includes, for example, selecting a polymer having a viscosity, at the second temperature, that suitably fits our objectives, regarding the mentioned coating surface quality also with regard to the selected way of contacting, for example, a pressure profile used during the contacting. In general, for example, lower-viscosity polymers are more suitable for forming a continuous, smooth coating while higher-viscosity polymers are more suitable for forming discontinuous coatings e.g., with specifically shaped roughening projections. The removing of the carrier, from the hot release surface, includes pulling the carrier out of the contact with a pulling-out force. The pulling-out force is, for example, in practice, substantially determined by a braking of the carrier at the unwind but a tack, or adhesion, of the carrier to the release surface, with the mediation of the first layer, can also add to the pulling-out force. Generally the pulling-out force should be selected at least a minimum necessary for guiding the carrier and providing the desired contact. The first temperature, of the provided hot release surface, is provided above the softening temperature of the second polymer, which helps to keep the first layer, of the discrete particles, expressly hot and, thereby, tacky. Further, the first temperature is also provided above any one or both of a melting temperature and a softening temperature of the first polymer. More over, the whole carrier is sensitive to the high first temperature, namely the provided carrier is spoiled if heated completely to the first temperature and simultaneously exposed to the pulling-out force. The spoiling can happen for example through one or more of breaking, stretching, shrinking and warping. In practice, for example, as we experienced, if the carrier has one or more base layers of polymer of a softening temperature higher than the first temperature, the carrier can still get spoiled through getting wrinkled, warped and stretched, even broken, if exposed to the mentioned conditions, because the softening or melting of the first polymer in the carrier can weaken the carrier and can also release molecular orientation in the first polymer, typically causing the warping. The latter also holds, for example, for kraft paper coated with the first polymer. In the method the carrier is therefore protected from a harmful effect of the hot release surface, which is based on selecting the contacting time shorter than a minimum time, which minimum time is determined such that the spoiling of the carrier by exertion of heat by the hot release surface is limited to a predefined allowable extent, or is even set such that the heat of the hot release surface does not spoil the carrier. It means that the method can include limiting spoiling effects of the heat of the release surface, exerted to the carrier, to a predefined, for example unessential or even zero, allowable extent by limiting the contacting time accordingly. In practice, the skilled person can first decide what an extent of distortion or warping or wrinkling or shrinking or weakening etc. of the carrier can be allowed in a given application e.g., such that the product can successively be industrially used, or sold for industrial use, successfully. Thus most generally, the invention method includes selecting a carrier that is spoiled to a first extent, if heated completely to the first temperature and simultaneously exposed to the pulling-out force, and selecting the contacting time shorter than minimally required by a heat of the hot release surface for spoiling the carrier to the first extent. Generally, for example, in case of a selected carrier that is spoiled through breaking, if heated completely to the first temperature and simultaneously exposed to the pulling-out force, a minimum requirement could sound like the carrier should have sufficient strength to be removed from the contact without breaking. For that purpose, for example, the method could include selecting the contacting time shorter than a minimum time which minimum time is determined such that the spoiling of the carrier by exertion of heat by the hot release surface is limited to a predefined allowable extent thereby providing a strength of the carrier sufficient for the carrier to withstand the pulling-out force without breaking. Nevertheless, as we found, the method can be readily suitable to prevent any impairment, whatsoever, of the carriers used in practice. While it is of course desirable that the contacting time is selected sufficiently short that no spoiling of the carrier occurs, in practice spoiling of the carrier to an unessential extent by exertion of heat is acceptable in many industrial applications. There may be a trade-off between a comfortably selected speed of the method for forming an antislip flexible material and the extent of spoiling the carrier by heat, but it is in the common knowledge of people skilled in the art to select a minimum time such that the spoiling of the carrier by exertion of heat by the hot release surface is limited to a predefined allowable extent. The contacting time can be set to a suitably low value for example by trial and error: if the result of a trial is that the warping or shrinking etc. is too strong then a shorter contacting time must be tried. In a nip between two rolls practicably short contacting times can easily be provided for trying, with trying different line speeds. Harder niprolls, of smaller diameters, can provide even shorter contacting times.

Advantages of the method include that it provides independence from a manufacturing of the flexible carrier itself; it can equally be used for films and fabrics; it is very flexible in selecting the parameters of the antislip coating; it does not need expensive equipment and raw materials; even recycled raw materials can be used in the coating; the coating can be applied on a printed surface and/or the coated product can be printed after its coating; it is flexible in its line-speed as long as the contacting time is short enough (a "too short contacting time" problem does practically not arise); the coating does not necessarily essentially penetrate the carrier and can even be a sparse discrete coating therefore it adds friction to a flexible material without essentially compromising its strength, flexibility, heat shrinkability, isotropy of flexibility, and isotropy of heat shrinking behaviour; it is economical; it can provide antislip materials resistant to blocking. We note that, as used herein, a fusing, or welding, of the material of the coating with the material of the carrier we do not consider to mean, in itself, that the coating, or an element of the coating, penetrates, or enters, the carrier. The antislip coated flexible material can be used in many non-packaging fields, for example as a roof underlayment, a geomembrane, a disposable sanitary covering material for the building industry, or in disposable sanitary underpads in human health care or in veterinary medicine.

Preferably, in the method the contacting time is selected sufficiently short that the spoiling of the carrier through any one or more of breaking, stretching, shrinking, and warping is limited to at most an unessential extent. More preferably, the contacting time is selected sufficiently short that the spoiling of the carrier is limited to at most an unessential extent.

Even more preferably, in the method the contacting time is selected sufficiently short that the carrier is prevented from being impaired through any one or more of breaking, stretching, shrinking, and warping. Even more preferably, the contacting time is selected sufficiently short that the carrier is prevented from being impaired.

Preferably, the provided flexible carrier is suitable for use as a flexible packaging or wrapping material. For example, for use in packaging bags, including individual bags and FFS (form fill seal) bags, primarily for filling weights between 3.5 kg and 90 kg per bag, and for example packaging wraps, including for example collation wrap, shrink wrap, shrink hood, timber wrap, stretch wrap, stretch hood etc.

It is preferable, if the method includes the discrete particles being in their entireties of or above the second temperature at the providing of the first layer. Its advantage is that it provides an even greater heat energy for the bonding.

It is preferable, if the method includes providing the second temperature above any one or both of the melting temperature and the softening temperature of the first polymer. Its advantage is that it provides an even greater heat energy for the bonding.

It is preferable, if, in the method, at least portions of the carrier, the portions including the first polymer, are prevented from melting or softening between the bringing into the contact and the forming of the bond. This should be achieved, for example, with selecting a suitably short contacting time. Its advantage is that it provides a better product quality.

It is preferable, if the method includes
the provided carrier at least partly including a heat shrinkable second layer including the thermoplastic first polymer,
at the providing of the carrier the carrier having a temperature below a shrinking temperature of the second layer,
providing the first temperature above the shrinking temperature of the second layer.

As used herein, "heat-shrinkability" in a direction shall mean, in the context of a material such as the second layer, that the material is capable of being decreased in its length in the given direction, or dimension, in response to the transmission of thermal energy into the material. As used herein, the "shrinking temperature" of a material refers to the temperature at which the material, exposed to an increasing temperature, starts to heat-shrink. The carrier, as mentioned earlier, can for example include a film as well as a fabric, for example coated or uncoated woven fabric.

Preferably the method further includes providing the carrier in original dimensions thereof, and selecting the contacting time sufficiently short for preventing the carrier from contracting more than 25 percent (preferably more than 20 percent, more preferably more than 15 percent, more preferably more than 10 percent) from at least one of its original dimensions. Its advantage is that it can provide antislip materials for using in a shrink-wrap.

It is preferable, if, in the method, the antislip coated flexible material is provided to have with itself an average blocking load less than 200 grams (preferably less than 150 grams, more preferably less than 100 grams, more preferably less than 80 grams, more preferably less than 60 grams, more preferably less than 50 grams, more preferably less than 40 grams, more preferably less than 30 grams) in a modified blocking load test. The modified blocking load test is defined as follows. Two specimens of the material are to be tested with each other, with the antislip sides of the specimens facing each other. The modified blocking load test differs from the blocking load test defined in the standard ASTM D 3354-96 in that the area of contact is 2.0 cm×5.0 cm=10 cm$^2$, and the full back surfaces of both specimens are fixed to the respective aluminium blocks with double-coated tapes during the test, and the specimens to be tested shall be conditioned for 260 minutes at 50° C.±2° C. compressed, face to face, with a pressure of 15900 Pa with the full back surfaces of both specimens fixed to the respective aluminium blocks with double-coated tapes. The mentioned pressure value corresponds to that arising at the bottom of a pallet load of delivered antislip packaging bags, and the mentioned conditioning temperature corresponds to that arising in a storehouse or truck on a hot day. This feature can be achieved using a relatively high-melting-point second polymer, exploiting the possibility to actually bond it at high temperatures. Its advantage is that it provides high quality products, for example for packaging purposes. The result is that, for example, filled antislip bags or wrapped items, using our present antislip solution, can be lifted up vertically from each other without extra efforts, and similarly, unused bags delivered flat, piled up on pallets, can be lifted up from each other easily, especially after a bending of packets of bags, for example back and forth, as is usual with all ordinary (e.g. plastic or paper) packaging bags, before their use for filling, to break up any blocking they might have.

It is preferable, if the method includes providing a carrier that loses its stability if heated completely to the first temperature. This feature provides an even greater significance of the invention feature of the contacting time kept suitably short. Its advantage is that strong bonds, even welds, can possibly be formed.

It is preferable, if the method includes providing at least some of the discrete particles having a size of at least 20 (preferably at least 25, more preferably at least 30, more preferably at least 35, more preferably at least 40, more preferably at least 45) micrometres in at least one dimension of the discrete particle. The mentioned dimension can, preferably, be the height. Its advantage is that a greater particle (with a given particle shape) provides a greater volume-to-surface ratio of the particle, thereby providing a greater efficiency of the utilisation of the heat energy as mentioned earlier. A theoretical upper limit could be, for example, about 50 millimetres.

It is preferable, if, in the method a surface energy of the release surface is lower than a surface energy of the second polymer. Its advantage is that it helps remove the tacky first layer from the release surface without residue or with less residue.

It is further preferable, if, in the method a difference between the surface energy of the second polymer and the surface energy of the release surface is less than 23 mJ/m$^2$. Its advantage is that it helps the molten particles of the second polymer to somewhat wet the release surface in order of forming with the release surface suitably sharp, but not too sharp first contact angles that could be advantageous in the forming of a discontinuous, roughening coating from the discrete particles.

It is preferable, if, in the method a surface energy of the release surface is lower than a surface energy of the front surface of the carrier. The surface energy of the release surface may be formed by known materials and methods, such as siliconised surfaces, fluorochemicals, corona discharge, flame or the like.

It is further preferable, if, in the method a difference between the surface energy of the front surface and the surface energy of the release surface is greater than 4 mJ/m$^2$. Its advantage is that it helps remove the tacky first layer from the release surface without residue or with less residue, because the tacky first layer prefers to cling to the front surface rather than to the release surface.

It is preferable, if, in the method the removing includes providing an adhesive force between the front surface and at least a majority of the contacted tacky particles greater than an adhesive force between the release surface and the at least a majority of the contacted tacky particles. As used herein, a "majority" of the contacted tacky particles means a number of the contacted tacky particles greater than half of a total number of the contacted tacky particles. As used herein, "contacted tacky particle" means "tacky particle contacted by the front surface". This can be achieved, for example, with selecting suitable surface energies of the front surface and the release surface. Its advantage is that it helps remove the tacky particles, contacted by the front surface, from the release surface without residue or with less residue, because the contacted tacky particles prefer clinging to the front surface to clinging to the release surface.

It is further preferable, if, in the method the removing further includes providing a cohesive force of the at least a majority of the contacted tacky particles greater than the adhesive force between the release surface and the at least a majority of the contacted tacky particles. Its advantages include that it can result in a substantially complete removing of the at least a majority of the contacted tacky particles from the release surface. "Substantially complete" means that at most 20% (preferably at most 15%, more preferably at most 10%, more preferably at most 5%, more preferably at most 3%, more preferably at most 2%) of the polymer of the at least a majority of the contacted tacky particles remain on the release surface during one removing operation. This can be achieved, for example, with selecting a suitably great viscosity in the tacky particles. Its advantage is that it provides greater control of the product quality. For example, it helps to provide roughening projections more or less preserving in their tops the shapes of the feet of the discrete particles, because a "pull away" effect, in which the polymer of the particles would be stretched in a direction perpendicular to the release surface, much like pulled taffy, can be essentially prevented. If a tacky particle should remain, un-removed, on the hot release surface and become old then later (for example one revolution later, if the technology is based on a revolving release belt or drum), when a new first layer is provided on the hot release surface, the adhesion force between the new first layer particles and the old particle should be greater than an adhesion force between the old particle and the release surface in order that the new first layer picks up and takes away the old particle. This is typically possible to provide, even with old particles (of, for example, polyethylenes), starting to oxidise. On the other hand, the old particle may have an adhesive force, with the release surface, greater than new particles have, due to a decomposition of the old particle. Therefore it should be avoided to keep a first layer on the release surface too long (for example by an operator error) without a removing thereof. Nevertheless, those old particles, especially of polypropylenes, that tend to show a fast pyrolysis and therefore a stronger adhesion to the release surface, can usually become fully decomposed and virtually disappear from the release surface as a fume and/or vapour. From such fully decomposing polymer (for example, polypropylene) residues the release surface can be cleaned in this automatic pyrolytic way.

It is preferable, if the method includes keeping the discrete particles of the provided first layer sitting on the hot release surface long enough to provide at least some of the discrete particles in an at least semiliquid state and having first contact angles with the release surface. "At least semiliquid" means liquid or semiliquid. This can be achieved, for example, with using a sufficiently long endless belt for the release surface on which the particles can spend enough time for somewhat wetting the release surface the way described, and for letting the surface energies of the particles and the release surface mutually form the first contact angles. Its advantage is that it helps form a coating including separate roughening projections with flat tops which is (among others) easier to write on or stick on a label and is smoother to the touch. It is further preferable, if at least some of the first contact angles are smaller than 90 degrees (preferably smaller than 85 degrees, more preferably smaller than 80 degrees, more preferably smaller than 75 degrees, more preferably smaller than 70 degrees, more preferably smaller than 65 degrees). This can be achieved with giving the particles a longer time to stay on the release surface and/or providing a lower viscosity in the particles. Its advantage is that it helps to form an undercut in the roughening projections and/or to form roughening projections better interlocking with other similar roughening projections or a fibrous skidproofing material. On the other hand, the first contact angles can be selected to be greater than 30 degrees.

It is preferable, if, in the method an outer surface of the discrete particles of the provided first layer is made up of a first portion contacting the release surface and a second portion out of a contact with the release surface, an area of the second portion being greater than an area of the first portion in at least a majority of the provided discrete particles. As used herein, a "majority" of the provided discrete particles means a number of the provided discrete particles greater than half of a total number of the provided discrete particles. This can be achieved for example by using a flat, smooth release surface or one with not too deep recesses. Its advantage is that it helps keep the front surface away from, and possibly out of contact with, the hot release surface during the contacting time, in order to protect the carrier from the heat of the exposed release surface parts between the discrete particles.

It is preferable, if, in the method the provided hot release surface is either essentially flat or it at most has a pattern independent from a distribution of the discrete particles of the provided first layer. Its advantage is that it helps to form a random distribution of the discrete particles and also to provide a standing-out of the discrete particles from the release surface for possibly keeping the front surface away from the hot exposed release surface portions during the contacting time.

It is preferable, if the method includes keeping the discrete particles of the provided first layer sitting on the hot release surface for at least 0.5 seconds, (preferably for at least 1 second, more preferably for at least 1.5 seconds, more preferably for at least 2.0 seconds, more preferably for at least 2.5 seconds). This can be achieved, for example, with using a sufficiently long endless belt for the release surface. Its advantages include that it helps to suitably heat up the particles, and it helps the particles to lose some or all of their possible molecular orientations and to somewhat wet the release surface and to somewhat "smooth-out" or to get closer to a bead form in response to a surface tension of the softened or molten polymer of the particles, which is advantageous because, for example, it can provide the particles with more uniform shapes. We note that it does not mean more uniform sizes thereof.

It is preferable, if, in the method the contacting time divided by an average surface mass of the carrier is provided to be at most 0.020 s·m$^2$/g, (more preferably at most 0.016, more preferably at most 0.013, more preferably at most 0.010 s·m$^2$/g). "Average surface mass" of the carrier means the mass of the carrier divided by the area of the front surface of the carrier. Its advantage is that it helps to protect the carrier from an excessive heat of the release surface.

It is preferable, if, in the method the discrete particles of the provided first layer sitting on the hot release surface project from the release surface to respective particle heights, in at least some of the discrete particles the particle height equalling at least 0.1 times (preferably at least 0.2 times, more preferably at least 0.3 times, more preferably at least 0.4 times, even more preferably at least 0.5 times) a smallest top-plan-view extent of the particle.

It is further preferable, if the particle height, in at least a majority of the discrete particles of the provided first layer, equals at least 0.1 times (preferably at least 0.2 times, more preferably at least 0.3 times, more preferably at least 0.4 times, even more preferably at least 0.5 times) the smallest top-plan-view extent of the particle. As used herein, a "majority" of the discrete particles of the provided first layer means a number of the discrete particles of the provided first layer greater than half of a total number of the discrete particles of the provided first layer. The smallest top-plan-view extent is the smallest extent of the particle in a top plan view of the release surface taken from above the discrete particles (as if measured with such a caliper as is in the plane of the view). This feature, distinguishing the first layer from, for example, an ordinary printed-up layer in a gravure printing process, has advantages including providing a greater volume-to-surface ratio of the particle, carrying a more effective heat charge and helping a forming of roughening projections with undercuts and/or of roughening projections better interlocking with other similar roughening projections or a fibrous skidproofing material, and helping in keeping the front surface away from, and possibly out of contact with, the hot release surface during the contacting time.

It is preferable, if the method includes providing, in the antislip coated flexible material, an average surface mass of the coating lower than 1.5 times (preferably lower than 1.25 times, more preferably lower than 1.00 times, more preferably lower than 0.75 times, even more preferably lower than 0.60 times) an average surface mass of the carrier. The average surface mass of the coating is the mass of the coating divided by the area of the carrier occupied by the coating (the area also including possible interstices between discrete projections constituting the coating). Average surface mass of the carrier means the mass of the carrier divided by the area of the front surface of the carrier. Its advantages, in addition to its economy, include that it helps to keep the product flexible, and to prevent the carrier from being spoilt by an excessive heat energy of the coating, possibly even without a forced cooling.

It is preferable, if the method includes providing an average surface mass of the carrier less than 500 g/m$^2$ (preferably less than 420 g/m$^2$, more preferably less than 370, or 320, 270, 220, 200, 180, 160, 140, 130, or even 120 g/m$^2$). A lowest limit of the average surface weight could implicitly be determined, if necessary, for example, by the usage for a packaging material and could be for example about 3 g/m$^2$. Such selection increases the significance of the invention feature, as discussed in the recognition section above. Further, its advantages, in addition to its economy, include that it can facilitate that the antislip coated flexible material can need less heat energy for its subsequent fusing, welding and/or heat shrinking whose benefit is that the less heat energy will probably spoil, distort, melt or, for example, shrink the coating to a lesser extent.

It is preferable, if the method includes providing the heat energy of the hot coating suitably low for maintaining, without a need for a chill-roll cooling, a breaking strength of the carrier sufficient for a rewinding of the carrier. One possibility thereof, for example, is to provide an (even expressly hot) coating of a suitably low surface mass with respect to a surface mass of the carrier.

It is preferable, if the method includes bringing portions of the second polymer onto the release surface at a release surface temperature above the softening temperature of the second polymer for providing the first layer of the discrete particles sitting on the release surface. Its advantage is that it eliminates a need for a repeated heating up and cooling down of the release surface with every revolution. Further, it helps in fixing the discrete particles, from the moment they arrive at the release surface, by heating them into a tacky state virtually immediately.

It is further preferable, if the method includes any one or both of
- a.) bringing onto the release surface from the air any one or more of solid, liquid and semi-liquid (though preferably solid) portions of the second polymer, and
- b.) bringing onto the release surface, other than from the air, (preferably solid) portions of the second polymer colder than the softening temperature of the second polymer.

(We note that a portion of the second polymer can be colder than its softening temperature still other than solid for example in a solution thereof) For example, second-polymer portions can be impacted from the air onto the release surface by gravity, electrostatic attraction, impaction or other suitable forces or any combination thereof. Dispersing of the second-polymer portions onto the release surface by gravity can be performed in any suitable way, for example, by scattering solid second-polymer portions with a scatter unit or spraying droplets etc. On the other hand, for example solid second-polymer portions can be fed onto the release surface directly from a feeder being in contact with the release surface. Its advantage is that it avoids such difficulties as would possibly be involved if molten portions of the second polymer were to be transferred, by a positive contact with, for example, a printing device, to the hot release surface. Namely, if the release surface is such hot and in addition has desirable release properties, then it would be difficult to fully transfer a melt from another, implicitly also hot, surface with sufficient certainty, especially if the viscosity of the molten second polymer is greater then usual with hot melts applied with printing. If solid portions of the second polymer are brought onto the release surface then it provides the advantage that the second polymer is only kept, during the whole method, in a hot molten or softened state for a very short time (unlike other solutions based for example on melt extrusion and hot melt tanks) which can reduce a risk of oxidation or decomposition to a minimum even with cheap (possibly even recycled) second-polymer substances. Namely, the portions (for example, powder granules or micropellets) of the second polymer get in touch with the release surface and get heated up to melt and then, for example within a couple of seconds, they contact the front surface and cool down to solidify, which all can happen within, for example, less than half a minute. The fact that the polymer only has to spend a very short time at the high temperature leads to the possibility of using the desired, really high temperatures without decomposing or oxidizing the polymer too much. Further, bringing solid portions, instead of a hot melt printing, can allow much higher line speeds and lower melt mass flow rates in the second polymer. Preferably a fluid-cooled heat shield is used to protect from radiant heat the apparatus used for bringing the portions of the second polymer to the release surface with respect to the possible very high temperature of the release surface. For the same reason, it is preferable to protect the arrangement from an undesired effect of a spontaneous hot air draught generated by the hot release surface or of a hot air draft generated by the possibly high speed of the (for example, belt shaped) release surface.

It is preferable, if at least some of the discrete particles in the provided first layer are essentially molecularly unoriented. It can be provided, for example, by forming the first layer by scattering a powder, or similar material, of the second polymer onto the release surface, which powder, or similar material, is essentially molecularly unoriented. It can also be provided, for example, by keeping the softened or molten discrete particles sitting on the release surface long enough for them to lose their possible molecular orientation through relaxing and/or free shrinking. Its advantages include that it can help to form an antislip coated flexible material with a coating essentially free of molecular orientation therefore not interfering with, particularly not distorting in one direction, the original heat shrinking characteristics of the carrier. Further, such a coating, for example including discrete roughening projections, can better keep its own form during a subsequent heat shrinking of the antislip coated flexible material.

It is preferable, if the method includes providing the first layer of the discrete particles sitting on the release surface with a random distribution. Its advantages include the following. It helps to form an antislip coated flexible material whose roughening projections are of a random distribution which is known to be beneficial in regard of an isotropy of a mechanical interlock with another similar surface, and/or with a fibrous skidproofing material, in the shearing direction. Further, if minute residues of the discrete particles are possibly left on the (for example, belt-shaped) release surface after the removal of the tacky first layer from the release surface, then particles applied in the next cycles will statistically sooner or later certainly hit them and possibly take them away from the release surface. Therefore the quality of the whole release surface in use will be homogeneous in that respect. Further, applying a true random pattern in the discontinuous coating is a very good means of avoiding bumps formed in the rewound antislip coated flexible material due to possible respective places of thicker and thinner coating, or even a local lack of coating.

It is preferable, if the first layer is provided substantially free of a tackifier.

The term "substantially free of a tackifier" here means that the first layer has less than about 5% by weight of a material commonly recognized in the adhesive arts as a tackifier. As it is known, tackifiers are added to adhesive formulations in order to increase the adhesion thereof. Materials commonly used as tackifiers include: rosin resins, cumarone-indene resins, terpene resins and hydrocarbon resins. An advantage of this embodiment is that it helps to avoid a blocking of the product in a warm storehouse. Further, it favours the use of cheaper polymers.

It is preferable, if the method includes providing the carrier including a fabric, and preventing the coating from essentially penetrating the fabric. As used herein, the coating is prevented from essentially penetrating a fabric made up of yarns, tapes and/or fibres, if the coating is prevented from encapsulating a majority of the yarns, tapes and/or fibres being in contact with the coating. It can be provided for, for example, by selecting a suitably great viscosity of the second polymer and/or by selecting a suitably weak compression of the tacky first layer during the contacting, exploiting the fact that it is the heat energy that is primarily used for forming the bond between the coating and the carrier and the bond is primarily a heat bond, rather than a mechanical-interlock-type bond based on a penetration of the coating into the fabric. Its advantages include that it helps to keep intact the flexibility and heat shrinking characteristics of the carrier.

It is preferable, if the coating of the antislip coated flexible material is formed to be discontinuous. It can be achieved, for example, by a suitably moderate compression of the tacky first layer during the contacting. Its advantages include that it can help prevent the antislip coated flexible material from blocking, by providing a non-smooth coating surface unsuitable to generate intimate contact with nearly complete exclusion of air along the surface. Further, it can help creating an antislip mechanical interlock with a suitable (e.g. roughened) other surface. Further, it can help preserve a flexibility of the carrier.

For the same advantages, it is further preferable, if the coating occupies at most 75% (more preferably at most 60%, or 50% or 40%, or 35%, or 30%, or 25%, or 20%, or 17.5%, or 15.0%, or 12.5%, or 10.0%, or even more preferably at most 8.0%) of an area of the antislip coated flexible material in a top plan view. This is meant on the micro scale, wherein interstices in which the front surface is exposed are not considered to be occupied.

It is further preferable, if the coating is formed to include a multiplicity of discrete roughening projections projecting from the front surface of the carrier, each roughening projection provided with a foot, the foot being an end of the roughening projection bonded to the carrier.

It can be achieved, for example, by a suitably sparse distribution of the discrete particles in the first layer, in combination with a suitably moderate compression of the tacky particles during the contacting. It is possible that a roughening projection is formed from a single particle of the first layer, but it is also possible that a roughening projection is formed by joining a plurality of particles of the first layer, for example by a suitable compression of the first layer. Advantages of the method embodiment include that it can help creating an antislip mechanical interlock with a suitable (e.g. roughened or fibrous) other surface. Further, it can help preserve a flexibility of the carrier. Its economy, based on using less material for the coating, is also advantageous. It is also an advantage that the roughening projections can have a relatively smooth surface (including for example a smooth side), because the high temperature at which the coating is kept can possibly smooth out a minor surface roughness of the individual roughening projections, based on a surface tension of their polymer. This can improve an antislip interlock with other projections and particularly with fibres.

It is preferable, if the method includes providing at least some of the roughening projections with a second contact angle of between 90 and 178 degrees (more preferably of between 92 and 178 degrees, more preferably of between 95 and 178 degrees, more preferably of between 97 degrees and 178 degrees) with the front surface in at least one side view of the roughening projection. As used herein, a side view means a non-perspective view taken from a direction generally parallel with the front surface, for example a view taken from the left, or from the right, during a horizontal orientation of the front surface. The view includes the roughening projection as well as (a side section of) at least that part of the front surface with which the second contact angle is formed. Here the term "second contact angle" is used in a sense analogous with as if the roughening projection was a drop of liquid sitting on the solid front surface: as used herein, the second contact angle is the angle, measured through the roughening projection, closed between the roughening projection—air interface and the front surface of the carrier where the roughening projection—air interface meets the front surface. In practice, that can be observed under magnification. This feature can be provided, for example, by applying a moderate pressure to the tacky discrete particles, of a suitably great viscosity, during the contacting time, while simultaneously providing for an easy release thereof from the release surface. For example this feature distinguishes our solution from known methods in which a coating is made by printing a layer of (typically low-viscosity and well-wetting) hot melt onto a surface. Advantages of the method embodiment include that it helps to provide the roughening projections with an undercut which makes them more suitable for an antislip mechanical interlock, in the shearing direction, with similar roughening projections of a facing surface, or with a fibrous skidproofing material.

It is preferable, if the method includes providing at least some of the roughening projections with a substantially flat top forming an edge at least partially surrounding the substantially flat top. We note that the flat top does not just mean a top that is flat in a side view thereof, but it means that the roughening projection has a top area that is essentially flat. It is not necessary but preferable if planes of the flat tops are essentially parallel with each other, and, preferably, also essentially parallel with the front surface. It can be provided, for example, by applying a moderate pressure to the tacky discrete particles, of a suitably great viscosity, during the contacting time, while simultaneously providing for an easy and essentially perpendicular release thereof from the release surface. Its advantages include that the product can be easier to write on with a pen and/or to stick on a self-adhesive label or tape, the product can feel smoother to touch. The product can be subsequently provided with a more beautiful printed image. Further, as the flat tops can together provide a substantial abutting surface, the antislip coated flexible material can have an improved friction on smooth surfaces even without a high-coefficient-of-friction substance in the roughening projections. And if the substance of the roughening projections has a high coefficient of friction (for example, an elastomer) then the antislip effect thereof can be more emphasized or more significant, due to an increased total surface on which it can abut a smooth surface. The result is an improved combination of a friction based on an elastomeric substance and a friction based on a mechanical interlock of the roughening projections. The presence of the edge can, for example, facilitate the mentioned mechanical interlock.

For the same advantages, it is further preferable, if the method includes providing at least a majority of the roughening projections with a substantially flat top. As used herein, a "majority" of the roughening projections means a number of the roughening projections greater than half of a total number of the roughening projections.

It is further preferable, if the method includes the edge completely surrounding the substantially flat top. Its advantages include that it can help to better interlock in all directions.

It is further preferable, if the method includes the edge essentially forming a circle. Its advantages include that it can help to further increase the isotropy.

It is further preferable, if the method includes in at least one side view of the roughening projection at least one part of a contour line of the roughening projection, connecting the foot and the edge, being convex from outside. The contour-line part mentioned is that part of the contour line which connects the foot and the edge, and it can for example be at a right side or a left side of the roughening projection in its at least one side view during a horizontal orientation of the front surface. It means that it is convex when looking from the outside of the roughening projection. As used herein, and in accordance with the mathematical meaning of the word, the contour-line part forms the boundary of a convex set of points, the points belonging to the roughening projection; a "convex contour-line part" includes the case of a straight contour-line part, too.

It is further preferable, if the at least one contour line part is strictly convex from outside. As used herein, a strictly convex contour-line part of a roughening projection, in a side view is convex when looking from the outside and not straight. A (preferably strictly) convex shape (preferably convex in more side views, more preferably in all side views) of the roughening projection contour-line part has been found to be beneficial because it gives a relatively large thickness to the roughening projection. This convex shape provides strength to the edge. A convex shape also effectively leads engaging fibres down towards the carrier, thereby reducing torque load on the roughening projections and the carrier where they are attached (i.e., at the foot).

It is further preferable, if the method includes in at least one side view of the roughening projection a ratio of a width of the substantially flat top to a foot width being from 0.50 to 1.24. (Preferably from 0.8 to 1.24, more preferably from 0.9 to 1.24, more preferably from 1 to 1.24, more preferably from 1 to 1.20, more preferably from 1 to 1.18, more preferably from 1 to 1.15, even more preferably from 1 to 1.10.) Its advantages include that the ratio being greater than 0.50 can help exploiting advantages from there being a flat top and can help providing an engagement with an engaging fibre of a skidproofing material as well as with similar, facing projections. On the other hand, the ratio being lower than 1.24 can help keep an undercut of the roughening projection moderate enough to allow an easy, practically effortless separation of the antislip coated flexible material from a fibrous skidproofing material in a lifting or peeling operation in order to avoid an undesired lifting or peeling strength, known for example from hook and loop fasteners, of the antislip interlock.

It is further preferable, if the method includes an area of the foot being essentially equal to, or smaller than, an area of the substantially flat top. Advantages include that it helps to give to the roughening projections a form with an undercut, or a form in which the widest (i.e., widest-in-side-view) part, or the part of maximum sideward bulge, is closer to the top than to the foot, which makes the roughening projections more suitable for an antislip mechanical interlock, in the shearing direction, with similar roughening projections of a facing surface, or with a fibrous skidproofing material. The advantages further include that it can help to use the flat top's edge for the mechanical interlock, either with another similar roughening projection or with a fibrous skidproofing material. Its particular advantage is that the interlocking parts do not necessarily have to be pressed very close to each other, because already the farthest point, the top, of the roughening projection can be able to establish the interlock. This has a great significance as soon as the front surface is contaminated with dust or snow from which the interlocking parts can stick out, or if the roughening projection stands out of a depression of the front surface, for example as a result of the roughening projection having been impressed.

For the same advantages, it is further preferable, if the method includes the area of the foot being smaller than the area of the substantially flat top. It can be provided, for example, by keeping the discrete particles sitting long enough on the hot release surface to give them a form similar to cups turned with their mouths toward the release surface, and applying a gentle compression during the contacting and providing an easy release of them from the release surface.

It is further preferable, if the method includes providing the roughening projection with an edge angle being an angle, measured through the roughening projection, closed between the substantially flat top and a mantle surface extending from the edge to the foot. In other words, the edge angle is the angle that the top, and the side of the projection attaching to the top at the edge, close with each other at the edge. Its advantages include that it can help make the antislip interlock of the edge of the top more significant.

It is further preferable, if the method includes providing the roughening projection with the edge angle essentially equal to, or smaller than, 90 degrees, in at least one side view of the roughening projection. It can be provided, for example, by keeping the discrete particles sitting long enough on the hot release surface to provide them with acute first contact angles with the release surface and then sufficiently preserving that geometry of the particles during the contacting and removing. The advantage of such an antislip roughening projection is that the edge of the flat top, being essentially in the plane of the top and forming the edge angle, can readily enter into, and engage with, a fibrous skidproofing material without a need for displacing a substantial volume of the fibrous skidproofing material. Similarly, the elevated position of the "sharp" edge makes it easier for the edge to interlock with another similar roughening projection, or even with a sole of a boot of a worker walking on a block of timber, wrapped in the antislip coated flexible material. The interlocking effect can be provided even if the roughening projection has its foot in a depression of the front surface, therefore the antislip capabilities of the product can be maintained even if the roughening projections are somewhat impressed into the front surface or are in some other way placed in respective depressions or indentations of the front surface. Further, this has a great significance as soon as the front surface is contaminated with dust or snow or ice from which the interlocking edges can stick out.

For the same advantages, it is further particularly preferable, if the edge angle is smaller than 90 degrees, (preferably smaller than 87 degrees, more preferably smaller than 84 degrees, more preferably smaller than 81 degrees, more preferably smaller than 78 degrees). On the other hand, it can be selected to be greater than 30 degrees to provide a suitable strength of the edge. It is preferable, if the method includes forming at least one side view of the roughening projection tapering from the edge to the foot. (Preferably a plurality of side views, more preferably all side views of the roughening projection taper.) As used herein, tapering to the foot means becoming progressively narrower or remaining of the same width toward the foot. For example, a cylinder is a tapering shape (though not a strictly tapering shape). Its advantages include that this type of tapering will help pull engaged fibres down to the front surface of the carrier when a shear load is applied to the antislip interlock without the fibres being caught at a non-tapered portion displaced from the front surface. Thus the torque on the roughening projection is minimal so the carrier can be weaker, i.e., can be cheaper, more flexible, thinner etc. Furthermore, the product may have a relatively large surface area formed by the substantially flat tops, making the product smooth to the touch and easy to stick on a label or tape or to write on, while also having a relatively low total surface area of the projection feet connected to the carrier, increasing the flexibility of the product. Further, this feature is advantageous as soon as the front surface is contaminated with dust or snow from which the interlocking, widest parts can stick out.

For the same advantages, it is further particularly preferable, if the method includes forming each side view of the roughening projection tapering from the edge to the foot. Advantages include an improved isotropy of the product.

For the same advantages, it is further particularly preferable, if the side view strictly tapers from the edge to the foot. As used herein, strictly tapering to the foot means becoming progressively narrower toward the foot. For example, a suitably oriented truncated cone is a strictly tapering shape.

It is preferable, if the method includes forming the roughening projections with a random distribution in a top plan view of the antislip coated flexible material. As used herein, random distribution refers to the distribution on the microscale. Its advantages include that an antislip interlock between two such surfaces facing each other can be independent of a relative orientation of the facing surfaces.

It is preferable, if the method includes forming the roughening projections of random top-plan-view sizes. Advantages include that it can help the product to be more universal. Namely, ability of a roughening projection to enter between and well engage with interstices, between projections of a mating roughened surface or even between fibres of a mating skidproofing material, can depend on the top-plan-view size of the roughening projection. Namely, a smaller roughening projection can best fit into one kind of interstice while a bigger roughening projection can fit into another kind of interstice. It means that an antislip coated flexible material having roughening projections of various sizes can possibly more universally engage, with many kinds of mating surfaces.

For analogous advantages, it is preferable, if the method includes forming the roughening projections of random orientations in a top plan view of the antislip coated flexible material. As used herein, orientation of a roughening projection in a top plan view does not refer to a molecular orientation of the polymer of the roughening projection but to its angular position.

It is preferable, if the method includes forming such roughening projections as project from their respective feet to respective projection heights and as have respective smallest top-plan-view extents and within at least a majority of the roughening projections a coefficient of variation of the smallest top-plan-view extents is greater than a coefficient of variation of the projection heights. As used herein, the smallest top-plan-view extent of a roughening projection means its smallest extent in the top plan view, as we mentioned earlier.

It is further preferable, if the coefficient of variation of the smallest top-plan-view extents is at least 1.15 times (preferably at least 1.2 times, more preferably at least 1.3 times, more preferably at least 1.4 times, more preferably at least 1.5 times, more preferably at least 1.6 times, more preferably at least 1.7 times, more preferably at least 1.8 times, more preferably at least 1.9 times, more preferably at least 2.0 times) the coefficient of variation of the projection heights.

It can be provided, for example, by using a powder for making the discrete particles of the first layer, and letting the inherent irregularity of the sizes, or volumes, of powder granules appear in the varied smallest top-plan-view extents of the roughening projections by compressing the hot particles of the first layer to a more or less even projection height during the contacting. We note that the tops of the roughening projections can be, for example, flat or can be structured with a regular and/or irregular and/or random and/or other structure, and/or can have a pattern essentially inherited from a surface pattern of the release surface. Advantages are based on our recognition as follows. Ability of a roughening projection to enter between and well engage with interstices, between projections of a mating roughened surface or even between fibres of a mating skidproofing material, can depend on the smallest top-plan-view extent of the roughening projection. Namely, a "narrower" (i.e., narrower in the top plan view) roughening projection can fit into one kind of interstice while a roughening projection of a greater "smallest top-plan-view extent" can fit into another kind of interstice. It means that an antislip coated flexible material having many kinds of roughening projections, of various "smallest top-plan-view extent" values, can possibly more universally engage, with many kinds of mating surfaces. Therefore a relatively great coefficient of variation of the smallest top-plan-view extents can be beneficial. On the other hand, as we could see, a more or less uniform height of the roughening projections can help to provide a greater abutting surface (and thereby a better friction) on smooth surfaces and also to provide more of the roughening projections getting involved in engaging with the mentioned structured mating surfaces. Therefore a relatively low coefficient of variation of the projection heights can be beneficial.

It is preferable, if the method includes tops of at least a majority of the roughening projections essentially being in alignment along a plane parallel with a general plane of the front surface. As used herein, the top of a roughening projection means a point, or part, of the roughening projection farthest above the general plane of the front surface. The general plane of the front surface may not contain some points of the front surface, for example points of an indentation or bump of the front surface. For example in the case of a front surface of a woven fabric carrier the general plane of the front surface can represent an average of the (possibly mathematically non-planar but technically generally planar) woven surface. It is possible, for example, that the mentioned aligning tops are flat surfaces, but it is also possible that they are respective single points of the respective roughening projections, depending on respective shapes of the roughening projections. It can be provided for, for example, by compressing the first layer into a substantially uniform thickness before the removing. Advantages of the mentioned method embodiments include that the product, possibly preserving the benefits of a random character of its roughening projections, can be easier to write on with a pen and/or to stick on a label or tape, the product can feel smoother to touch. The product can be provided with a more beautiful printed image. Further, as the roughening projections of a more or less uniform height can together provide a substantial abutting surface, the antislip coated flexible material can have an improved friction both on smooth surfaces and with another roughened or fibrous engaging surface.

It is further preferable, if the method includes forming such roughening projections as project from their respective feet to respective projection heights and providing, in at least some of the roughening projections, a smallest top-plan-view extent of the roughening projection equalling at least 1.75 times (preferably at least 1.8 times, more preferably at least 1.9 times, more preferably at least 2.0 times, more preferably at least 2.1 times) the projection height.

This can be provided, for example, by a suitably strong compression of the tacky first layer during the contacting. Its advantage is that such a wide roughening projection will not tend to break off too easily. For the same reason, it can be resistant to leaning to the side, around its foot, in response to a shearing load thus keeping its interlocking capacity. If necessary, a theoretical maximum ratio could, for example, be defined as the smallest top-plan-view extent equalling at most 5000 times the projection height.

It is preferable, if during the contacting time a portion of the front surface, between neighbouring tacky particles, is kept out of a contact with the release surface. It can be provided for, for example, by using a second polymer of a suitably high viscosity simultaneously with providing a suitably gentle compression during the contacting. That way the discrete particles can be prevented from being pressed too flat, and they together can keep the front surface at a positive distance from the hot release surface, especially if the closeness of the discrete particles is great enough for the purpose also with regard to a flexibility of the carrier. This feature is particularly advantageous in combination with heights of at least some roughening projections being at least 20, or more preferably 30, or more preferably 40 micrometres. Its advantages include that it decreases the heat energy transferred (for example, radiated) into the carrier directly from the hot release surface.

It is preferable, if the method includes providing at least some of the roughening projections with a hidden surface portion being a portion of an outer surface of the roughening projection which the roughening projection covers from a viewer in a top plan view of the antislip coated flexible material taken from above the roughening projections. As used herein, the outer surface of the roughening projection is essentially the roughening projection—ambient air interface, which in practice can mean a surface of the roughening projection that can be seen from somewhere, and for example the foot of the roughening projection, where it attaches to the carrier is not a part of the outer surface of the roughening projection and therefore it is not a hidden surface portion either. Thus the hidden surface portions of a roughening projection can be found with finding out what parts of the projection's outer surface are invisible, in the top plan view, because of being hidden, from the viewer, by the projection itself. For the forming of such roughening projections various techniques, mentioned so far, can be used. Its advantages include that it helps to give to the roughening projections a form with an undercut which makes them more suitable for an antislip mechanical interlock, in the shearing direction, with similar roughening projections of a facing surface, or with a fibrous skidproofing material.

It is further preferable, if the at least some of the roughening projections have at least one undercut and include at least one area immediately above the undercut, the roughening projection being so dimensioned as to form a separation between the at least one area and the front surface which is greater than 10 micrometres (preferably greater than 12 micrometres, more preferably greater than 15 micrometres, more preferably greater than 20 micrometres). We note that the mentioned at least one area can, in a given case, be constituted by the edge alone. Its advantages include that it helps to maintain an interlocking capacity of the roughening projections even if a contaminating layer (for example, of white frost or fine dust) builds on the front surface, at least as long as the thickness of the contaminating layer does not reach the size of the mentioned separation.

It is preferable, if the method includes providing two nip rolls and pressing the carrier toward the hot release surface within a nip between the two nip rolls to provide the contact between the front surface of the carrier and the tacky terminal ends of the particles sitting on the hot release surface, exerting on the carrier a nip pressure between 0.001 and 80 N/lineal cm (preferably between 0.002 and 70 N/lineal cm, more preferably between 0.005 and 60 N/lineal cm). We note that this interval includes values much lower than usual in background-art nip-pressure values. Its advantages include that, providing practicable values of such process parameters as discrete particle size and closeness, second polymer viscosity and first and second temperatures, its nip pressure interval can provide advantageous products mentioned above. Low nip pressures do not necessitate such expensive machinery as great nip pressures. It is preferable to select a width of the roll pressing the carrier smaller than a width of the carrier because that way the whole roll can be kept cool, due to the carrier possibly being prevented, for example by the suitably high line speed, from heating through too much.

It is preferable, if the method includes utilising the heat energy of the hot coating of the discrete roughening projections for heating parts of the carrier near at least some of the roughening projections, sufficiently to soften or melt at least the first polymer in the heated carrier parts, and thereafter allowing the carrier and the roughening projections to cool into a solid state for forming a final bond. It means that the heat bond can be formed with such great heat energy that can actually locally soften or melt, at least partly, the carrier. For example the mentioned parts can be portions of the carrier close to feet of discrete roughening projections. For example it is possible that a wall of the carrier is locally softened or melted in its full thickness, or in a part of its thickness, under the foot of the roughening projection. It is possible that the roughening projection directly contacts the first polymer of the carrier but it is also possible that the front surface of the carrier, contacted by the roughening projection, is constituted, for example, by a thin, printed non-thermoplastic layer (of customer graphics, for example), in which case the heat, softening or melting the portion of the carrier, is transferred through the thin printed layer without melting the printed layer itself "Allowing to cool" can, for example, refer to a spontaneous cooling as well as to a forced cooling or to a combination of both. Advantages include that such bonds, made with great local heat energies, can be stronger and the product can be more resistant to blocking (in a warm storehouse) than others. Further, the carrier can be prevented from being spoiled, despite the fact that parts of it get softened or melted. This can be provided for, for example, by selecting a suitably small size and/or low closeness of the discrete roughening projections, with regard to their temperature.

It is preferable, if the method includes providing both the first temperature and the second temperature above a fusing temperature at which the first polymer and the second polymer are capable of fusing together. Its advantages include that bonds made at such high temperatures can be stronger and can provide more resistance to blocking (in a warm storehouse) than others (for example those with an ordinary hot melt adhesive).

It is preferable, if the method includes providing the first temperature above 130° C. (preferably above 140° C., more preferably above 190° C., more preferably above 200° C., more preferably above 205° C., more preferably above 210° C., more preferably above 215° C.).

It is further preferable, if the method includes providing the second temperature above 130° C. (preferably above 140° C., more preferably above 190° C., more preferably above 200° C., more preferably above 205° C., more preferably above 210° C., more preferably above 215° C.). It, essentially, can provide for a charge of heat energy in the first layer that is (preferably far) greater than enough for just keeping the first layer molten or softened: it is also capable of considerably heating up the contacted front surface in order that the forming of the bond includes significantly heating up both of the bonded parts. Advantages include that such bonds, made with such high temperatures, can be stronger and can provide more resistance to blocking (in a warm storehouse) than others (for example than those with an ordinary hot melt adhesive).

It is further preferable, if the method includes providing both the first temperature and the second temperature below 300° C. This can help to prevent the carrier from being spoilt from an excessive heat of the coating.

It is preferable, if the method includes providing the first temperature at least 30° C. degrees higher (preferably at least 40° C. degrees higher, more preferably at least 50° C. degrees higher, more preferably at least 50° C. degrees higher, more preferably at least 60° C. degrees higher, more preferably at least 70° C. degrees higher) than both the softening temperature of the second polymer and at least one of the melting temperature and the softening temperature of the first polymer. This has the advantage that it provides a suitable forced heating for creating a high-temperature bond.

It is preferable, if the method includes providing the second polymer of a melt mass flow rate of 0.1 to 300 g/10 min (preferably 0.1 to 250 g/10 min, more preferably 0.1 to 200 g/10 min, more preferably 0.1 to 150 g/10 min, more preferably 0.1 to 100 g/10 min, more preferably 0.1 to 80 g/10 min, more preferably 0.1 to 60 g/10 min, more preferably 0.1 to 40 g/10 min, more preferably 0.1 to 30 g/10 min, more preferably 0.1 to 20 g/10 min, more preferably 0.1 to 10 g/10 min) determined at 190° C. under a load of 2.16 kg in accordance with ISO 1133-1. Advantages include that a melt of such polymers (typically having a viscosity much greater than a typical viscosity of a hot melt applied with printing) can possibly be removed from the hot release surface without a cohesive failure, i.e., without a splitting of the melt due to a too low cohesive force in the melt. Further, such a suitably selected melt mass flow rate can provide a viscosity of the discrete particles suitable for the forming of the preferred roughening projection configurations. Namely, the selected value range can provide a viscosity in the discrete particles, sitting directly on the hot release surface for a certain time, low enough for the discrete particles to suitably wet the release surface forming therewith desirably sharp, preferably acute, first contact angles. This feature, of having a viscosity low enough, can further improve with selecting even higher melt mass flow rate values (for example 0.5 or 1.0 or 1.5 or even 2.0 g/10 min) in the lower limit of the value range. On the other hand, the same selected value range can provide a viscosity in the discrete particles, (e.g., gently) pressed for a very short time to the cold front surface, high enough for preventing the discrete particles/roughening projections from wetting too much the cold front surface during the contacting time and afterwards as long as they are hot at all, this possibly resulting in desirable obtuse second contact angles of the roughening projections with the front surface. Similarly, the high-enough viscosity can prevent the discrete particles/roughening projections from losing too much of their original, preferably cup-like shape which they were provided with when they stayed on the release surface. This feature, of having a viscosity high enough, further improves with selecting even lower melt mass flow rates in the upper limit of the value range. Further, the lower the melt mass flow rate of the second polymer, the better the roughening projections will keep their original forms (against a spontaneous bead-forming) when they get external heat, for example during a fusing or welding of the product or in a heat shrinking of the product, or when hot contents are filled into the bag made from the product. Further, the melt mass flow rate being greater than 0.1 g/10 min can help to provide an easy sealability, weldability of the product, namely when the roughening projections happen to be between sealing or welding tools during a sealing or welding then they can become pliably compressible enough not to remain "spacers" keeping the welding tools from abutting. This feature can also further improve with selecting the mentioned even higher melt mass flow rate values in the lower limit of the value range.

It is preferable, if the method includes providing one or both of the melting temperature and the softening temperature of the first polymer either lower than or equal to or at most 50° C. degrees higher than the softening temperature of the second polymer. This has the advantage that it provides a possibility of a high-temperature bond in respect of the first polymer. Its advantage over other bonds (for example, with bonds with an ordinary hot melt adhesive) is that such bonds are stronger and the product will not block.

It is preferable, if the method includes providing at least a majority of the roughening projections with a top-plan-view size of at least 30 micrometres and at most 40 millimetres (preferably of at least 40 micrometres and at most 20 millimetres). Advantages include that roughening projections of such size are large enough for providing an antislip mechanical interlock and small enough to preserve a suitable flexibility and heat-shrinkability of the carrier.

It is preferable, if the method includes providing, in the antislip coated flexible material, such roughening projections whose average top-plan-view aspect ratio is at least 1.0 and at most 20.0 (preferably at most 19.0, more preferably at most 18.0, more preferably at most 17.0, more preferably at most 16.0, more preferably at most 15.0, more preferably at most 14.0, more preferably at most 13.0, more preferably at most 12.0, more preferably at most 11.0, more preferably at most 10.0, more preferably at most 9.0, more preferably at most 8.0, more preferably at most 7.0, more preferably at most 6.0, more preferably at most 5.0, more preferably at most 4.0, more preferably at most 3.0, more preferably at most 2.0, even more preferably at most 1.75). Each roughening projection has its own top-plan-view aspect ratio which means a ratio of the greatest to the smallest extent of the roughening projection in a top plan view of the antislip coated flexible material taken from above the roughening projections. The average of the top-plan-view aspect ratio values of each of the multiplicity of the roughening projections is at most 20.0, which means it is either 20.0 or less than 20.0. Its advantages include that a lower average top-plan-view aspect ratio value provides, in the antislip coated flexible material, a greater flexibility with a greater isotropy of the flexibility, and a greater heat-shrinkability with a greater isotropy of the heat-shrinkability. Further, discrete particles with higher average top-plan-view aspect ratio values (for example, oblong filaments) are more difficult to bond to the carrier at a given desirably high temperature without spoiling the carrier than discrete particles with lower average top-plan-view aspect ratio values (for example, powder particles), the latter only possibly melting the carrier in small, dot-like spots which possibly does not spoil the carrier like a melting of the carrier along an oblong spot.

It is preferable, if the method includes providing the carrier including a fabric woven from overlapping warp and weft thermoplastic tapes or yarns, and selecting the utilised heat energy, of the hot coating including the roughening projections, suitably for forming the bond between the carrier and the roughening projections without fusing together the overlapping warp and weft tapes or yarns under at least some of the roughening projections. This can be achieved by a setting of the manufacturing parameters, for example, by trial and error. The heat energy of a hot roughening projection depends on, and can be modified with a modification of, any of the temperature of the hot roughening projection, a mass of the roughening projection and a specific heat of the roughening projection. It is also possible to select a fabric of tapes (or yarns) of a suitable heat sensitivity, for achieving the desired result. Advantages include that it preserves a flexibility and heat shrinkability, as well as an isotropy thereof, in the woven fabric carrier.

It is preferable, if the method includes providing the carrier including a fabric woven from plastic tapes, the tapes exposed at least in a part of a surface of the carrier, and providing in the antislip coated flexible material at least one (preferably: at least some) of the roughening projections having suitable geometric features with respect to the exposed tapes for forming with at least one of the exposed tapes a slip-decreasing mechanical interlock. An example for exposed tapes could be tapes not covered by a coating in the carrier. The suitable geometric features will depend on what the exposed tapes are exactly like, but usually roughening projections having substantially flat tops with edge angles smaller than 90 degrees are able to catch, with their "sharp" edges, edges of overlapping warp or weft tapes of a woven fabric, especially if the fabric includes exposed twisted tapes meant for enhancing its friction. Such catching of the tape edges or a little penetration between the overlapping tapes can be enough to decrease the slip between a roughened front surface and an exposed fabric part. The tapes can be exposed in the front surface and/or in a back surface of the carrier, or, for example if the carrier is provided in the form of a tubular woven fabric, the tapes can be exposed in an inner side of the tube while the front surface is on the outer side. The advantages include that such a contact, of decreased slip, can be utilised for example between fabric bags, filled for example with flour, put on top of each other, or between overlapping fabric parts for example in a timber wrap, or between overlapping reel-ends (potentially even between overlapping tube-ends one pushed inside the other in a telescopic way) at a reel-changing in any process rewinding or processing, and changing, reels of such a roughened fabric for example in a tube form or in a single-wound-sheet form. Namely, when at a reel change the ends of the respective reels of fabrics must be fixed to each other, so that one can pull the other, it is advantageous if the fixing is helped with the mentioned slip-decreasing mechanical interlock, also with regard to the fact that a fixing of the reel ends to each other with a self adhesive tape can be made somewhat more difficult by the fact that the surface(s) to tape can be roughened.

It is preferable, if the method includes providing the antislip coated flexible material capable of a slip-decreasing mechanical interlock in a shearing direction with a skidproofing material, of an ordinary polypropylene spunbonded nonwoven fabric of an average surface mass of 17 g/m² and filament thickness of between 25 and 30 micrometres, due to the roughening projections having suitable closeness and geometric features with respect to the skidproofing material for forming mechanical bonds with the filaments of the skidproofing material in the shearing direction. "Ordinary" means that the skidproofing material does not differ essentially from commodity nonwovens, of similar specification, commonly used, for example, in the hygiene industry at the time of the current application (including, for example, that it is not hydrophilic, it is un-coated, un-printed, un-creped, and it is not napped). A photograph of a sample of the specified nonwoven can be found among the figures.

It is further preferable, if a static friction between two specimens of the antislip coated flexible material, with a specimen of the skidproofing material placed between the specimens of the antislip coated flexible material, is suitably high to resist sliding in an inclined-plane-type static-friction test of 50 degrees angle (preferably of 55 degrees angle, more preferably of 60 degrees angle, more preferably of 65 degrees angle) according to the TAPPI T 815 standard. The two specimens of the antislip coated flexible material must face each other with their coatings. All three specimens must be smooth, not wrinkled. As it is known, in this test, 50 degrees correspond to a static coefficient of friction (C.O.F.) of 1.19, while, for example, 65 degrees mean a C.O.F. of 2.14, which are considerably great values in the art.

It is further preferable, if the static friction is suitably high to resist the sliding immediately after a preparation, the ice test preparation, the ice test preparation including maintaining in at least the carrier front surface, and the coating, of a first one of the two specimens of the antislip coated flexible material a third temperature of between −15° C. and −25° C. while exposing the carrier front surface and the coating to air of a temperature of between 0° C. and 4° C. and of a relative humidity of 100% for a preparation time of 3 minutes (preferably of 5 minutes, more preferably of 8 minutes) and the ice test preparation further including providing a second one of the two specimens of the antislip coated flexible material and the specimen of the skidproofing material of the third temperature. The ice test preparation can be used to simulate a situation possibly arising during a use of bags of the antislip coated flexible material (with a piece of skidproofing material placed therebetween) for packing frozen food. In the real-life situation that is simulated, a first bag is filled with frozen food and therefore its antislip coated flexible material is kept, by its contents, freezing cold, and before the skidproofing material and the other filled (and therefore cold) bag is respectively placed on the first bag, the first bag spends some 3 minutes time waiting, with its carrier front surface, and its coating, exposed to the ambient air which is usually of a temperature of between 0° C. and 4° C., and, for example if it is a packaging of frozen fish at sea, the air humidity is, at worst, 100%. The moisture from the air continuously freezes out on the front surface, and coating, of the bag, and the ice layer it forms is getting thicker by time. If the roughening projections are suitably formed, 3 minutes is not enough for the ice to build such thick as would keep a general plane of the skidproofing material, placed onto the icy surface, above the widest parts of the roughening projections of the first bag. In case the embodiment follows our teachings generally described herein, it can, for example, be enough that tops of some of the roughening projections reach above a top level of the ice, which results in an unparalleled resistance of the product to ice buildup. The ice test preparation, as used herein, includes, that in at least the carrier front surface and the coating of the first specimen a third temperature of between −15° C. and −25° C. is maintained. If the static-friction test is fulfilled with selecting −15° C., the feature is present. It is reasonable to assume that if the test is fulfilled at any temperature between −15° C. and −25° C., it would have been fulfilled with −15° C. also, because the colder the surface is, the faster the ice buildup is (see hereinunder). For example the first specimen can be attached flat onto a flat top of a thick block of ice prepared to be of a desired temperature. (This is going to be the incline, later.) That maintains the third temperature in the first specimen's upper, roughened, surface during the minutes of the ice test preparation, which can readily be checked, for example, with an infrared thermometer. The first specimen, attached to the ice block, must be prepared in a dry, cold place and only exposed to the moist air when the preparation time is started. The second specimen and the skidproofing material specimen can be kept in a freezer of the third temperature at low air humidity, the second specimen suitably attached to a sled in accordance with the standard. This way the sled also gets the same cold. The ice test preparation ends at the moment the preparation time runs out. Immediately thereafter the precooled skidproofing material specimen and the sled assembly including the second specimen must be respectively placed onto the icy surface of the first specimen (which is still attached to the block of ice), and the inclined-plane-type static-friction test must be performed with a suitable inclining of the ice block, together with the whole assembly thereon, otherwise in accordance with the standard TAPPI T 815. We note that another reason why this test must be performed at the mentioned unusual temperatures is that the behaviour of the mentioned antislip system, both, of the roughening projections and, mainly, of the skidproofing material, becomes different if they are cooled to such an extent. Namely, polymers used for packaging materials, particularly polyolefins are known to show a definite increase in modulus and tear strength if the temperature is taken from 18° C. to −20° C., and the difference is especially dramatic if their glass transition temperature is between the two points, as is the case with polypropylene. Advantages of this feature include that the product is more resistant to a contamination of ice, as well as fine dust, settling on the antislip surface.

It is further preferable, if the method includes providing the antislip coated flexible material having with the skidproofing material an average blocking load less than 200 grams (preferably less than 150 grams, more preferably less than 100 grams, more preferably less than 80 grams, more preferably less than 60 grams) according to the standard ASTM D 3354-96. In the test, specimens must be arranged in a way that the skidproofing material specimen is above the antislip coated flexible material specimen, the latter with its coating looking upward. This feature can be provided for by forming the roughening projections having suitable geometric features with respect to the skidproofing material for preventing substantial mechanical bonds with the filaments of the skidproofing material in a lifting-off operation. Products of a plurality of method embodiments, the products having roughening projections, can be suitable for the purpose of the shearing mechanical interlock with the skidproofing material, and they can be dimensioned, for example, based on trial and error. In general, such roughening projections can have the most suitable geometric features for the shearing interlock as have a shape including an undercut. For example, the mentioned obtuse second contact angle of the roughening projections with the front surface can help to establish a mechanical interlock in a shearing direction, though its extent can have to be decreased (for example by increasing the melt mass flow rate in the second polymer) if it seems to provide an undesired mechanical interlock also in the lifting operation. The same holds, analogously, for the mentioned roughening projections with substantially flat tops larger than their feet, roughening projections with hidden surface portions, and roughening projections having at least one undercut. We found that our method embodiments can readily form roughening projections whose undercut is inherently usually not emphasised enough for providing an essential engagement with the fibrous skidproofing material in the peeling and lifting directions, which (among others) is believed to distinguish our antislip system, for example, from a typical hook and loop fastening application. The result is that, for example, filled antislip bags or wrapped items, using our present antislip solution, can be lifted up vertically from each other without extra efforts, and similarly, unused bags with a piece of skidproofing material fixed to one of their sides, delivered flat, piled up on pallets, can be lifted up from each other easily.

It is preferable, if the method includes forming the antislip coated flexible material having at least some of (preferably: at least a majority of) the discrete roughening projections essentially free of molecular orientation. It can be provided, for example, by providing the first layer essentially without a molecular orientation and preventing the coating from getting essentially molecularly oriented. Discrete roughening projections being essentially free of molecular orientation can be recognised, for example, from their behaviour in a test when they are heated to soften or melt. Namely, such, heated, roughening projections will essentially not heat-shrink, and, in general, will essentially possibly not be deformed other than at most in response to surface energies of the softened or molten substance of the roughening projections and the environment. If necessary, the tested roughening projections can be detached, for example by a sharp blade, from the carrier, before the testing. They can be heated for example with immersing them into hot silicone oil, as is usual with shrinking tests. Alternatively, they can be heated with a heated-air gun. Its advantages include that it can help the coating not to interfere with, particularly not to distort in one direction, the original heat shrinking characteristics of the carrier, which can be beneficial during a heat shrinking or welding or fusing of the product. Further, such discrete roughening projections can better keep their own desired shapes if they are exposed to heat, for example during a heat shrinking of the antislip coated flexible material, which is beneficial, for example, in respect of the antislip quality of heat-shrunk packages made this way.

It is preferable, if the forming of the bond between the carrier and the coating including the roughening projections includes fusing the roughening projections with the carrier utilising the heat energy of the hot roughening projections. It is possible, for example, that a compatibilising layer is utilised to constitute the front surface of the carrier so that an enhanced bond may be formed.

It is further preferable, if the forming of the bond includes welding the roughening projections to the carrier utilising the heat energy of the hot roughening projections.

Advantages include that such bonds are strong and such roughened products can be non-blocking even if stored in a warm storehouse. Further, there is not any need for expensive (for example, tackifier-containing) hot melt adhesives, but cheaper commodity polymers, possibly even recycled polymers can be used in the roughening projections.

It is preferable, if the method includes providing the front surface with respective depressions under the feet of at least some of the roughening projections. This can be provided, for example, by impressing the roughening projection, or it can be formed in any other way, for example by deforming the front surface under the roughening projection, for example by embossing or local heat shrinking (for example by the heat energy of the hot roughening projection) or in any other way. This feature has particular significance in combination with other mentioned preferred embodiments, such as with the ratio of the top width to the foot width being at least 1, and/or with the area of the foot being smaller than the area of the top, and/or with the edge angle being at most 90 degrees, and/or with the side view of the roughening projection (strictly) tapering from the edge to the foot, and/or with the slip-decreasing mechanical interlock in the shearing direction with the skidproofing material and/or with the melt mass flow rate being relatively low (which helps to retain the sharp top edge even after a heat shock during a use of the product), namely, these features help the farthest point, top edge, of the roughening projection perform the antislip interlock despite the fact that the foot of the roughening projection stays somewhat deeper, in a depression or indentation. Its advantages include that this feature makes this product distinguishable from other products; the roughening projection can have a firmer bond due to being "nested" into the front surface. Further, this feature can be the sign of the fact that the carrier is relatively intact and strong, even under the roughening projection (heat-bonded or fused, for example, welded thereto), namely such a depression can be the result of the carrier locally melting and heat-shrinking next to the roughening projection because of the heat of the roughening projection but only in a part of its thickness, and for example the back surface of the carrier not melting and not heat-shrinking combined with the front surface of the carrier locally melting and heat-shrinking result in the bimetallic-like behaviour in which a local area of the front surface becomes smaller than that of the back surface, that causing the depression. The rear part of the carrier body remaining unmelted can help the carrier remain strong.

For the same advantages, it is preferable if a depth of the depression is formed small enough to keep a widest part of the roughening projection above a rest of the front surface in at least one side view of the roughening projection. As used herein, the widest part is that section (generally parallel with the front surface) of the roughening projection, whose width is the greatest of all, in the given side view. The rest of the front surface means a part of the front surface, other than the depression, around the depression. The term "above" means above if the front surface is kept horizontally, looking upward.

It is preferable, if the method includes
  providing respective inter-particle distances between neighbouring discrete particles of the provided first layer, and
  providing the hot release surface in a revolving endless belt having a running direction, and
  keeping the endless belt alternatingly shifted, perpendicularly to the running direction, between two lateral end positions, providing a lateral displacement of the belt between the two lateral end positions, the lateral displacement being equal to or greater than an average of the inter-particle distances (preferably greater than twice the average, more preferably greater than 3 times the average).

This alternating lateral shifting of the belt has advantages that are surprising and specific to the current invention features. Advantages include that it helps to avoid bumps formed in the rewound antislip coated flexible material due to possible respective places of thicker and thinner coating, or even a local lack of coating. A further advantage can be that it helps to statistically hit all possible particle-residues, left on the release surface from earlier, with newly supplied discrete particles in order of picking up the residues from the release surface, which has a particular significance in order of preventing the residues from oxidising or decomposing by time from the expressly high temperature of the release surface. Namely, (partly) oxidised or decomposed particles can be more difficult to remove from the release surface than other ones.

It is preferable, if the method includes forming a packaging bag or packaging wrap that includes the provided antislip coated flexible material, with at least a part of the coating looking toward an outside of the bag or wrap. The forming of the bag or wrap can take place before, during and/or after the providing of the coating on the carrier. For example, a provided (for example, film or fabric) bag or wrap can constitute the provided flexible carrier having a front surface. The bag can preferably be a heavy duty bag, for example for 5 to 90 kg contents, or a medium duty bag, for example for 1 to 5 kg contents. The bag can be a pre-manufactured individual bag provided for a packaging or it can be a bag made on a form-fill-seal machine when the packaging is done. The wrap can be, for example, collation wrap, shrink wrap, shrink hood, timber wrap, stretch wrap, stretch hood, or any other kind of packaging wrap. The bag can be formed and/or closed with welding, sewing or adhering, or otherwise. The wrap can be fixed around the contents with heat (including shrinking and/or fusing) or taping or stapling or stretching, or otherwise. Both the bag and the wrap can include a film and/or a woven fabric and/or a nonwoven fabric. Both the bag and the wrap can be heat-shrinkable or can be heat-shrunk onto their contents. Both in the bag and the wrap the carrier can be printed before and/or after the method performed for forming the antislip flexible material.

In a second aspect, the essence of a product invention is an antislip packaging bag or packaging wrap, formed at least partly from an antislip flexible material including a flexible carrier, the carrier having a front surface with a multiplicity of discrete, solid roughening projections
  looking toward an outside of the bag or wrap,
  the roughening projections including a thermoplastic second polymer,
  the roughening projections being essentially free of molecular orientation,
  the roughening projections having respective feet, the foot being an end of the roughening projection attaching to the carrier,
  the roughening projections having a second contact angle of between 90 and 178 degrees (preferably of between 91, more preferably 92, more preferably 93, more preferably 94, more preferably 95, more preferably 96, more preferably 97 degrees and 178 degrees) with the front surface in at least one side view of the roughening projection,
  the bag or wrap being new in that
  at least some of the roughening projections, the flat-topped roughening projections, have a substantially flat top forming an edge at least partially surrounding the substantially flat top.

Definitions and comments as well as objectives and recognition elements and stated advantages used in the first aspect section in respect of such terms and expressions and features as we use, or whose analogous variants we use, in this second aspect section are also valid for this second aspect section without further mentioning, unless otherwise specified hereinunder.

The specification allows that the bag or wrap can further include further projections other than specified herein. As used herein, the flexible carrier can be a plastic (e.g. thermoplastic film or fabric) or non-plastic (e.g. kraft paper) carrier or a composite thereof. As concerning a distribution of the discrete roughening projections on the macro scale, it is possible that the discrete roughening projections are present essentially along the whole front surface of the carrier, but it is also possible that the carrier has one or more places, forming shapes, where the front surface has the roughening projections, on the macro scale. For example the roughening projections can make up one or more stripes or spots in the outer surface of one or more side panels of the bag or wrap on the macro scale. The roughening projection is solid, and has a foot attaching to the carrier and it means that the roughening projections are not hollow and include additional material above the carrier. The definition implies that they are other than pure embossed projections made (or as if made) with locally pressing the carrier out of its original plane forming on one side a projection and on the other side a corresponding depression. A foamed second polymer is allowed to constitute the roughening projections, however second polymers other than foamed are preferred. The roughening projection can, in general, be a result of any suitable manufacturing process, it can be made with integrally moulding together with the carrier, as well as with mixing added bodies into a material of the carrier during its forming, or fixing (e.g. adhering or fusing or welding etc.) bodies to the front surface where the fixed bodies can be pre-shaped and/or they can be shaped during and/or after their fixing etc. Advantages of the product include that such discrete, molecularly unoriented roughening projections can better keep their own desired shape, and can also refrain from distorting the carrier around themselves, when they get external heat (for example from a hot filling or from a covering by a shrink wrap) during use, the second contact angle helping to give a form with an undercut to the roughening projections which makes them more suitable for an antislip mechanical interlock, in the shearing direction, with similar roughening projections of a facing surface, or with a fibrous skidproofing material, while the flat top and the edge also provide their advantages described in the first aspect section.

It is preferable, if at least a majority of the roughening projections are flat-topped roughening projections.

It is preferable, if in at least some of the flat-topped roughening projections the substantially flat top forms the edge completely surrounding the substantially flat top.

It is further preferable, if the edge essentially forms a circle.

It is preferable, if in the antislip flexible material, an average surface mass of the multiplicity of the discrete roughening projections is lower than 1.5 times (preferably lower than 1.25 times, more preferably lower than 1.00 times, more preferably lower than 0.75 times, even more preferably lower than 0.60 times) an average surface mass of the carrier. The average surface mass of the multiplicity of the discrete roughening projections is the mass of the multiplicity of the discrete roughening projections divided by the area of the carrier that is rough with the multiplicity of the discrete roughening projections. Its advantages, in addition to its economy, include that it improves a flexibility of the product.

It is preferable, if the multiplicity of the discrete roughening projections are of a random distribution in a top plan view of the antislip flexible material.

It is preferable, if the flat-topped roughening projections are of random top-plan-view sizes.

It is preferable, if the flat-topped roughening projections are of random orientations in a top plan view of the antislip flexible material. As used herein, orientation of a roughening projection in a top plan view does not refer to a molecular orientation of the polymer of the roughening projection but to its angular position.

It is preferable, if in at least one side view of at least some flat-topped roughening projections at least one part, of a contour line of the roughening projection, connecting the foot and the edge, is convex from outside.

It is further preferable, if the at least one contour line part is strictly convex from outside.

It is preferable, if in at least one side view of at least some flat-topped roughening projections a ratio of a width of the substantially flat top to a foot width is from 0.50 to 1.24. (Preferably from 0.8 to 1.24, more preferably from 0.9 to 1.24, more preferably from 1 to 1.24, more preferably from 1 to 1.20, more preferably from 1 to 1.18, more preferably from 1 to 1.15, even more preferably from 1 to 1.10.)

It is preferable, if in at least some of the flat-topped roughening projections an area of the foot is essentially equal to, or smaller than, an area of the substantially flat top.

It is further preferable, if the area of the foot is smaller than the area of the substantially flat top.

It is preferable, if the edge forms an edge angle being an angle, measured through the roughening projection, closed between the substantially flat top and a mantle surface extending from the edge to the foot, It is further preferable, if at least some of the flat-topped roughening projections have the edge angle essentially equal to, or smaller than, 90 degrees, in at least one side view of the roughening projection.

It is further preferable, if the edge angle is smaller than 90 degrees, (preferably smaller than 87 degrees, more preferably smaller than 84 degrees, more preferably smaller than 81 degrees, more preferably smaller than 78 degrees). On the other hand, it can be selected to be greater than 30 degrees to provide a suitable strength of the edge.

It is preferable, if at least one side view of at least some flat-topped roughening projections tapers from the top surface edge to the foot.

It is further preferable, if each side view tapers from the top surface edge to the foot.

It is further preferable, if the side view strictly tapers from the top surface edge to the foot.

It is preferable, if the flat-topped roughening projections project from their respective feet to respective projection heights and have respective smallest top-plan-view extents and within at least a majority of the flat-topped roughening projections a coefficient of variation of the smallest top-plan-view extents is greater than a coefficient of variation of the projection heights. As used herein, a "majority" of the flat-topped roughening projections means a number of the flat-topped roughening projections greater than half of a total number of the flat-topped roughening projections.

It is further preferable, if the coefficient of variation of the smallest top-plan-view extents is at least 1.15 times (preferably at least 1.2 times, more preferably at least 1.3 times, more preferably at least 1.4 times, more preferably at least 1.5 times, more preferably at least 1.6 times, more preferably at least 1.7 times, more preferably at least 1.8 times, more preferably at least 1.9 times, more preferably at least 2.0 times) the coefficient of variation of the projection heights.

It is further preferable, if in at least some of the flat-topped roughening projections, a smallest top-plan-view extent of the roughening projection equals at least 1.75 times (preferably at least 1.8 times, more preferably at least 1.9 times, more preferably at least 2.0 times, more preferably at least 2.1 times) the projection height.

It is preferable, if tops of at least a majority of the flat-topped roughening projections are essentially in alignment along a plane parallel with a general plane of the front surface.

It is preferable, if at least some of the flat-topped roughening projections have a hidden surface portion being a portion of an outer surface of the roughening projection which the roughening projection covers from a viewer in a top plan view of the antislip flexible material taken from above the roughening projections.

It is further preferable, if at least some of the flat-topped roughening projections have at least one undercut and include at least one area immediately above the undercut, the roughening projection being so dimensioned as to form a separation between the at least one area and the front surface which is greater than 10 micrometres (preferably greater than 12 micrometres, more preferably greater than 15 micrometres, more preferably greater than 20 micrometres).

It is preferable, if the second polymer has a melt mass flow rate of 0.1 to 300 g/10 min (preferably 0.1 to 250 g/10 min, more preferably 0.1 to 200 g/10 min, more preferably 0.1 to 150 g/10 min, more preferably 0.1 to 100 g/10 min, more preferably 0.1 to 80 g/10 min, more preferably 0.1 to 60 g/10 min, more preferably 0.1 to 40 g/10 min, more preferably 0.1 to 30 g/10 min, more preferably 0.1 to 20 g/10 min, more preferably 0.1 to 10 g/10 min) determined at 190° C. under a load of 2.16 kg in accordance with ISO 1133-1. Advantages include that the lower the melt mass flow rate of the second polymer, the better the roughening projections will keep their original forms (against a spontaneous bead-forming) when they get external heat, for example during a fusing or welding of the product or in a heat shrinking of the product, or when hot contents are filled into the bag made from the product. Further, the melt mass flow rate being greater than 0.1 g/10 min can help to provide an easy sealability, weldability of the product, namely when the roughening projections happen to be between sealing or welding tools during a sealing or welding then they can become pliably compressible enough not to remain "spacers" keeping the welding tools from abutting. This feature can further improve with selecting even higher melt mass flow rate values in the lower limit of the value range (for example 0.5 or 1.0 or 1.5 or even 2.0 g/10 min).

It is preferable, if the carrier at least partly includes a thermoplastic first polymer. Here the roughening projections being essentially free of molecular orientation receives an even greater significance because an antislip flexible material with a thermoplastic carrier can also receive external heat for other reasons, like closing, forming or shrinking the bag or wrap itself, with heat, e.g. with heat-blowing, fusing, welding etc. Also, a common recyclability of the carrier and the roughening projections arise. A heat shrinkable carrier gives a concrete significance to the beneficial behaviour of the roughening projections during a heat shrinking of the carrier. It is further preferable, if the thermoplastic first polymer of the carrier is weldable and/or fusable for one or both of a forming and a closing of the bag or wrap.

It is further preferable, if the carrier at least partly includes a heat shrinkable layer including the thermoplastic first polymer.

It is further preferable, if the heat shrinkable layer has a heat shrinkability of at least 5% (preferably at least 10%, more preferably at least 15%, more preferably at least 20%). It means that the heat shrinkable layer has the mentioned heat shrinkability in at least one direction.

It is further preferable, if the first polymer and the second polymer are compatible in recycling. This is advantageous because it also helps in fusing or welding the antislip flexible material with itself with the roughening projections getting between facing antislip flexible material pieces.

It is further preferable, if one or both of a melting temperature and a softening temperature of the first polymer are either lower than or equal to or at most 50° C. degrees higher than a softening temperature of the second polymer. Its advantages include that thereby the softening temperature of the roughening projections can not be very much lower than that of the carrier, which helps to avoid a situation in which a heat used to, for example, fuse or shrink or weld the carrier proves to be excessive for the roughening projections causing an extremely low viscosity in the roughening projections that would possibly lead to the roughening projections losing their desired shape to an undesired extent.

It is further preferable, if an average surface mass of the carrier is less than 500 g/m$^2$ (preferably less than 420 g/m$^2$, more preferably less than 370, or 320, 270, 220, 200, 180, 160, 140, 130, or even 120 g/m$^2$). Advantages of a carrier of a relatively low surface mass include that it needs less heat for its shrinking, fusing, welding etc., and it helps to prevent the roughening projections from being spoiled from the heat.

It is preferable, if at least a majority of the flat-topped roughening projections have a top-plan-view size of at least 30 micrometres and at most 40 millimetres (preferably of at least 40 micrometres and at most 20 millimetres).

It is preferable, if the multiplicity of the roughening projections have an average top-plan-view aspect ratio of at least 1.0 and at most 20.0 (preferably at most 19.0, more preferably at most 18.0, more preferably at most 17.0, more preferably at most 16.0, more preferably at most 15.0, more preferably at most 14.0, more preferably at most 13.0, more preferably at most 12.0, more preferably at most 11.0, more preferably at most 10.0, more preferably at most 9.0, more preferably at most 8.0, more preferably at most 7.0, more preferably at most 6.0, more preferably at most 5.0, more preferably at most 4.0, more preferably at most 3.0, more preferably at most 2.0, even more preferably at most 1.75). Its advantages include that a lower average top-plan-view aspect ratio value provides, in the antislip flexible material, a greater flexibility with a greater isotropy of the flexibility, and (if heat-shrinkable) a greater heat-shrinkability with a greater isotropy of the heat-shrinkability.

It is preferable, if the roughening projections are fixed to the carrier. Its advantages include that it allows a simple and economical way of making.

It is further preferable, if the roughening projections are formed of particles fixed to the carrier.

It is further preferable, if the roughening projections are fixed to the carrier without an essential penetration into the carrier. As used herein, an intermolecular diffusion between the roughening projections and the carrier is not considered to be a penetration into the carrier.

It is further preferable, if the bag or wrap includes a heat bond between the carrier and the roughening projections. Advantages include that the bond is strong and clean and economical to make.

It is further preferable, if the bag or wrap includes a fused bond between the carrier and the roughening projections.

It is further preferable, if the bag or wrap includes a welded bond between the carrier and the roughening projections. Advantages include that it can provide very strong bonds economically.

It is preferable, if the carrier includes a fabric woven from plastic tapes, and the antislip flexible material has at least some roughening projections heat-bonded to the fabric at such places where the fabric has the tapes forming with each other respective overlaps, the fabric being free of a fused bond between the tapes in the overlaps.

It is preferable, if the carrier includes a fabric woven from plastic tapes, the tapes exposed at least in a part of a surface of the carrier, and at least one (preferably: at least some) flat-topped roughening projection has suitable geometric features with respect to the exposed tapes for forming with at least one of the exposed tapes a slip-decreasing mechanical interlock.

It is preferable, if the antislip flexible material is capable of a slip-decreasing mechanical interlock in a shearing direction with a skidproofing material, of an ordinary polypropylene spunbonded nonwoven fabric of an average surface mass of 17 g/m² and filament thickness of between 25 and 30 micrometres, due to the roughening projections having suitable closeness and geometric features with respect to the skidproofing material for forming mechanical bonds with the filaments of the skidproofing material in the shearing direction.

It is further preferable, if a static friction between two specimens of the antislip flexible material, with a specimen of the skidproofing material placed between the specimens of the antislip flexible material, is suitably high to resist sliding in an inclined-plane-type static-friction test of 50 degrees angle (preferably of 55 degrees angle, more preferably of 60 degrees angle, more preferably of 65 degrees angle) according to the TAPPI T 815 standard.

It is further preferable, if the static friction is suitably high to resist the sliding immediately after a preparation, the ice test preparation, the ice test preparation including maintaining in at least the carrier front surface, and the roughening projections, of a first one of the two specimens of the antislip flexible material a third temperature of between −15° C. and −25° C. while exposing the carrier front surface and the roughening projections to air of a temperature of between 0° C. and 4° C. and of a relative humidity of 100% for a preparation time of 3 minutes (preferably of 5 minutes, more preferably of 8 minutes) and the ice test preparation further including providing a second one of the two specimens of the antislip flexible material and the specimen of the skidproofing material of the third temperature.

It is further preferable, if the antislip flexible material has with the skidproofing material an average blocking load less than 200 grams (preferably less than 150 grams, more preferably less than 100 grams, more preferably less than 80 grams, more preferably less than 60 grams) according to the standard ASTM D 3354-96.

It is further preferable, if the skidproofing material, or an other fibrous engaging element with which the antislip flexible material is capable of the slip-decreasing mechanical interlock in the shearing direction, is fixed to the outside of the bag or wrap. The other fibrous engaging element can be any suitable such element, for example (preferably textured) fibre or yarn sections and/or fibre or yarn loops and/or fibres or yarns and/or a net of fibres or yarns suitably fixed to the outside or for example a nonwoven that differs in one or more of its substance, surface mass, filament thickness and production method from the skidproofing material. For example it can be polyethylene or polyester spunlaced nonwoven fabric of an average surface mass of 12 or 22 g/m² and filament thickness of between 18 and 24 micrometres. The important thing is that the other fibrous engaging element comprises fibres of such closeness and layer thickness that between the fibres of the other fibrous engaging element and the roughening projections a mechanical joint can be formed and the antislip flexible material is capable of the slip-decreasing mechanical interlock in the shearing direction with the other fibrous engaging element, due to the roughening projections having suitable closeness and geometric features with respect to the other fibrous engaging element for forming mechanical bonds with the filaments thereof in the shearing direction. The fixing can include a fixing against lifting and peeling and a fixing against slipping, which all can be provided with any suitable means for example with adhering, sticking, taping, welding, fusing, sewing, extrusion laminating etc. Fixing against slipping can further be provided for by providing roughening projections adjacently to the skidproofing material, or the other fibrous engaging element respectively, covered up by the latter.

It is preferable, if the antislip flexible material has with itself an average blocking load less than 200 grams (preferably less than 150 grams, more preferably less than 100 grams, more preferably less than 80 grams, more preferably less than 60 grams, more preferably less than 50 grams, more preferably less than 40 grams, more preferably less than 30 grams) in a modified blocking load test.

It is preferable, if at least a majority of the roughening projections are essentially free of a tackifier.

It is preferable, if the multiplicity of the roughening projections occupy at most 75% (more preferably at most 60%, or 50% or 40%, or 35%, or 30%, or 25%, or 20%, or 17.5%, or 15.0%, or 12.5%, or 10.0%, or even more preferably at most 8.0%) of an area of the antislip flexible material in a top plan view. This is meant on the micro scale, wherein interstices between the roughening projections, where the front surface is exposed, are not considered to be occupied.

It is preferable, if the front surface has respective depressions under the feet of at least some of the flat-topped roughening projections.

It is further preferable, if a depth of the depression is small enough to keep a widest part of the roughening projection above a rest of the front surface in at least one side view of the roughening projection.

In a third aspect, the essence of a method invention is a method for producing an antislip packaging bag or packaging wrap, the bag or wrap according to the second aspect of the invention, including
  forming a packaging bag or packaging wrap at least partly from an antislip flexible material including a flexible carrier,
  providing a front surface of the carrier,
  providing in the antislip flexible material a multiplicity of discrete, solid roughening projections projecting from the front surface and looking toward an outside of the bag or wrap,
  providing a thermoplastic second polymer included in the roughening projections,
  providing the roughening projections essentially free of molecular orientation,
  providing the roughening projections with respective feet, the foot being an end of the roughening projection attaching to the carrier,
  providing the roughening projections with a second contact angle of between 90 and 178 degrees formed with the front surface in at least one side view of the roughening projection,
  the method being new in
  providing at least some of the roughening projections, the flat-topped roughening projections, with a substantially flat top forming an edge at least partially surrounding the substantially flat top.

Definitions and comments as well as objectives and recognition elements and stated advantages used in the first and/or second aspect sections in respect of such terms and expressions and features as we use, or whose analogous variants we use, in this third aspect section are also valid for this third aspect section without further mentioning, unless otherwise specified hereinunder.

The specification allows that the bag or wrap can be formed to be in accordance with any specification allowed in the second-aspect section above. The provided roughening projection is solid, and is provided with a foot attaching to the carrier and it means that the mentioned roughening projections are not hollow and include additional material above the carrier. The definition implies that they are formed other than purely by embossing, i.e., locally pressing the carrier out of its original plane forming on one side a projection and on the other side a corresponding depression. The roughening projections can, in general, be provided or formed with any suitable manufacturing process, they can be made with integrally moulding together with the carrier as well as with mixing added bodies into a material of the carrier during its forming, or fixing (e.g. adhering or fusing or welding etc.) pre-shaped bodies to the front surface etc. It is possible that a flat-topped roughening projection is formed immediately but it is also possible, for example, that first a roughening projection other than flat-topped is formed projecting from the front surface (for example with fixing roughly spherical powder granules to the front surface) and successively it is transformed into a flat-topped roughening projection (for example by contacting its top region with a flat hot release surface while keeping its foot region cold enough for keeping it from melting). The providing of the roughening projections in the antislip flexible material can take place before, and/or during, and/or after the forming of the packaging bag or packaging wrap from the antislip flexible material.

Advantages of the method include that the method is specially adapted for the manufacture of the packaging bag or packaging wrap described in the second aspect section.

Some of the preferred embodiments of the method are analogous with respective particular preferred embodiments of the second-aspect invention mentioned above, based on producing the respective particular preferred embodiments of the second-aspect antislip packaging bags or packaging wraps.

Preferably, the method includes providing at least a majority of the roughening projections as flat-topped roughening projections.

Preferably, the method includes providing in at least some of the flat-topped roughening projections the substantially flat top forming the edge completely surrounding the substantially flat top.

Preferably, the method includes providing the edge essentially forming a circle.

Preferably, the method includes providing in the antislip flexible material an average surface mass of the multiplicity of the discrete roughening projections that is lower than 1.5 times (preferably lower than 1.25 times, more preferably lower than 1.00 times, more preferably lower than 0.75 times, even more preferably lower than 0.60 times) an average surface mass of the carrier.

Preferably, the method includes providing the multiplicity of the discrete roughening projections with a random distribution in a top plan view of the antislip flexible material.

Preferably, the method includes providing the flat-topped roughening projections with random top-plan-view sizes.

Preferably, the method includes providing the flat-topped roughening projections with random orientations in a top plan view of the antislip flexible material.

Preferably, the method includes providing in at least one side view of at least some flat-topped roughening projections at least one part, of a contour line of the roughening projection, connecting the foot and the edge, that is convex from outside.

Preferably, the method includes providing the at least one contour line part strictly convex from outside.

Preferably, the method includes providing in at least one side view of at least some flat-topped roughening projections a ratio of a width of the substantially flat top to a foot width between 0.50 and 1.24. (Preferably from 0.8 to 1.24, more preferably from 0.9 to 1.24, more preferably from 1 to 1.24, more preferably from 1 to 1.20, more preferably from 1 to 1.18, more preferably from 1 to 1.15, even more preferably from 1 to 1.10.)

Preferably, the method includes providing in at least some of the flat-topped roughening projections an area of the foot that is essentially equal to, or smaller than, an area of the substantially flat top.

Preferably, the method includes providing the area of the foot smaller than the area of the substantially flat top.

Preferably, the method includes providing an edge angle, formed by the edge and being an angle, measured through the roughening projection, closed between the substantially flat top and a mantle surface extending from the edge to the foot.

Preferably, the method includes providing at least some of the flat-topped roughening projections with the edge angle essentially equal to, or smaller than, 90 degrees, in at least one side view of the roughening projection.

Preferably, the method includes the edge angle being smaller than 90 degrees (preferably smaller than 87 degrees, more preferably smaller than 84 degrees, more preferably smaller than 81 degrees, more preferably smaller than 78 degrees). On the other hand, it can be selected to be greater than 30 degrees to provide a suitable strength of the edge.

Preferably, the method includes providing at least one side view of at least some flat-topped roughening projections tapering from the top surface edge to the foot.

Preferably, the method includes providing each side view tapering from the top surface edge to the foot.

Preferably, the method includes providing the side view strictly tapering from the top surface edge to the foot.

Preferably, the method includes providing the flat-topped roughening projections projecting from their respective feet to respective projection heights and having respective smallest top-plan-view extents and providing within at least a majority of the flat-topped roughening projections a coefficient of variation of the smallest top-plan-view extents greater than a coefficient of variation of the projection heights.

Preferably, the method includes providing the coefficient of variation of the smallest top-plan-view extents at least 1.15 times (preferably at least 1.2 times, more preferably at least 1.3 times, more preferably at least 1.4 times, more preferably at least 1.5 times, more preferably at least 1.6 times, more preferably at least 1.7 times, more preferably at least 1.8 times, more preferably at least 1.9 times, more preferably at least 2.0 times) the coefficient of variation of the projection heights.

Preferably, the method includes providing, in at least some of the flat-topped roughening projections, a smallest top-plan-view extent of the roughening projection equalling at least 1.75 times (preferably at least 1.8 times, more preferably at least 1.9 times, more preferably at least 2.0 times, more preferably at least 2.1 times) the projection height.

Preferably, the method includes providing tops of at least a majority of the flat-topped roughening projections essentially in alignment along a plane parallel with a general plane of the front surface.

Preferably, the method includes providing at least some of the flat-topped roughening projections with a hidden surface portion being a portion of an outer surface of the roughening projection which the roughening projection covers from a viewer in a top plan view of the antislip flexible material taken from above the roughening projections.

Preferably, the method includes providing the at least some of the flat-topped roughening projections with at least one undercut and with at least one area immediately above the undercut, providing the roughening projection so dimensioned as to form a separation between the at least one area and the front surface which is greater than 10 micrometres (preferably greater than 12 micrometres, more preferably greater than 15 micrometres, more preferably greater than 20 micrometres).

Preferably, the method includes providing the second polymer with a melt mass flow rate of 0.1 to 300 g/10 min (preferably 0.1 to 250 g/10 min, more preferably 0.1 to 200 g/10 min, more preferably 0.1 to 150 g/10 min, more preferably 0.1 to 100 g/10 min, more preferably 0.1 to 80 g/10 min, more preferably 0.1 to 60 g/10 min, more preferably 0.1 to 40 g/10 min, more preferably 0.1 to 30 g/10 min, more preferably 0.1 to 20 g/10 min, more preferably 0.1 to 10 g/10 min) determined at 190° C. under a load of 2.16 kg in accordance with ISO 1133-1. Aforementioned advantages could be provided with selecting even higher melt mass flow rate values in the lower limit of the value range (for example 0.5 or 1.0 or 1.5 or even 2.0 g/10 min).

Preferably, the method includes providing the carrier at least partly including a thermoplastic first polymer.

Preferably, the method includes the thermoplastic first polymer of the carrier being suitable to be welded or fused for one or both of a forming and a closing of the bag or wrap.

Preferably, the method includes providing the carrier at least partly including a heat shrinkable layer including the thermoplastic first polymer.

Preferably, the method includes providing in the heat shrinkable layer a heat shrinkability of at least 5% (preferably at least 10%, more preferably at least 15%, more preferably at least 20%).

Preferably, the method includes the first polymer and the second polymer being compatible in recycling.

Preferably, the method includes providing one or both of a melting temperature and a softening temperature of the first polymer either lower than or equal to or at most 50° C. degrees higher than a softening temperature of the second polymer.

Preferably, the method includes providing an average surface mass of the carrier less than 500 g/m$^2$ (preferably less than 420 g/m$^2$, more preferably less than 370, or 320, 270, 220, 200, 180, 160, 140, 130, or even 120 g/m$^2$).

Preferably, the method includes providing at least a majority of the flat-topped roughening projections with a top-plan-view size of at least 30 micrometres and at most 40 millimetres (preferably of at least 40 micrometres and at most 20 millimetres).

Preferably, the method includes providing in the multiplicity of the roughening projections an average top-plan-view aspect ratio of at least 1.0 and at most 20.0 (preferably at most 19.0, more preferably at most 18.0, more preferably at most 17.0, more preferably at most 16.0, more preferably at most 15.0, more preferably at most 14.0, more preferably at most 13.0, more preferably at most 12.0, more preferably at most 11.0, more preferably at most 10.0, more preferably at most 9.0, more preferably at most 8.0, more preferably at most 7.0, more preferably at most 6.0, more preferably at most 5.0, more preferably at most 4.0, more preferably at most 3.0, more preferably at most 2.0, even more preferably at most 1.75).

Preferably, the method includes providing the roughening projections fixed to the carrier.

Preferably, the method includes providing the roughening projections formed of particles fixed to the carrier. For example, pre-shaped cup shaped solid particles can be adhered to the front surface with a lacquer that can be crosslinked with ultraviolet irradiation.

Preferably, the method includes providing the roughening projections fixed to the carrier without an essential penetration into the carrier.

Preferably, the method includes providing a heat bond between the carrier and the roughening projections. For example, a paper carrier can be provided with roughening projections made of a second polymer that is otherwise suitable for use in an extrusion coating operation for coating the paper (for example a copolymer including acrylic acid).

Preferably, the method includes providing a fused bond between the carrier and the roughening projections.

Preferably, the method includes providing a welded bond between the carrier and the roughening projections.

Preferably, the method includes providing the carrier including a fabric woven from plastic tapes, and providing the antislip flexible material with at least some roughening projections heat-bonded to the fabric at such places where the fabric has the tapes forming with each other respective overlaps, keeping the fabric free of a fused bond between the tapes in the overlaps.

Preferably, the method includes providing the carrier including a fabric woven from plastic tapes, the tapes exposed at least in a part of a surface of the carrier, and providing at least one (preferably: at least some) flat-topped roughening projection with suitable geometric features with respect to the exposed tapes for forming with at least one of the exposed tapes a slip-decreasing mechanical interlock.

Preferably, the method includes providing the antislip flexible material capable of a slip-decreasing mechanical interlock in a shearing direction with a skidproofing material, of an ordinary polypropylene spunbonded nonwoven fabric of an average surface mass of 17 g/m$^2$ and filament thickness of between 25 and 30 micrometres, due to the roughening projections being provided with suitable closeness and geometric features with respect to the skidproofing material for forming mechanical bonds with the filaments of the skidproofing material in the shearing direction.

Preferably, the method includes providing a static friction between two specimens of the antislip flexible material, with a specimen of the skidproofing material placed between the specimens of the antislip flexible material, suitably high to resist sliding in an inclined-plane-type static-friction test of 50 degrees angle (preferably of 55 degrees angle, more preferably of 60 degrees angle, more preferably of 65 degrees angle) according to the TAPPI T 815 standard.

Preferably, the method includes providing the static friction suitably high to resist the sliding immediately after a preparation, the ice test preparation, the ice test preparation including maintaining in at least the carrier front surface, and the roughening projections, of a first one of the two specimens of the antislip flexible material a third temperature of between −15° C. and −25° C. while exposing the carrier front surface and the roughening projections to air of a temperature of between 0° C. and 4° C. and of a relative humidity of 100% for a preparation time of 3 minutes (preferably of 5 minutes, more preferably of 8 minutes) and the ice test preparation further including providing a second one of the two specimens of the antislip flexible material and the specimen of the skidproofing material of the third temperature.

Preferably, the method includes providing the antislip flexible material having with the skidproofing material an average blocking load less than 200 grams (preferably less than 150 grams, more preferably less than 100 grams, more preferably less than 80 grams, more preferably less than 60 grams) according to the standard ASTM D 3354-96.

Preferably, the method includes providing the skidproofing material, or an other fibrous engaging element with which the antislip flexible material is capable of the slip-decreasing mechanical interlock in the shearing direction, fixed to the outside of the bag or wrap.

Preferably, the method includes providing the antislip flexible material having with itself an average blocking load less than 200 grams (preferably less than 150 grams, more preferably less than 100 grams, more preferably less than 80 grams, more preferably less than 60 grams, more preferably less than 50 grams, more preferably less than 40 grams, more preferably less than 30 grams) in a modified blocking load test.

Preferably, the method includes providing at least a majority of the roughening projections essentially free of a tackifier.

Preferably, the method includes providing the multiplicity of the roughening projections occupying at most 75% (more preferably at most 60%, or 50% or 40%, or 35%, or 30%, or 25%, or 20%, or 17.5%, or 15.0%, or 12.5%, or 10.0%, or even more preferably at most 8.0%) of an area of the antislip flexible material in a top plan view. This is meant on the micro scale, wherein interstices between the roughening projections, where the front surface is exposed, are not considered to be occupied.

Preferably, the method includes providing in the front surface respective depressions under the feet of at least some of the flat-topped roughening projections.

Preferably, the method includes providing a depth of the depression small enough to keep a widest part of the roughening projection above a rest of the front surface in at least one side view of the roughening projection.

In a fourth aspect, the essence of a method invention is a packaging method using an antislip packaging bag or packaging wrap, the method including providing contents, and providing at least one antislip packaging bag or packaging wrap, and packing the contents with the at least one antislip packaging bag or packaging wrap, for forming at least one package, the method being new in
providing the at least one antislip packaging bag or packaging wrap according to the second aspect of the invention, including any of its preferred embodiments.

Definitions and comments as well as objectives and recognition elements and stated advantages used in the first and/or second and/or third aspect sections in respect of such terms and expressions and features as we use, or whose analogous variants we use, in this fourth aspect section are also valid for this fourth aspect section without further mentioning, unless otherwise specified hereinunder.

The product which is made directly by the method, i.e., the at least one package, can be, for example one or more packages packed with the antislip packaging bags or packaging wraps or, for example, one or more stacks of such packages, piled up, for example, on one or more pallets and/or on a floor and/or in a vehicle and/or in a vessel, optionally including suitable stack covers, for example, stretch hoods or stretch wraps or shrink hoods or shrink wraps as well. The bag or wrap can be formed before (e.g., individual-bag-packaging, form-fill-seal bag packaging), or during and/or after (e.g., timber wrapping, stretch-hooding, stretch-wrapping, shrink-hooding) the packing. The suitable contents can mean any contents suitable to be packed with the provided antislip packaging bag or packaging wrap, for example, having suitable size, shape, quantity, weight etc. for the purpose. The most critical products that may need antislip packaging bags include, for example, frozen food, fine dusty products like cement and flour, easily flowing hard granules like quartz sand and blast abrasives, lightweight powders like perlite and fly ash, and further products like rice, seeds, food- and feed ingredients, hazardous goods etc. The most critical products that may need antislip packaging wraps include timber, drink cans, and any applications in which flexible collating wraps can be used for collating instead of traditionally used carton boxes (for example hygiene products etc.).

Advantages of the method origin from the advantages of the packaging material used.

Preferably, in the method, the contents include any one or both of a.) a product of powder form containing particles of a size which is smaller than 250 micrometres (preferably smaller than 200 micrometres, more preferably smaller than 150 micrometres, more preferably smaller than 100 micrometres, more preferably smaller than 75 micrometres, more preferably smaller than 50 micrometres) and b.) frozen food. The product of powder form at least partly consists of particles smaller than the mentioned size and it can further suitably include other particles or anything else. The significance of the feature is based on the fact that at packing up such products the fine dust content can get airborne and settle on the packages, possibly filling up the front surface around the roughening projections. The same is the situation with the white frost possibly settling on the frozen food packages.

Preferably, the method includes providing the at least one antislip packaging bag or packaging wrap according to any of the bag or wrap product embodiments, of the second aspect, including the bag or wrap, wherein in at least some of the flat-topped roughening projections an area of the foot is essentially equal to, or smaller than, an area of the substantially flat top, especially where the area of the foot is smaller than the area of the substantially flat top, and/or wherein at least some of the flat-topped roughening projections have the edge angle essentially equal to, or smaller than, 90 degrees, in at least one side view of the roughening projection, especially where the edge angle is smaller than 90 degrees, and/or wherein at least one side view of at least some flat-topped roughening projections tapers from the top surface edge to the foot, especially where each side view tapers from the top surface edge to the foot and/or where the side view strictly tapers from the top surface edge to the foot, and/or wherein the at least some of the flat-topped roughening projections have at least one undercut and include at least one area immediately above the undercut, the roughening projection being so dimensioned as to form a separation between the at least one area and the front surface which is greater than 10 micrometres, and/or wherein the antislip flexible material is capable of a slip-decreasing mechanical interlock in a shearing direction with a skidproofing material, of an ordinary polypropylene spunbonded nonwoven fabric of an average surface mass of 17 g/m² and filament thickness of between 25 and 30 micrometres, due to the roughening projections having suitable closeness and geometric features with respect to the skidproofing material for forming mechanical bonds with the filaments of the skidproofing material in the shearing direction, especially where a static friction between two specimens of the antislip flexible material, with a specimen of the skidproofing material placed between the specimens of the antislip flexible material, is suitably high to resist sliding in an inclined-plane-type static-friction test of 50 degrees angle according to the TAPPI T 815 standard, and particularly where the static friction is suitably high to resist the sliding immediately after a preparation, the ice test preparation, the ice test preparation including maintaining in at least the carrier front surface, and the roughening projections, of a first one of the two specimens of the antislip flexible material a third temperature of between −15° C. and −25° C. while exposing the carrier front surface and the roughening projections to air of a temperature of between 0° C. and 4° C. and of a relative humidity of 100% for a preparation time of 3 minutes and the ice test preparation further including providing a second one of the two specimens of the antislip flexible material and the specimen of the skidproofing material of the third temperature, and/or especially where the antislip flexible material has with the skidproofing material an average blocking load less than 200 grams according to the standard ASTM D 3354-96, and/or especially where the skidproofing material, or an other fibrous engaging element with which the antislip flexible material is capable of the slip-decreasing mechanical interlock in the shearing direction, is fixed to the outside of the bag or wrap.

The advantage of the combinations comes from the mentioned bag or wrap product features being especially advantageous if used under icy or dusty circumstances.

Preferably, in the method, the contents include frozen food.

More preferably, in the method, the packing takes place aboard a vessel.

This combination gives a special significance to the invention because the storage room in a vessel (for example, a fishing vessel at sea) can be tilted by the waves creating a strong need for a good antislip packaging while the frozen food contents in combination with the usually high air relative humidity, aboard vessels, involve the factor of frost precipitating on the bags, as mentioned earlier.

More preferably, the method includes
providing blocks of plate-frozen seafood as the contents, and
providing at least two, first and second, of the antislip packaging bags according to the product embodiment, of the second aspect, wherein the skidproofing material, or an other fibrous engaging element with which the antislip flexible material is capable of the slip-decreasing mechanical interlock in the shearing direction, is fixed to the outside of the bag or wrap, and
packing the blocks into the bags for forming a first package including the first bag and one or more blocks packed therein and a second package including the second bag and one or more blocks packed therein,
the first and second packages being suitable to pass a stack tilting test without sliding on each other during the stack tilting test,
wherein the stack tilting test includes
providing a horizontal stacking base,
forming a stack from the first and second packages including
laying the first package on the horizontal stacking base and
at least partly placing the second package upon the first package, with their centres of mass above each other, and with the skidproofing material, or the other fibrous engaging element with which the antislip flexible material is capable of the slip-decreasing mechanical interlock in the shearing direction, fixed to the outside of the first bag providing the slip-decreasing mechanical interlock in the shearing direction with the antislip flexible material of the second bag, and
tilting the stacking base into a slanting orientation closing with the horizontal an angle of 35 degrees (preferably an angle of 45 degrees), and
immediately thereafter turning the stacking base back to horizontal.

As used herein, seafood includes fish and other seafood caught, for example, at sea. Plate freezing is known to be one of the fastest freezing methods, useful for freezing the catch on board of a fishing boat as fast as possible. As it is known, a plate-frozen block of seafood has a characteristic flat shape, its flat top and bottom surfaces defined by the planar and parallel freezing plates between which the seafood was kept compressed while frozen. Such flat-shaped frozen blocks, of a typical height of about 10 cm, can be readily stacked upon each other with an essentially horizontal orientation of the blocks. During the packing, into each bag one or more blocks can be placed, and the bag is preferably suitably closed, for example by sewing and/or taping and/or fusing. The provided bags are suitable (i.e., are antislip enough) to result such packages as are suitable to pass a stack tilting test without sliding on each other during the stack tilting test. As used herein, sliding means starting to slide and sliding until a hit. We note that the packages are considered to be suitable to pass a stack tilting test without sliding on each other, for example, if the second package starts to slide on the first package and thereafter it finally stops purely due to shear forces acting between the packages. As it is defined above, the stack tilting test virtually includes putting the two packages on top of each other, with their mating antislip surfaces in a suitable engagement against slipping and exposing the assembly to a temporary 35-degree tilting, which simulates an effect of sea waves on the storage room in a vessel. In the stack tilting test, the second package is placed upon the first package with their centres of mass above each other, which means that their respective centres of mass define a vertical line. In further respects of the stack tilting test we refer to the standard TAPPI T 815. A suitable selection can be achieved, by the skilled person, for example by trial end error. For example, if the selected packages do not pass the stack tilting test then one could decrease a filling weight in the bags, or improve the antislip performance of the bags as taught in the second aspect section. For example, a larger piece of the skidproofing material, or of the other fibrous engaging element, could be applied and/or a larger surface part of the bags could be provided with the roughening projections on the macro scale and/or a closeness and/or geometry of the roughening projections could be changed in order of a stronger slip-decreasing mechanical interlock in the shearing direction.

More preferably, in the method, the first and second packages are suitable to pass two successively performed stack tilting tests without sliding on each other during any one of the stack tilting tests where immediately between the stack tilting tests the second package is pulled with a horizontal speed off the first package.

This feature expresses that the packages do not lose too much of their mutual antislip performance even if the second package is dragged, with an at least partly horizontal pulling force, on the flat top of the first package until it is pulled off from the first package. For the pulling off, one tilts the top package to stand it onto its edge otherwise it could be too difficult or impossible to slide it. To make bags suitable for such packages, the skilled person should provide a sufficient number of roughening projections in the surface of the second bag as well as a sufficient strength of the roughening projections against breaking off or getting deformed, in order to provide a suitable number of roughening projections surviving that the second package is pulled off the first package. The skilled person should follow the principle that it is better to break the filaments of the skidproofing material, or of the other fibrous engaging element, than to break the roughening projections, during the pulling-off. Namely, the skidproofing material or the other fibrous engaging element, in practice, can have much more free filaments available for engagement with roughening projections than the number of roughening projections, in the second bag, available for forming the mechanical bonds with the filaments. Therefore, the number of possible "roughening-projection—filament" elementary engagements is virtually limited by the number of available roughening projections. Therefore, if some or many of the filaments break during the pulling-off there is not a big problem as long as many-enough of the roughening projections remain useful.

The advantages of providing such packages include that such packages can better meet the needs arising on a fishing vessel. Namely, a stack of block frozen packages typically gets manually re-stacked at least once because of the special logistics in the fishing industry, and since the packages are hard and block-shaped (unlike, for example, bag packages of individually quick frozen green peas), they can not be rolled off each other but they must be either lifted up, vertically, or pulled off, horizontally, from each other. That is what involves the mentioned pulling-off operation.

Further, preferably, the method includes at least partly heat shrinking the packaging bag or packaging wrap around the contents. This can happen with a heat blowing gun and/or in a heating tunnel and/or with any other suitable means. The bag or wrap, as we mentioned, can, for example, be of a film or a fabric. The term at least partly, as used herein, means that one or more parts of the packaging bag or packaging wrap can be left un-shrunk and further, one or more parts of the packaging bag or packaging wrap can be heat shrunk less than would be possible based on a heat shrinking capability of the packaging bag or packaging wrap.

Further, preferably, the method includes a stacking of the at least one package. The stacking can include piling up the packages on a floor or ground and/or in a vehicle and/or in a vessel and/or on one or more pallets or similar means of storage and transport. The stacking can include applying the stacks in plural layers of stacks, for example with putting a stack on top of other stack(s). The stacking is preferably configured in a way suitable to exploit antislip features provided in the packages for providing mutual contacts of a decreased slip, between at least some of respective packages contacting each other in the stack. The stacking can further include applying suitable stack covers, for example, stretch hoods or stretch wraps or shrink hoods or shrink wraps.

BRIEF DESCRIPTION OF THE DRAWINGS

FIG. 19a shows a phase of the aforementioned background-art automatic bag 3 placing process in which a vacuum head 78 approaches, from above, a bag mouth 5 of a top bag 3 in a stack of empty layflat bags 3. FIG. 19b shows a subsequent phase of the same process in which the vacuum head 78 has picked up the bag mouth 5 of the top bag 3 and starts to pull it off the other bags 3. FIG. 19c shows a subsequent phase of the same process in which the vacuum head 78 has pulled the top bag 3 off the other bags 3.

FIG. 20a shows a phase of the aforementioned automatic bag 3 placing process in which a vacuum head 78 approaches, from above, a bag mouth 5 of a top bag 3 in the stack of empty bags 3. FIG. 20b shows a subsequent phase of the same process in which the vacuum head 78 has picked up the bag mouth 5 of the top bag 3 and starts to pull it off the other bags 3. FIG. 20c shows a subsequent phase of the same process in which the vacuum head 78 has partly pulled the top bag 3 off the other bags 3. FIG. 20d shows a subsequent phase of the same process in which the vacuum head 78 has pulled the top bag 3 off the other bags 3.

FIG. 21a shows a phase of the aforementioned automatic bag 3 placing process in which a vacuum head 78 approaches, from above, a bag mouth 5 of a top bag 3 in the stack of empty bags 3. FIG. 21b shows a subsequent phase of the same process in which the vacuum head 78 has picked up the bag mouth 5 of the top bag 3 and starts to pull it off the other bags 3. FIG. 21c shows a subsequent phase of the same process in which the vacuum head 78 has partly pulled the top bag 3 off the other bags 3. FIG. 21d shows a subsequent phase of the same process in which the vacuum head 78 has pulled the top bag 3 off the other bags 3.

FIG. 22a shows a phase of the aforementioned automatic bag 3 placing process in which a vacuum head 78 approaches, from above, a bag bottom 4 of a top bag 3 in the stack of empty bags 3. FIG. 22b shows a subsequent phase of the same process in which the vacuum head 78 has picked up the bag bottom 4 of the top bag 3 and a separating sheet 70 is started to be inserted, pulled in from the direction of the bag bottom 4, under the top bag 3. FIG. 22c shows a subsequent phase of the same process in which the separating sheet 70 is fully inserted under the top bag 3.

DETAILED DESCRIPTION

Examples

Example 1: Apparatuses

Figure 1:
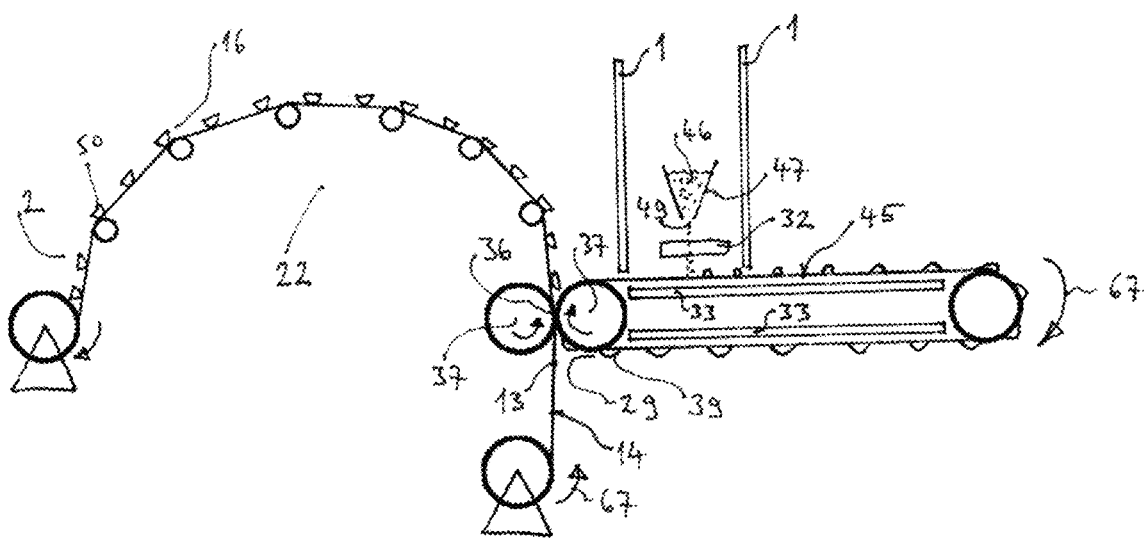
FIG. 1. is a schematic side view of an apparatus for forming an antislip flexible material.
Figure 2:
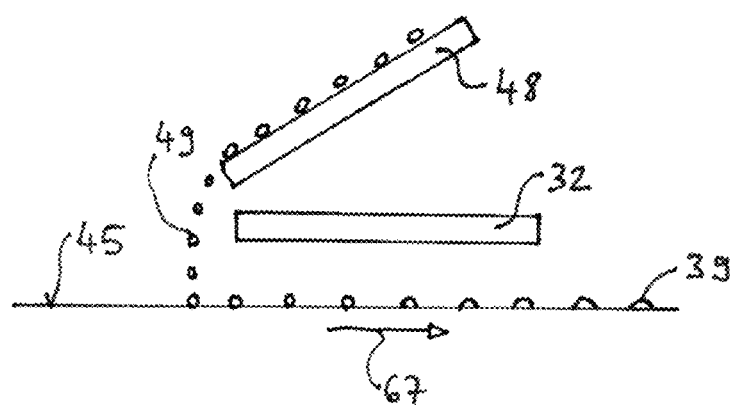
FIG. 2. is a schematic side view of a powder applicator.
Figure 3:
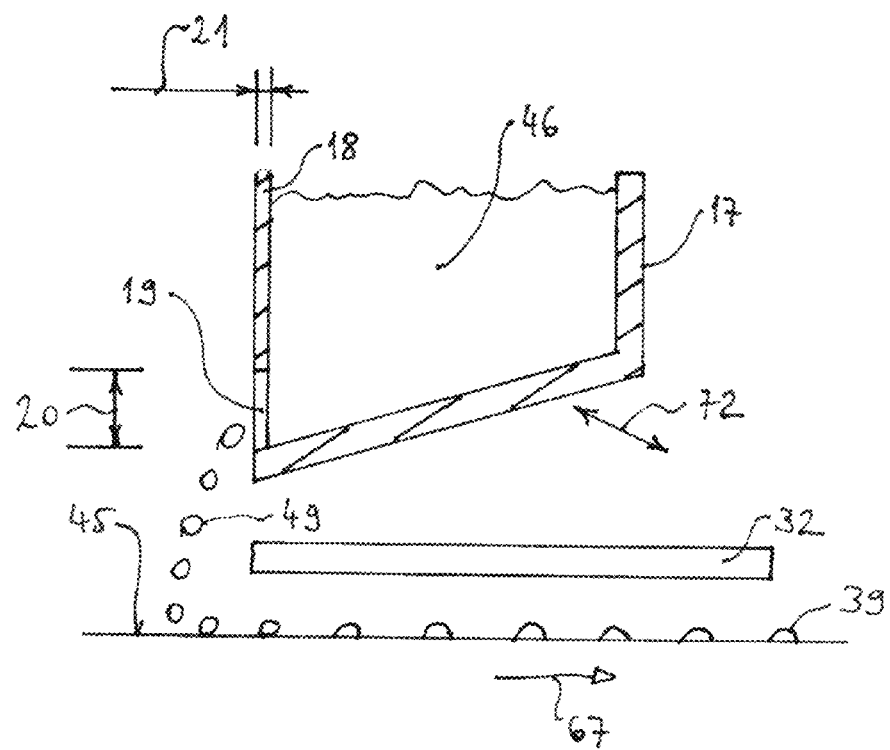
FIG. 3. is a schematic side section of a powder applicator.
Figure 4:
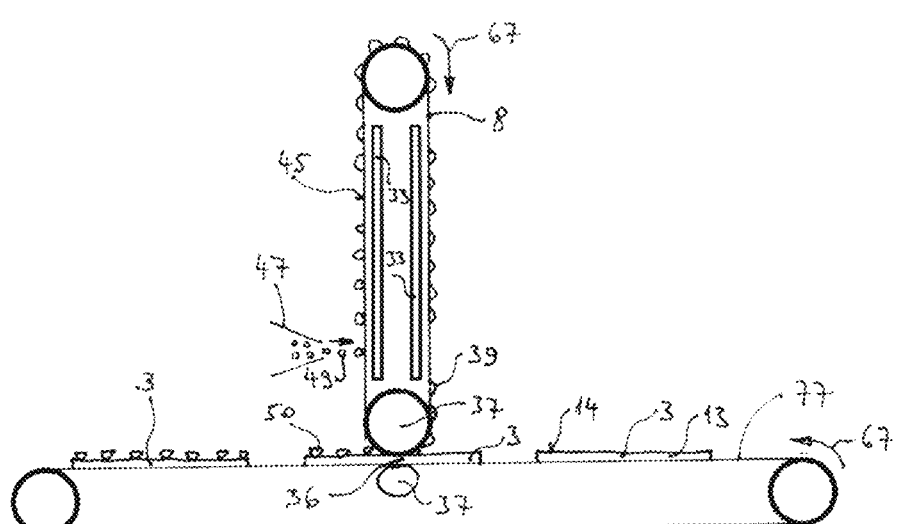
FIG. 4. is a schematic side view of an apparatus for forming an antislip flexible material.
Figure 5:
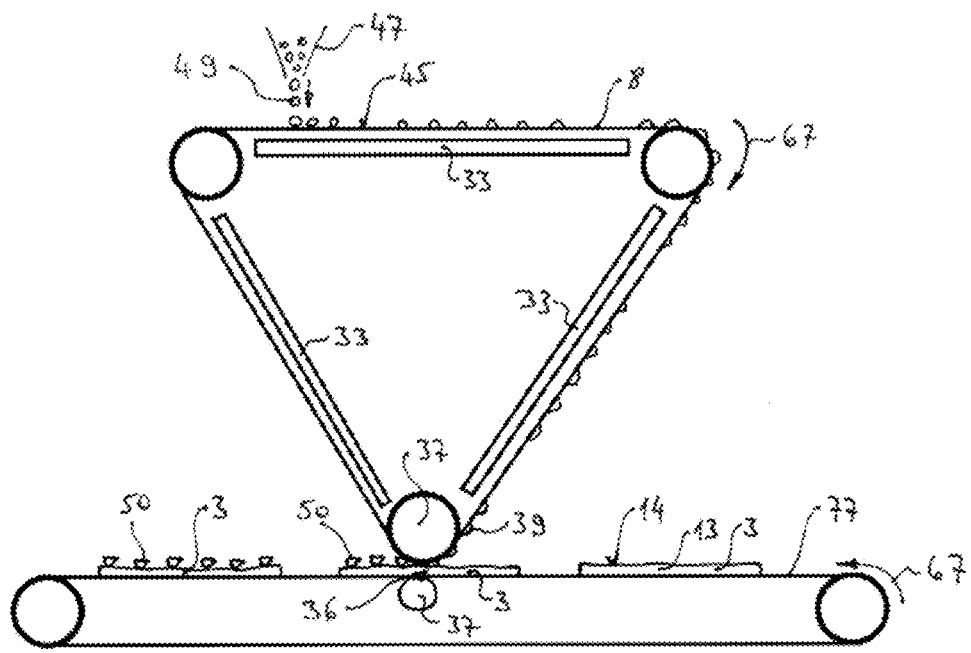
FIG. 5. is a schematic side view of an apparatus for forming an antislip flexible material.
Figure 6:
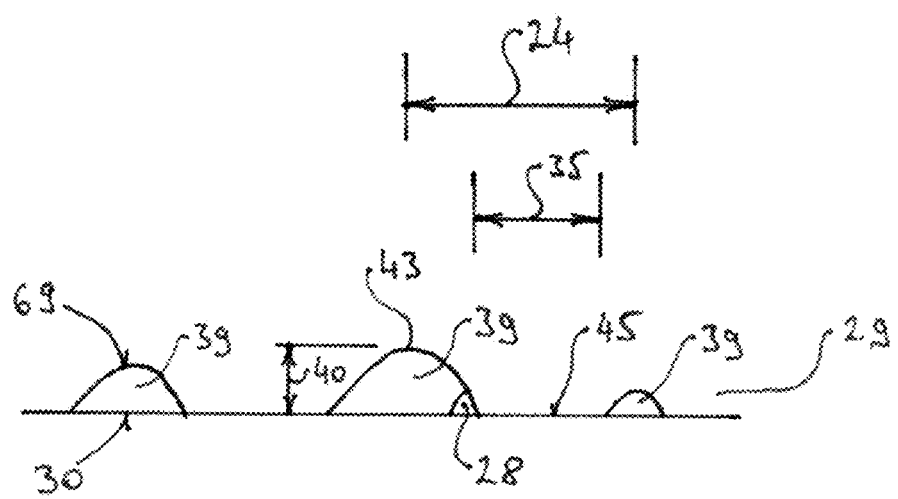
FIG. 6. is a side view of a provided first layer.
Figure 7:
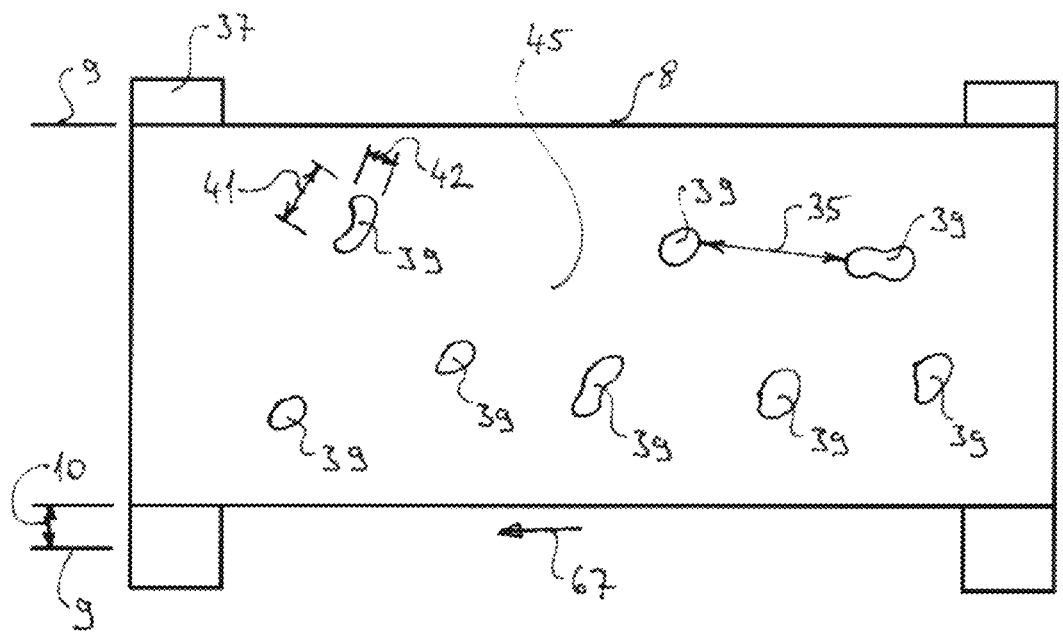
FIG. 7. is a top view of a provided first layer on the release surface belt.
Figure 8:
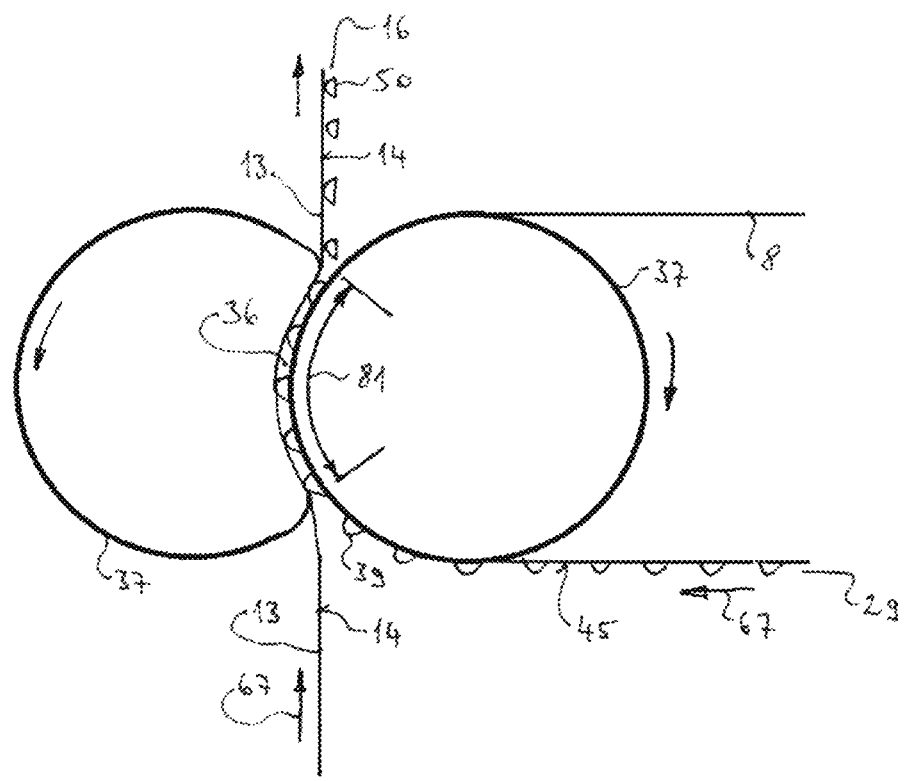
FIG. 8. is a schematic side view of a part of an apparatus for forming an antislip flexible material.
Figure 9:
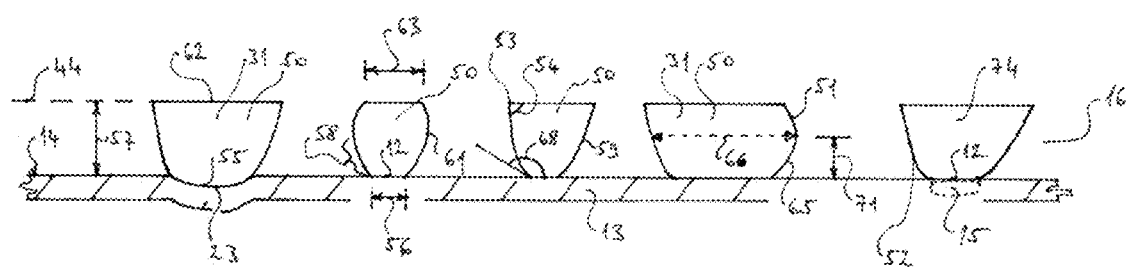
FIG. 9. is a side view of an antislip flexible material.
Figure 10:
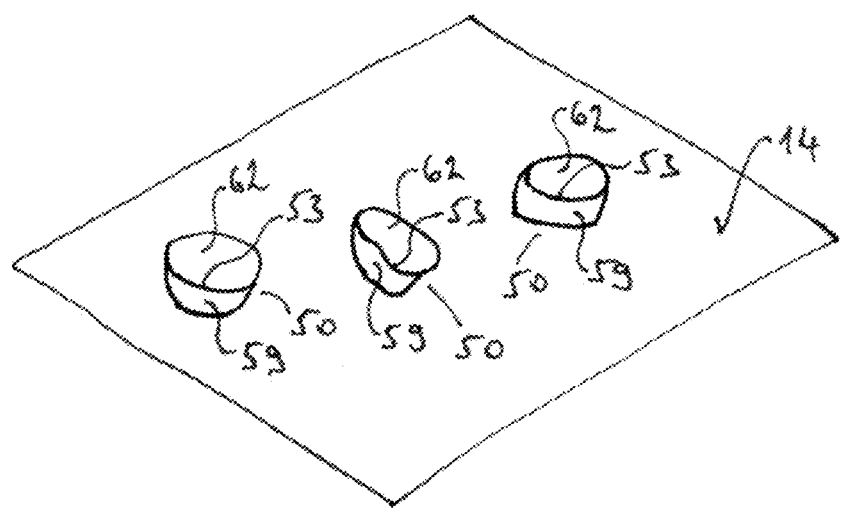
FIG. 10. is a perspective view of an antislip flexible material.
Figure 11:
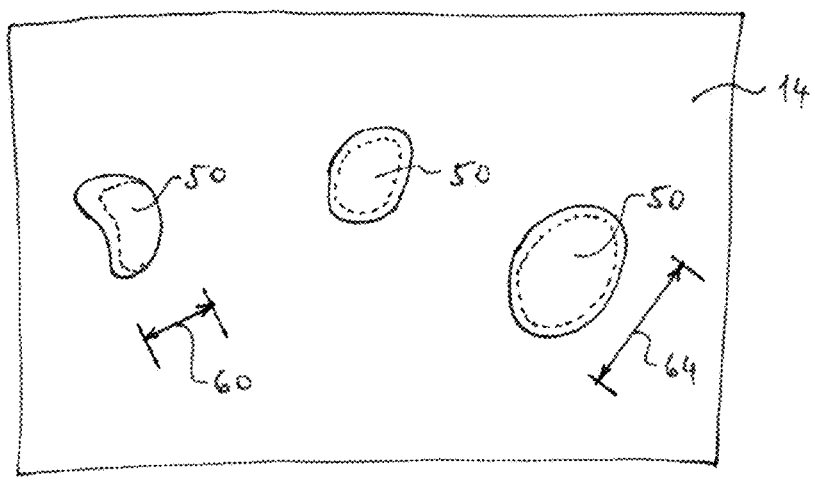
FIG. 11. is a top view of an antislip flexible material.
Figure 12A:
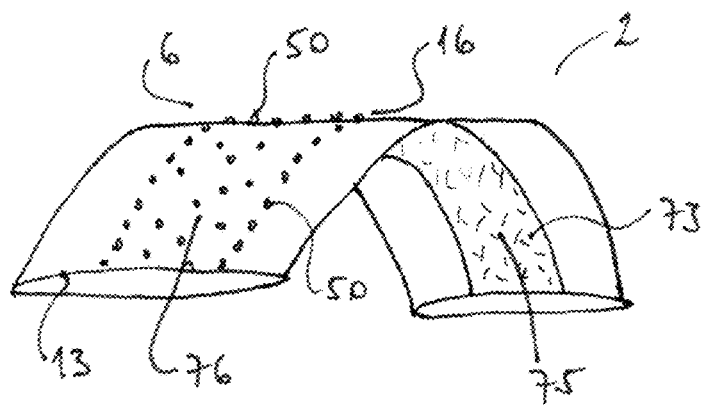
FIG. 12a. is a perspective view of an antislip flexible material.
Figure 12B:
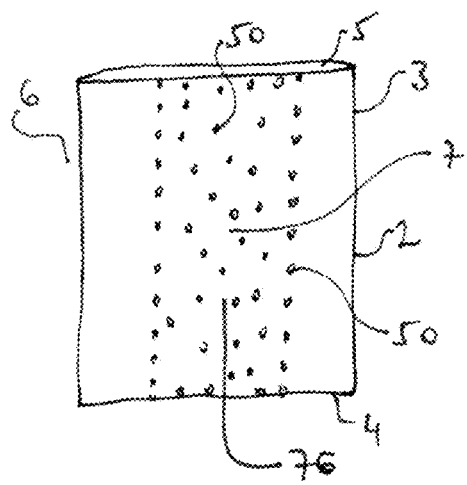
FIG. 12b. is a perspective view of a packaging bag of an antislip flexible material.
Figure 12C:
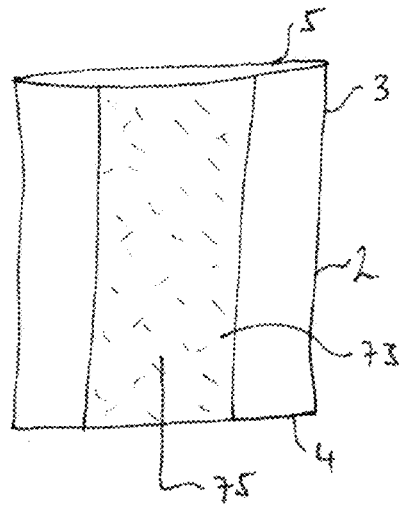
FIG. 12c. is a perspective view of a packaging bag of an antislip flexible material.
Figure 12D:
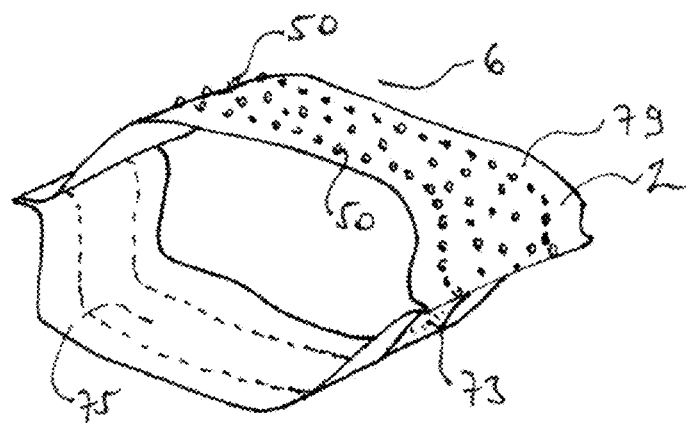
FIG. 12d. is a perspective view of a packaging wrap of an antislip flexible material.
Figure 12E:
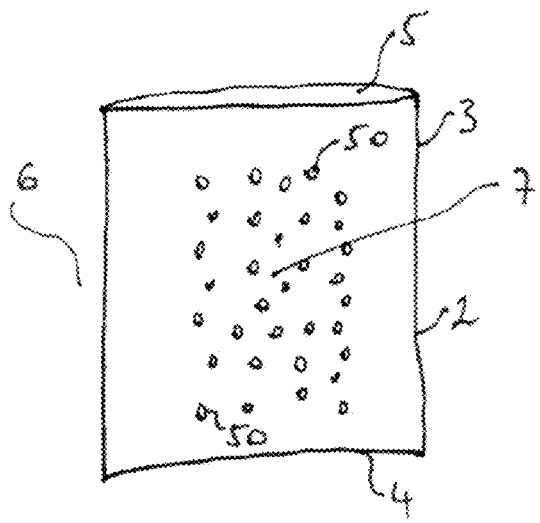
FIG. 12e. is a perspective view of a packaging bag of an antislip flexible material.
Figure 12F:
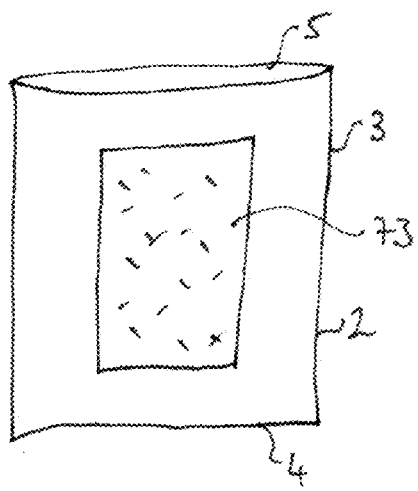
FIG. 12f. is a perspective view of a packaging bag of an antislip flexible material.
Figure 12G:
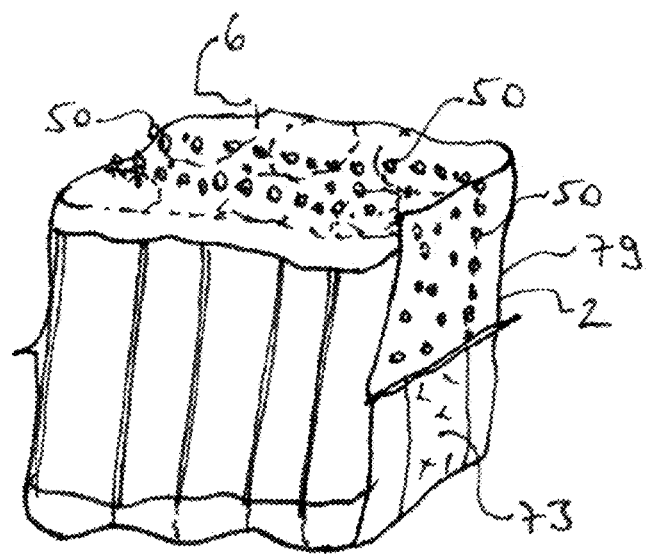
FIG. 12g. is a perspective view of a packaging wrap of an antislip flexible material.
Figure 13:
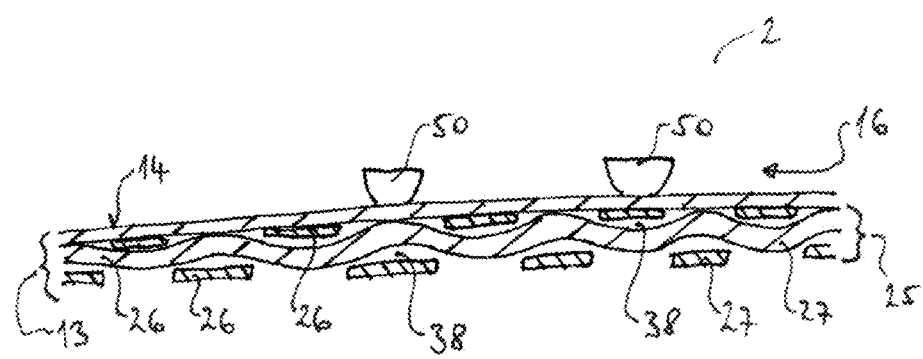
FIG. 13. is a side view of an antislip flexible material.

See the Figures, particularly FIGS. 1-5, 7 and 8. The apparatus of FIG. 1. includes a polytetrafluoroethylene (PTFE)-coated glass fabric belt 8 whose outer surface constitutes the release surface 45. There are heating panels 33 for heating the opposite, inner surface of the belt 8. Above the belt 8 there is a powder applicator 47 suitable to apply polymer powder 46 onto the hot release surface 45. The powder applicator 47 can be, for example, a scatter coater unit. The powder applicator 47, in general, can preferably include a horizontal sieve, shaken preferably in a direction parallel with the running direction 67 of the belt 8, for an even distributing of the powder granules 49 on the belt 8 (not shown). The belt 8 is driven around rolls, one of the rolls, a nip roll 37 forming a nip 36 with another nip roll 37. The two nip rolls 37 are suitable to precisely compress the release surface 45 and the carrier 13 in the nip 36 between them. The carrier 13 is unwound from a reel and rewound onto another reel, and passes the nip 36 and a cooling unit 22 in-between. (Alternatively, an inline operation is possible with other processing machines before and/or after the apparatus; not shown.) The cooling unit 22 is a set of rolls supporting the carrier 13 without touching its front surface 14. The belt 8 is made to revolve in a belt 8 running direction 67 and the carrier 13 is pulled with the same speed in a carrier 13 running direction 67. The powder applicator 47 applies powder granules 49 of the second polymer onto the hot release surface 45. By the time the powder granules 49 reach the nip 36, they are formed into discrete particles 39, tacky from being hot. In the nip 36, the particles 39 are transferred to the carrier front surface 14 and bonded to the front surface 14, while cooled to solidify, in the cooling unit 22 before the rewinding. Because of the small distance between the hot release surface 45 and the powder applicator 47, the powder applicator 47 can be provided with a heat shield 32 below the powder applicator 47. The heat shield 32 could be two cross directionally arranged rows of staggered brass tubes connected to a cooling fluid. There are air shield walls 1 protecting the powder applicator 47 from hot air draft from the direction of the release surface 45. FIG. 2. shows a possible embodiment of the powder applicator 47. A heat shield 32 (a fluid cooled plate) separates a powder conveyor 48 and the release surface 45. The powder 46 comes down on the powder conveyor 48. The powder conveyor 48 can, for example, be a belt conveyor, or a stationary surface or a surface that is shaken. FIG. 3. shows another possible embodiment of the powder applicator 47, in side section. It includes a container 17 whose wall 18 has one or more openings 19 in it. The one or more openings 19 can be a continuous gap, or one or more shaped, for example, circular, orifices. The powder 46 is contained in the container 17 and fed onto the release surface 45 through the opening 19. The opening 19 has an opening size 2 preferably significantly greater than a thickness 21 of the wall 18. The container 17 can optionally be shaken, for example in the shown shaking direction 72. There can be a heat shield 32 under the container 17. FIG. 4. shows another possible embodiment of the apparatus. The belt 8 is arranged in a vertical orientation, with the nip 36 at its lower end. The powder applicator 47 applies, virtually sticks, the powder 46 onto the release surface 45 running in a belt 8 running direction 67, vertically upward. The powder applicator 47 can be, for example, a spray gun, or a (e.g., belt, or vibrational) conveyor and can preferably touch the release surface 45 (in which case it needs to be internally cooled) (not shown). The powder applicator 47 applies the powder 46 in intermittent spots corresponding to the carrier 13 being provided to the nip 36, by a supporting conveyor 77, in the form of intermittently provided individual bags 3. (Alternatively, the powder application could be continuous if the individual bags 3 were provided to form a continuous surface; not shown.) The belt 8 and the supporting conveyor 77 run synchronously, which can be a continuous or intermittent running. The apparatus of FIG. 5. differs from that of FIG. 4. in that there the belt 8 is arranged in a triangle shape.

Example 2: Method for Forming an Antislip Flexible Material 2 and Antislip Flexible Material 2 (Film Carrier 13)

Figure 27:
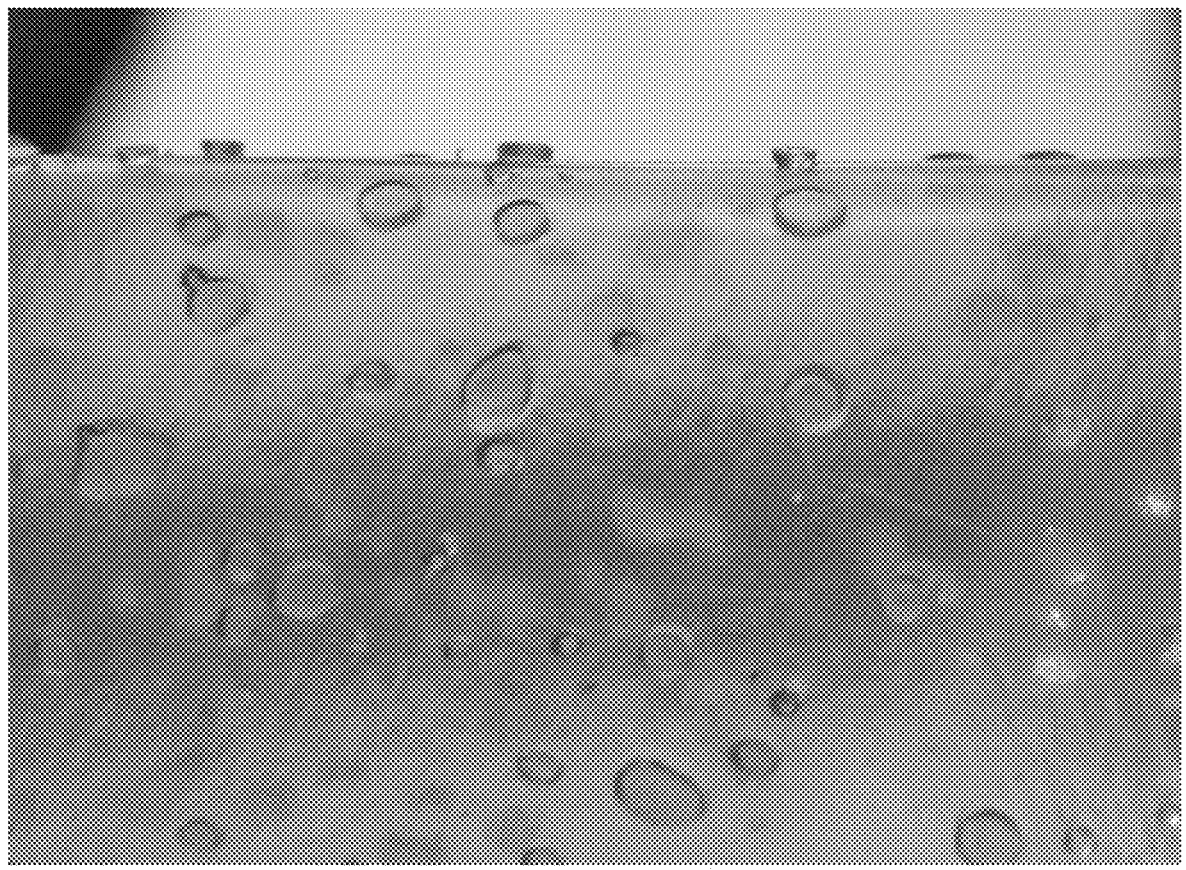
FIG. 27. is a photograph of an antislip flexible material.
Figure 28:
FIG. 28. is a photograph of a skidproofing material.

See the drawings, particularly FIGS. 6-12. This example is based on actual manufacturing results. A photograph of an antislip flexible material 2, very similar to that described in this example, is in FIG. 27. A photograph of a 20×20 mm piece of the skidproofing material 73 that we use is in FIG. 28. For forming an antislip flexible material 2, we provide a flexible carrier 13, which is a polyethylene film tube of a wall thickness of about 100 micrometres. It is suitable, for example, for a form-fill-seal (FFS) packaging of individually quick frozen vegetables for making packages of 25 kg filling weight per bag 3. The average surface mass of the carrier 13 is about 186 g/m². (If we used a single sheet of the film instead of the mentioned tube then the average surface mass of the carrier 13 would be about 93 g/m².) Its front surface 14 is one of its outer main surfaces at a layflat state of the tube. The surface energy of the front surface 14 is about 33 mJ/m² (without any surface pre-treatment applied). The carrier 13 fully consists of a polyethylene blend of linear low density polyethylene and low density polyethylene, as the thermoplastic first polymer. The melting temperature of the first polymer is about 122° C. and the softening temperature of the first polymer is about 102° C. We provide the carrier 13 at a temperature of 20° C. We provide a hot polytetrafluoroethylene (PTFE) release surface 45 of a first temperature of 250° C., measured with an infrared thermometer. The surface energy of the release surface 45 is about 18.5 mJ/m². The release surface 45 is essentially flat on the macro scale and is very slightly textured, on the micro scale, in accordance with the pattern of the glass fabric core of the PTFE-coated glass fabric belt 8 whose outer surface constitutes our release surface 45. The pattern is independent from the distribution of the discrete particles 39 of the provided first layer 29. We provide the first layer 29 of the discrete particles 39 by scattering from the air onto the hot release surface 45, of the first temperature of 250° C., a powder 46 (ground from pellets) of a linear medium density polyethylene, the second polymer, of a melt mass flow rate of 4.0 determined at 190° C. under a load of 2.16 kg in accordance with ISO 1133-1. Thereby we provide the first layer 29 of the discrete particles 39 sitting on the release surface 45 with a random distribution. (Alternatively, we could use flame spraying equipment, working from a powder 46 or a rod or a wire of the second polymer, for spraying from the air liquid and/or semi-liquid portions of the second polymer onto the release surface 45. Further alternatively, we could transfer a powder 46, or a solution, of the second polymer, colder than its softening temperature, on a surface of a fluid-cooled conveyor, such as a belt conveyor or a vibrational conveyor, whose cooled discharge end is in contact with the hot release surface 45 in order to bring onto the release surface 45, other than from the air, portions of the second polymer colder than the softening temperature of the second polymer.) The surface energy of the second polymer is about 33 mJ/m². The size of the powder 46 is 0-300 micrometres. The average surface mass of the scattered powder 46, and of the discrete particles 39 provided, is about 8 g/m². We keep the discrete particles 39 of the provided first layer 29 sitting on the hot release surface 45 for about 9.29 seconds which is long enough to provide virtually all of the discrete particles 39 in an at least semiliquid state and having first contact angles 28, estimated to be between about 59 and 64 degrees, with the release surface 45. As a result of originating from a powder 46 ground from pellets and of spending the mentioned time sitting on the hot release surface 45, every provided discrete particle 39, as well as every roughening projection 50 formed from the particles 39, is virtually fully molecularly unoriented. The size of the discrete particles 39 is about 80-1000 micrometres, the latter a size of a particle 39 including a plurality of merged powder granules 49. The typical particle 39 size, in a top plan view, is about 300 micrometres. As concerning the closeness of the discrete particles 39, an average distance 42 between centres of neighbouring discrete particles 39 is about 2000 micrometres. The discrete particles 39, sitting on the hot release surface 45, project from the hot release surface 45 to their corresponding terminal ends 43. The outer surface of the discrete particles 39 of the provided first layer 29 is made up of a first portion 30 contacting the release surface 45 and a second portion 69 out of a contact with the release surface 45, an area of the second portion 69 being substantially greater than an area of the first portion 30 in each of the provided discrete particles 39. In virtually all of the discrete particles 39 the particle height 40 equals at least 0.5 times a smallest top-plan-view extent 42 of the particle 39. In the provided first layer 29 all of the discrete particles 39 are in their entireties of a temperature, the second temperature, of about 250° C., whereas the Vicat softening temperature (A/50 N) of the second polymer is 114° C., which causes in the first layer 29 a tackiness of the entireties of the discrete particles 39, including their terminal ends 43. We provide two nip rolls 37 and press the carrier 13 and the hot release surface 45 toward each other within a nip 36 between the two nip rolls 37 to provide the contact between the carrier front surface 14 and the tacky terminal ends 43 of the particles 39, exerting on the carrier 13 a nip 36 pressure of 0.784 N/lineal cm. During the contact we apply an average compression pressure of 2904 Pa. We keep the carrier 13 (i.e., the film tube) and the release surface 45 (i.e., the PTFE-coated glass fibre belt 8) running at uniform line speeds between the nip rolls 37. We provide the nip roll 37 pressing the release surface 45 toward the front surface 14 with a heat resistant silicone rubber surface and we form the nip roll 37 surface pressing the carrier 13 toward the release surface 45 from a foamed elastomer whose hardness we select to provide (at the mentioned nip 36 pressure) an abutting, between the front surface 14 and the release surface 45 with the mediation of the first layer 29, of an abutting length 81 of 27 mm, the abutting length 81 measured in the running direction 67. See FIG. 8. The diameters of the nip rolls 37 can depend on the general layout, for example, belt 8 length and—width etc. of the apparatus, but in general, the diameters can be for example between 60 mm and 600 mm. We keep the endless belt 8 alternatingly shifted, perpendicularly to the running direction 67, between its two lateral end positions 9, providing a lateral displacement 10 of the belt 8 between the two end positions 9, the lateral displacement 10 being about 30 mm, which is greater than 10 times the average of the inter-particle distances 35. We select a line speed to provide a contacting time of about 0.0235 seconds, during which contacting time we keep the front surface 14 in contact with at least a majority of the tacky discrete particles 39 sitting on the hot release surface 45. The contacting time divided by the average surface mass of the carrier 13 is provided to be about 0.0001263 s·m²/g. With the mentioned parameters of the process we reach the following result. The carrier 13 is not impaired, whatsoever, from the heat of the release surface 45. (For a comparison, in the same configuration a 40-micrometre-thick polyethylene single layer sheet film carrier 13 was experienced to warp, wrinkle, cross-shrink and stretch to an extent that rules out selling the film product, i.e., the thin film was spoiled by the heat of the release surface 45.) At most that small minority of the discrete particles 39 remains out of the contact that is constituted by the smallest powder granules 49 scattered (they will probably be picked up in the next revolutions of the belt 8 as soon as a new powder granule 49 falls upon them). Thereby we stick the contacting discrete particles 39 of the first layer 29 to the front surface 14 and thereafter remove the carrier 13, and therewith virtually all of the tacky particles 39 stuck to its front surface 14, from the hot release surface 45 and thereby we provide the carrier 13 with a coating 16 of a hot state. After the removing, the free surface of the hot coating 16 can (preferably) be left free from any contact until it cools down, but it is also possible to contact it with a (preferably cooled) surface when the coating 16 is still hot and tacky, for example, in order of further shaping the coating 16 for providing, for example, substantially flat tops 62 or structured tops in the roughening projections 50 (contacting not shown). Due to the provided surface energies mentioned, the adhesive force between the front surface 14 and the contacted tacky particles 39 is greater than the adhesive force between the release surface 45 and the contacted tacky particles 39. Due to the sufficiently low melt mass flow rate (i.e., to the sufficiently great melt viscosity) of the second polymer, in the particles 39, the cohesive force of the contacted tacky particles 39 is greater than the adhesive force between the release surface 45 and the contacted tacky particles 39 resulting in a virtually complete removing of the contacted tacky particles 39 from the release surface 45 wherein certainly less than 1% of the polymer of contacted tacky particles 39 is estimated to remain on the release surface 45 during one removing operation. The coating 16 does not penetrate or enter into the carrier 13, except for an intermolecular diffusion between the front surface 14 and the coating 16. Utilising a heat energy of the hot coating 16, we form a bond 12 between the carrier 13 and the coating 16. Thereby we provide an antislip coated flexible material 2 including the carrier 13 and the coating 16 bonded thereto. The contacting time is short enough for preventing the carrier 13 from being distorted or spoiled to any extent by the heat of the release surface 45. All portions of the carrier 13, except its portions adjacent to the hot particles 39 stuck to its front surface 14, are prevented from melting or softening between the bringing into the contact and the forming of the bond 12. Providing both the first temperature and the second temperature above a fusing temperature at which the first polymer and the second polymer are capable of fusing together, we utilise the heat energy of the hot coating 16 of the discrete roughening projections 50 for heating carrier parts 15 adjacent to the roughening projections 50, sufficiently to melt its substance, i.e., the first polymer, in the heated carrier parts 15, and thereafter allow the carrier 13 and the roughening projections 50 to spontaneously cool into a solid state for forming the final bond 12. Thereby we fuse, and in particular, weld, the roughening projections 50 with the carrier 13. This bond 12 proves to be definitely strong against a breaking off of the roughening projections 50. Probably due to a local and surficial slight heat shrinking of the carrier front surface 14, the front surface 14 appears to be provided with respective depressions 23 under the feet 55 of some of the roughening projections 50, particularly under the larger ones, wherein the depth of the depressions 23 is small enough to keep the widest part 66 of the roughening projections 50 above the rest of the front surface 14 in each side view of the roughening projection 50. The carrier 13 in its entirety constitutes a heat shrinkable second layer including the thermoplastic first polymer, which surely shrinks above a temperature of 122° C., therefore the first temperature is well above the shrinking temperature of the second layer. The carrier 13 is heat sensitive enough to completely lose its stability if heated completely to the first temperature. The contacting time is sufficiently short for preventing the carrier 13 from any contracting from any of its original dimensions. Also, in the antislip coated flexible material 2, an average surface mass of the coating 16 is about 8 g/m² which only equals about 0.043 times an average surface mass of the carrier 13 which also contributes to the protecting of the carrier 13 from spoiling from excess heat. We provide the heat energy of the hot coating 16 suitably low for maintaining, without any forced cooling (such as for example a chill-roll cooling), a virtually intact breaking strength of the carrier 13, far sufficient for a rewinding of the carrier 13. During the contacting time a major portion of the front surface 14, between neighbouring tacky particles 39, is kept out of a contact with the release surface 45. As a result of the relatively low surface mass of the coating 16 and the relatively great discrete particle size 41, we form a discontinuous coating 16 of the antislip coated flexible material 2. The coating 16 occupies about 7.8% of the area of the antislip coated flexible material 2 in a top plan view. The formed coating 16 includes a multiplicity of discrete roughening projections 50 projecting from the front surface 14 of the carrier 13, each roughening projection 50 provided with a foot 55, the foot 55 being the end of the roughening projection 50 bonded to the carrier 13. We provide many of the roughening projections 50 with a second contact angle 68 of between about 130 and 140 degrees with the front surface 14 in a plurality of side views of the roughening projection 50. To provide flat-topped roughening projections 31, we provide almost all of the roughening projections 50 with a substantially flat top 62 forming an edge 53 completely surrounding the substantially flat top 62, the edge 53 in many cases essentially forming a circle. In almost all of the roughening projections 50 in a plurality of side views of the roughening projection 50 at least one contour line part 52 of the roughening projection 50, connecting the foot 55 and the edge 53, is formed to be strictly convex from outside, these are the strictly convex contour line parts 61. In at least one side view of many roughening projections 50 the ratio of the width of the substantially flat top 63 to the foot width 56 is provided between 1 and 1.10. In a majority of the roughening projections 50 the area of the foot 55 is provided to be smaller than the area of the substantially flat top 62. In a majority of the roughening projections 50 the roughening projection 50 is provided with an edge angle 54 being an angle, measured through the roughening projection 50, closed between the substantially flat top 62 and a mantle surface 59 extending from the edge 53 to the foot 55, where the edge angle 54 is typically smaller than 90 degrees. In many roughening projections 50 the edge angle 54 is about 75 degrees. Many roughening projections 50 are formed to be a strictly tapering roughening projection 74, strictly tapering from the edge 53 to the foot 55 in each side view of the roughening projection 50. We provide a majority of the roughening projections 50 with a hidden surface portion 58 being a portion of an outer surface of the roughening projection 50 which the roughening projection 50 covers from a viewer in a top plan view of the antislip coated flexible material 2 taken from above the roughening projections 50. These roughening projections 50 have at least one undercut 65, and very many of them include at least one area 51 immediately above the undercut 65 forming a separation 71 between the at least one area 51 and the front surface 14 which is greater than 20 micrometres. The roughening projections 50 inherit from the discrete particles 39 their random distribution in the top plan view of the antislip coated flexible material 2. As a result of the provided powder 46 of the second polymer not being fully homogeneous in size, we form the roughening projections 50 of random top-plan-view sizes 64. Virtually none of the roughening projections 50 are provided with a top-plan-view size 64 smaller than 40 micrometres or greater than 6 mm. We provide the average, or typical, roughening projection top-plan-view size 64 between 250 micrometres and 800 micrometres. If the applied scatter coating operation provides a distribution of the particles 39 homogeneous enough then only few of the powder granules 49 stick and merge together to form particles 39, and roughening projections 50, of relatively greater top-plan-view sizes 64 or relatively greater top-plan-view aspect ratios and the vast majority of the roughening projections 50 can originate from such particles 39 as originate from a single powder granule 49, which roughening projections 50 appear to have top-plan-view aspect ratios between 1.0 and 1.6. (Aspect ratio essentially means a ratio of the top-plan-view size 64 to the smallest top-plan-view extent 60 of the roughening projection 50 in a top plan view of the antislip coated flexible material 2 taken from above the roughening projections 50.) That can result in the multiplicity of the roughening projections 50 having an average top-plan-view aspect ratio of less than 1.6, about 1.2 or even less than that. Many roughening projections 50 are not fully circular in the top plan view and they show that the roughening projections 50 are formed of random orientations in a top plan view of the antislip coated flexible material 2. We form the roughening projections 50 projecting from their respective feet 55 to respective projection heights 57 with a substantially uniform projection height 57 of about 110 micrometres and with substantially varied smallest top-plan-view extents 60 in which the coefficient of variation of the smallest top-plan-view extents 60 is at least 2.0 times the coefficient of variation of the projection heights 57. The tops of virtually all of the roughening projections 50 are essentially in alignment along a plane 44 parallel with a general plane of the front surface 14. In many of the roughening projections 50, a smallest top-plan-view extent 60 of the roughening projection 50 is formed to equal at least 10 times the projection height 57. The provided antislip coated flexible material 2 is capable of a slip-decreasing mechanical interlock in a shearing direction with a skidproofing material 73, of an ordinary polypropylene spunbonded nonwoven fabric of an average surface mass of 17 g/m$^2$ and filament thickness of between 25 and 30 micrometres, due to the roughening projections 50 having suitable closeness and geometric features with respect to the skidproofing material 73 for forming mechanical bonds with the filaments of the skidproofing material 73 in the shearing direction. According to our test results, a static friction between two specimens of the antislip coated flexible material 2, with a specimen of the skidproofing material 73 placed between the specimens of the antislip coated flexible material 2, is suitably high to resist sliding in an inclined-plane-type static-friction test of 75 degrees angle according to the TAPPI T 815 standard. We measured the static coefficient of friction between two specimens of the antislip coated flexible material 2, with a specimen of the skidproofing material 73 placed between the specimens of the antislip coated flexible material 2 to be 10.2 at a pressure of 1539 Pa, otherwise according to ISO 8295. This selected pressure value practicably simulates pressure conditions in a real life stack of bag 3 packages, and we note that the test result of 10.2 is a considerably great value. The antislip coated flexible material 2 does not essentially stick to the skidproofing material 73 against a lifting or peeling separation, they show a negligible mutual blocking load. Due to the roughening projections 50 being free from molecular orientation and due to a relatively low melt mass flow rate of the second polymer, the mentioned frictional effectiveness of the roughening projections 50 is, as we found, maintained even after a heat shrinking of the antislip coated flexible material 2. Namely, we used a Bosch PHG 630 DCE hot air gun (on its 6th temperature degree, with maximum air speed, with an air temperature above 200° C., for 130 seconds) to shrink the film to simulate a shrink wrap shrinking operation. We let the film shrink 10% from its original dimensions in all directions (the antislip flexible material 2 shows a heat shrinkability of at least 30% in all directions). The result is that the static coefficient of friction, with the skidproofing material 73, was virtually left intact by the shrinking. Also, a difference in the shapes of the roughening projections 50, before and after the heat shrinking, is not noticeable visually. The film appears to shrink as if there were not any roughening projections 50 in it, i.e., its shrinking behaviour is virtually not affected by the roughening projections 50. We form the roughening projections 50 occupying a stripe 76 in the middle of the main outer surface of the layflat film tube, both on its front side and its back side, the roughening projections 50 looking toward an outside 6 of the tube. On the back side of the endless tube we fix an endless strip 75 of the skidproofing material 73, covering the roughened surface part of the back side. See FIG. 12a. The fixing we do, for example, with fibre-spayed hot melt adhesive or, preferably, with extrusion lamination, in which we use narrow continuous beads of extruded polyolefin polymer to encapsulate the fibres of the nonwoven and fix it to the film, compressing the film/melt/nonwoven sandwich between cooled metal rolls, which do not stick to the melt even if it strikes through the nonwoven. We form, with cross welding and cutting, both packaging bags 3, namely 25-kg heavy duty bags 3, and packaging wraps 79, namely shrink wraps 79 (for example for a shrink-collating wrap 79 for cans), from the tube that has been provided with the skidproofing material 73. One side of the bags 3 has the skidproofing material 73 fixed to it, and the other, opposing side of the bags 3 is a roughened side 7, with the roughening projections 50 projecting toward the outside 6 of the bag 3, capable of gripping with the skidproofing material 73. FIG. 12b. shows the roughened side 7 of the bag 3, FIG. 12c. shows the opposite side of the bag 3, with the skidproofing material 73, FIG. 12d. shows the prepared wrap 79 ready to be shrunk, with the roughening projections 50 projecting toward the outside 6 of the wrap 79. FIG. 12e. shows the roughened side 7 of a bag 3, in which the roughening projections 50 occupy a spot in the middle of the bag 3 surface and FIG. 12f. shows the opposite side of the same bag 3, wherein the skidproofing material 73 occupies a spot in the middle of the bag 3 surface. Such pieces of the skidproofing material 73 could, for example, be applied to the tube with a slip cut unit. FIG. 12g. shows the wrap 79 of FIG. 12d already shrunk onto a package of cans, with the roughening projections 50 projecting toward the outside 6 of the wrap 79.

Example 3: Method for Forming an Antislip Flexible Material 2 and Antislip Flexible Material 2 (Coated Fabric 25 Carrier 13)

Figure 29:
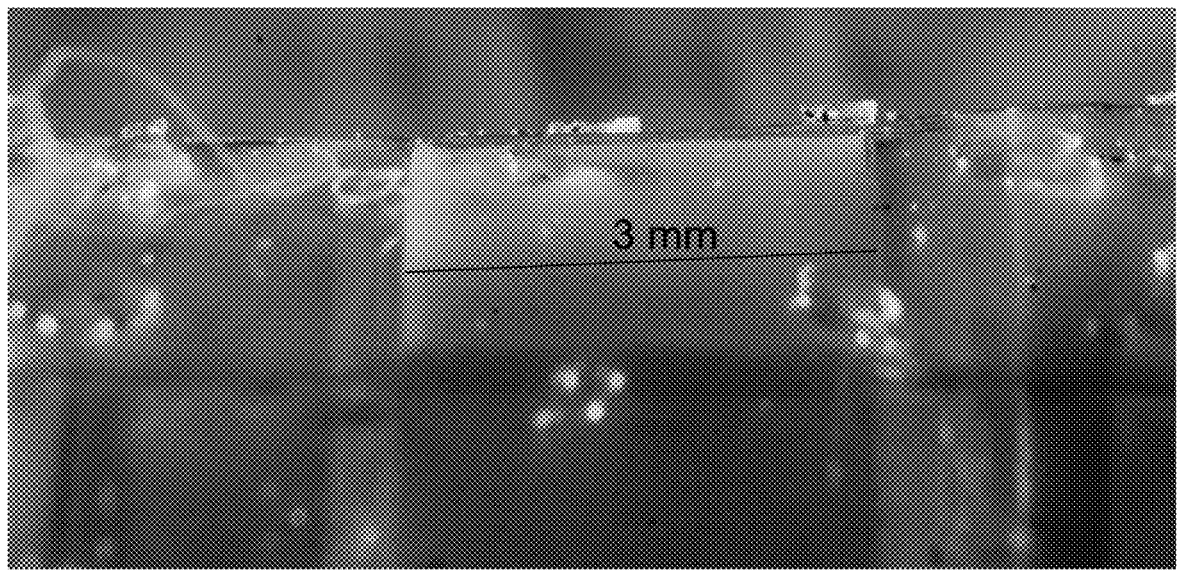
FIG. 29. is a photograph of an antislip flexible material.

See the drawings, particularly FIGS. 6-13. This example is based on actual manufacturing results. A photograph of the antislip flexible material 2 is in FIG. 29. In the photograph, a folded edge of the roughened fabric 25 can be seen, with roughening projections 50 in side view. The "3 mm" line shows the width of a tape 26 of the fabric 25. The fibres on the left are fibres torn off the skidproofing material 73 during several different shearing tests. The small dust granules are from fine dust pollution. This example essentially differs from Example 2 as follows. For forming an antislip flexible material 2, we provide a flexible carrier 13, which is a tube of circularly woven polypropylene fabric 25, woven from polypropylene tapes 26, of a fabric 25 surface mass of 75 g/m$^2$, extrusion-coated on both of its main outer (i.e., front and back) surfaces with a polypropylene layer of a surface mass of 30 g/m². (Alternatively, the tube could be laminated on both of its main outer surfaces with a polypropylene film, for example biaxially oriented polypropylene film.) The average surface mass of the tubular carrier 13 is thus 210 g/m². The surface energy of the front surface 14 is about 30 mJ/m² (without any surface pre-treatment applied). The melting temperature of the first polymer is about 170° C. and the softening temperature of the first polymer is about 125° C. We provide the release surface 45 of a first temperature of 255° C. We provide the first layer 29 of the discrete particles 39 by scattering from the air onto the hot release surface 45, of the first temperature of 255° C., a powder 46 (ground from pellets) of polypropylene, the second polymer, of a melt mass flow rate of 14.0 determined at 230° C. under a load of 2.16 kg in accordance with ISO 1133-1. The surface energy of the second polymer is about 30 mJ/m². The size of the powder 46 is 0-300 micrometres. The average surface mass of the scattered powder 46, and of the discrete particles 39 provided, is about 5 g/m². We keep the discrete particles 39 of the provided first layer 29 sitting on the hot release surface 45 for about 8.0 seconds which is long enough to provide virtually all of the discrete particles 39 in an at least semiliquid state and having first contact angles 28, estimated to be between about 59 and 64 degrees, with the release surface 45. In the provided first layer 29 all of the discrete particles 39 are in their entireties of a temperature, the second temperature, of about 255° C., whereas the Vicat softening temperature (A, ISO 306) of the second polymer is 128° C., which causes in the first layer 29 a tackiness of the entireties of the discrete particles 39, including their terminal ends 43. We exert on the carrier 13 a nip 36 pressure of 0.735 N/lineal cm. During the contact we apply an average compression pressure of 2722 Pa. We select a line speed to provide a contacting time of about 0.0203 seconds. With the mentioned parameters of the process we reach the following result. The contacting time is short enough for preventing the carrier 13 from being distorted or spoiled to any extent by the heat of the release surface 45. We fuse, and in particular, weld, the roughening projections 50 with the carrier 13. This bond 12 proves to be definitely strong against a breaking off of the roughening projections 50. The fabric 25 of the carrier 13 is left free of fused bonds 12 in overlaps 38 between its tapes 26 under the roughening projections 50. Not any depressions 23, under the feet 55 of the roughening projections 50, can be seen. In a majority of the roughening projections 50 the edge angle 54 is typically smaller than 90 degrees. In many roughening projections 50 the edge angle 54 is about 75 degrees. As a result thereof, many flat-topped roughening projections 31 have suitable geometric features with respect to the tapes 26, exposed in the total internal tube surface of the carrier 13, for forming with many of the exposed tapes 27 a definite slip-decreasing mechanical interlock. According to results of inclined-plane-type static-friction tests of 60 degrees angle according to the TAPPI T 815 standard, a static friction between two specimens of the antislip coated flexible material 2, with a specimen of the skidproofing material 73 placed between the specimens of the antislip coated flexible material 2, is suitably high to resist the sliding (i.e., the sled assembly does not slide but stays in place). Further, the mentioned static friction is suitably high to resist the sliding immediately after a preparation, the ice test preparation, the ice test preparation including maintaining in the carrier 13, and the roughening projections 50, of a first one of the two specimens of the antislip coated flexible material 2 a third temperature of about −20° C. while exposing the carrier front surface 14 and the roughening projections 50 to air of a temperature of about 3° C. and of a relative humidity of 100%, completed with a dense fog of water generated in the ambient air with an ultrasonic air humidifier, for a preparation time of as long as 19 minutes and the ice test preparation further including providing a second one of the two specimens of the antislip coated flexible material 2 and the specimen of the skidproofing material 73 of the third temperature. The static friction remains suitably high despite the fact that the front surface is white with frost after the 19-minute preparation time. An even longer preparation time is applicable without providing the fog. It proves that the friction of the antislip coated flexible material 2 is fairly insensitive to an ice buildup on its roughened surface, which makes it particularly useful for frozen food packaging bags 3 and timber wraps 79. We measured the static coefficient of friction between two specimens of the antislip coated flexible material 2, with a specimen of the skidproofing material 73 placed between the specimens of the antislip coated flexible material 2 to be 10.3 at a pressure of 1539 Pa, otherwise according to ISO 8295. On the other hand, according to results of our blocking tests, the antislip flexible material 2 has with the skidproofing material 73 an average blocking load of 2.94 grams according to the standard ASTM D 3354-96, after a preparation including compressing the samples with a pressure of 1500 Pa immediately prior to the blocking load test. If we also include, in the preparation, a relative rotation, during the compression, of the two specimens with ±8 degrees angle back and forth repeated three times, then the result is that the average blocking load is not more than 19.4 grams. The static coefficient of friction, with the skidproofing material 73, is found to be virtually left intact by a heat shrinking of the antislip coated flexible material 2. We form the roughening projections 50 occupying a stripe 76 in the middle of the main outer surface of the layflat film tube, both on its front side and its back side, the roughening projections 50 looking toward an outside 6 of the tube. On the back side of the endless tube we fix an endless strip 75 of the skidproofing material 73, covering the roughened surface part of the back side. The fixing we do, preferably, with extrusion lamination. We form, with (preferably ultrasonically) cross sewing and cutting, packaging bags 3, namely 25-kg heavy duty bags 3, from the tube that has been provided with the skidproofing material 73. One side of the bags 3 has the skidproofing material 73 fixed to it, and the other, opposing side of the bags 3 is a roughened side 7, capable of gripping with the skidproofing material 73. We prepared test blocks 11 (simulating frozen fish blocks 11) of a size of 53×53×10 cm and cooled them to −20° C. We filled the bags 3 with one block 11 each and closed the bags 3 with intermittent cross welding (to let the air pressure out through the intermittent welding seam). To perform the stack tilting test, we put the packages on top of each other, centrally, on a plate and tilted the plate into a slanting orientation closing with the horizontal an angle of 45 degrees, and then turned the plate back to horizontal. Then we horizontally dragged the top package off from the bottom package (for which we had to somewhat tilt the top package to stand it to its edge otherwise it would have been virtually impossible to slide it) and then repeated the tilting test with success again. (Alternatively, when we used a polypropylene powder 46 of a size of 0-300 micrometres and of a melt mass flow rate of 8.5 g/10 min, in a surface mass of about 16.7 g/m² and with a heating time of about 12.5 seconds with a nip 36 pressure of 0.274 N/lineal cm and an estimated contacting time of about 0.02 seconds we got the results of inclined-plane-type static-friction tests made with a steel sled of a height of 40 mm but otherwise according to the TAPPI T 815 standard as follows: a static friction directly between two specimens of the antislip coated flexible material 2, without any skidproofing material 73 placed inbetween, was measured to be above 1.34, with some specimen pairs showing a coefficient of friction of 1.68. The friction proved to be insensitive to a presence of cement dust pollution between the surfaces. The coated base fabric 25 without roughening shows a static coefficient of friction of 0.45. As a further improved alternative, we could use a very narrow size fraction of powder 46 in order of an even better control over the process (e.g. in order of a very even and uniform contacting and pressing, and a more complete removing from the release surface, of the melted discrete particles 39) and in order of an even greater static coefficient of friction between the roughened surfaces. For example, a powder 46 of a size of between 100 micrometres and 110 micrometres is advantageous. Or, alternatively, the powder's 46 size interval can be defined between any two, lower and upper, limit values whereas the difference between the limit values is equal to or lower than one or both of 10, or even 5, micrometres and 10, or even 5, percent of the lower limit value.)

Example 4: Method for Forming an Antislip Flexible Material 2 and Antislip Flexible Material 2 (Uncoated Fabric 25 Carrier 13)

Figure 14:
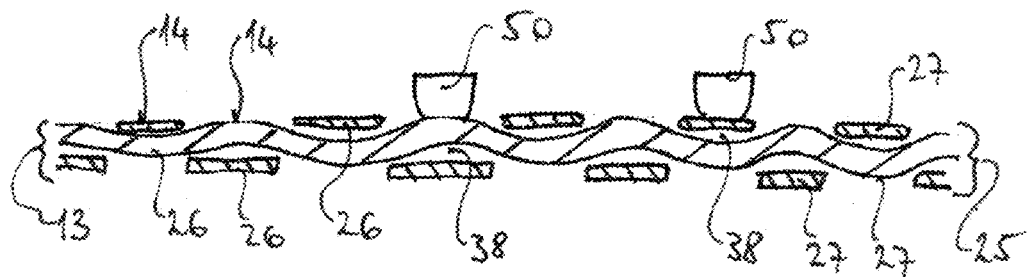
FIG. 14. is a side view of an antislip flexible material.
Figure 30:
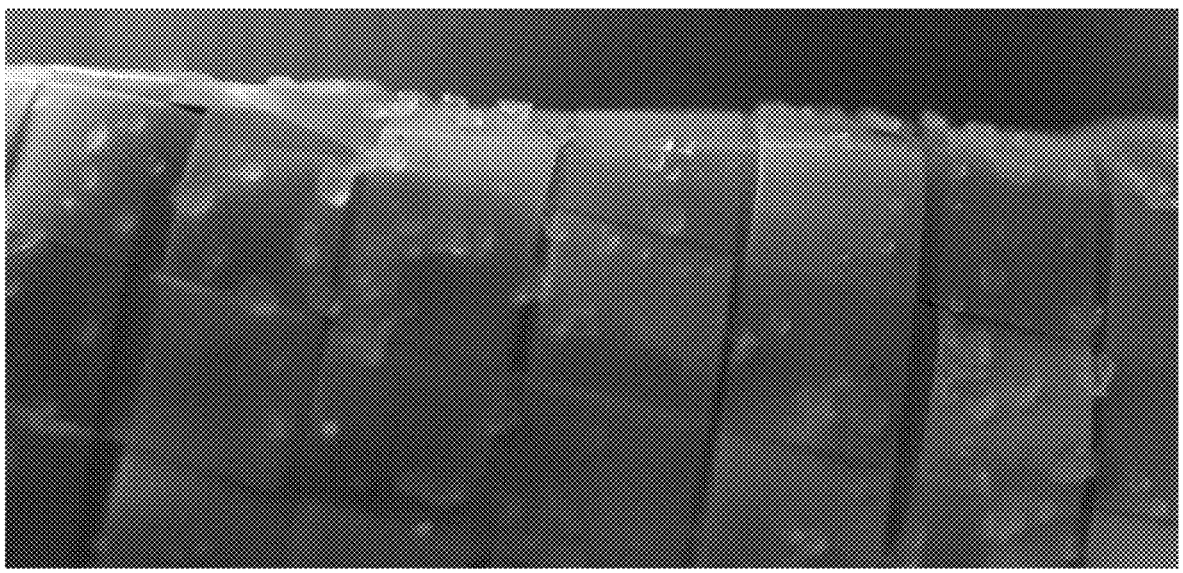
FIG. 30. is a photograph of an antislip flexible material.

See the drawings, particularly FIG. 14. This example is based on actual manufacturing results. A photograph of the antislip flexible material 2 is in FIG. 30. This example essentially differs from Example 3 as follows. For forming an antislip flexible material 2, we provide a flexible carrier 13, which is a circularly woven polypropylene fabric 25 tube, woven from polypropylene tapes 26, of a fabric 25 surface mass of 65 g/m² (not extrusion-coated). The average surface mass of the tubular carrier 13 is thus 130 g/m². We provide the release surface 45 of a first temperature of 255° C. We use a rotational-moulding powder 46 of polypropylene, the second polymer, of a melt mass flow rate of 15 determined at 230° C. under a load of 2.16 kg in accordance with ISO 1133-1. The size of the powder 46 is sieved to 0-550 micrometres. The average surface mass of the scattered powder 46, and of the discrete particles 39 provided, is 14.6 g/m². We keep the discrete particles 39 of the provided first layer 29 sitting on the hot release surface 45 for 8.0 seconds. In the provided first layer 29 all of the discrete particles 39 are in their entireties of a temperature, the second temperature, of about 255° C. We exert on the carrier 13 a nip 36 pressure of 1.225 N/lineal cm. During the contact we apply an average compression pressure of 3952 Pa. We select a line speed to provide a contacting time of about 0.0233 seconds. With the mentioned parameters of the process we reach the following result. The contacting time is short enough for preventing the carrier 13 from being distorted or spoiled to any extent by the heat of the release surface 45. We fuse, and in particular, weld, the roughening projections 50 with the carrier 13. The fabric 25 is left free of fused bonds 12 in overlaps 38 between its tapes 26 under the roughening projections 50. Not any depressions 23, under the roughening projection feet 55, can be seen. We prevent the coating 16 from penetrating the fabric 25 whatsoever. Many flat-topped roughening projections 31 have suitable geometric features with respect to the tapes 26, exposed in the total internal and external tube surfaces of the carrier 13, for forming with many of the exposed tapes 27 a definite slip-decreasing mechanical interlock. The roughening projections 50 are easier to break off from the front surface 14 than in the first two examples.

Example 5: Method for Forming an Antislip Flexible Material 2 and Antislip Flexible Material 2 (Film Carrier 13, Elastomeric Coating 16)

Figure 15:
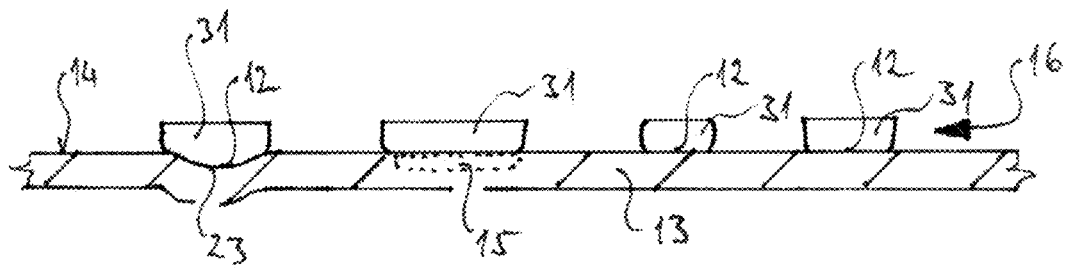
FIG. 15. is a side view of an antislip flexible material.
Figure 16:
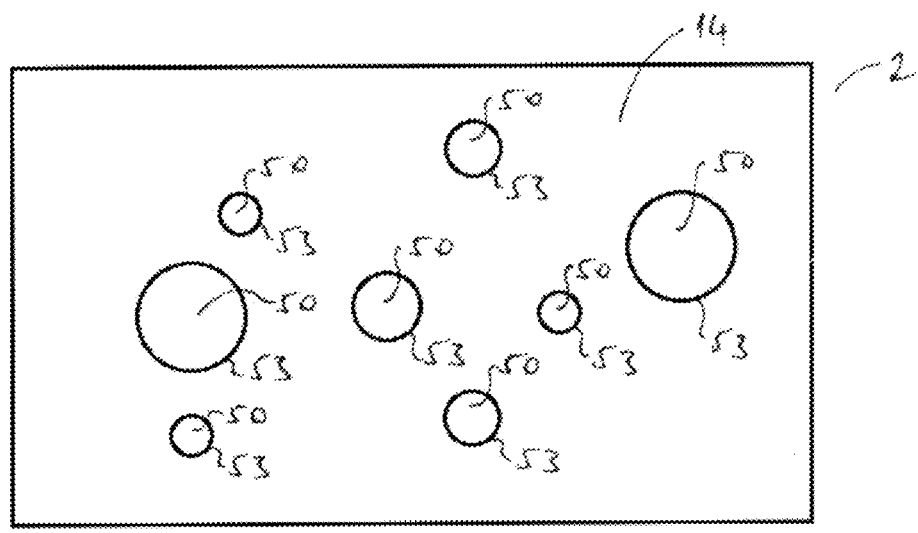
FIG. 16. is a top view of an antislip flexible material.
Figure 31:
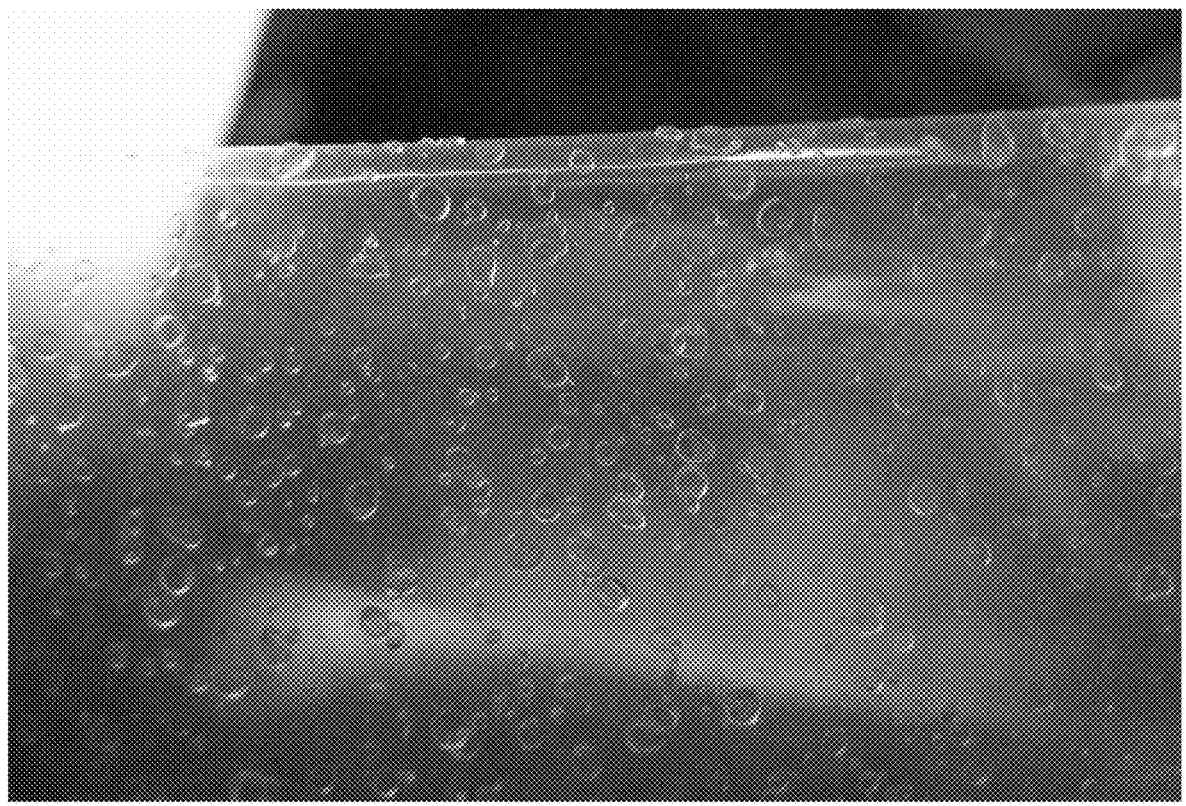
FIG. 31. is a photograph of an antislip flexible material.

See the drawings, particularly FIGS. 15-16. This example is based on actual manufacturing results. A photograph of the antislip flexible material 2 is in FIG. 31. Please note that, in the photograph, both of the two layers of a folded product sample are visible, because of the film being clear transparent. This example essentially differs from Example 2 as follows. For forming an antislip flexible material 2, we provide a flexible carrier 13, which is a clear transparent composite, consisting of a polyamide film and a polyethylene layer, made with extrusion coating, thereon. Its front surface 14 is the polyethylene surface. The front surface 14 thus consists of low density polyethylene, as the thermoplastic first polymer. The melting temperature of the first polymer is about 122° C. and the softening temperature of the first polymer is about 102° C. We provide the first layer 29 of the discrete particles 39 by scattering from the air onto the hot release surface 45, of the first temperature of 253° C., a powder 46 (ground from pellets) of a blend of low density polyethylene and ethylene-vinyl acetate (EVA), the second polymer, of a melt mass flow rate of 40 determined at 190° C. under a load of 2.16 kg in accordance with ISO 1133-1. In order of avoiding a later blocking of the product, the second polymer is relatively poor in EVA and is free from tackifiers. The DSC melting temperature of the second polymer is between 100° C. and 110° C., which is considered to be high within EVA-containing polymer grades. The size of the powder 46 is 100-500 micrometres. The average surface mass of the scattered powder 46, and of the discrete particles 39 provided, is about 7 g/m². We apply a manufacturing line speed of 160 metres per minute. We note that this is a considerably great speed in the art, and we can not see any technical factors preventing, in theory, the skilled person from further increasing the speed for example with applying longer release surface 45 belt 8 lengths. We keep the discrete particles 39 of the provided first layer 29 sitting on the hot release surface 45 for 4.00 seconds which is long enough to provide virtually all of the discrete particles 39 in an at least semiliquid state and having first contact angles 28, estimated to be between about 59 and 64 degrees, with the release surface 45. In the provided first layer 29 all of the discrete particles 39 are in their entireties of a temperature, the second temperature, of about 253° C., whereas the Vicat softening temperature (A/50 N) of the second polymer is under 100° C., which causes in the first layer 29 a tackiness of the entireties of the discrete particles 39, including their terminal ends 43. We apply a nip 36 pressure of 0.735 N/lineal cm. During the contact we apply an average compression pressure of 2722 Pa. We apply a contacting time of 0.0101 seconds. With the mentioned parameters of the process we reach the following result. We provide virtually each roughening projection 50 with a substantially flat top 62, with the edge 53 essentially forming a circle. We provide in every side view of a vast majority of the roughening projections 50 a ratio of a width 63 of the substantially flat top to a foot width 56 from 1 to 1.10. We provide, in the antislip coated flexible material 2, such roughening projections 50 whose average top-plan-view aspect ratio we estimate to be between 1.0 and 1.1 since they look virtually circular in the top plan view. Since virtually all of the roughening projections 50 are of the same (low) height 57, all of the variation of their respective volumes (originating from a volume variation of the powder granules 49) appears in their varied smallest-top-plan-view extents 60. Therefore the coefficient of variation of the smallest top-plan-view extents 60 is estimated to be well over a triple of the coefficient of variation of the projection heights 57. The provided antislip coated flexible material 2 is measured to have with itself an average blocking load of 13.66 grams in the modified blocking load test. This is a good value and it expresses that the product will virtually not block when it is stored in a warm warehouse. This parameter is the result of the second polymer, of the coating 16, having a relatively high melting temperature and being free of tackifiers. The provided antislip coated flexible material 2 is in fact not capable of an essential slip-decreasing mechanical interlock in a shearing direction with the skidproofing material 73. We measured static and kinetic coefficients of friction (at a pressure of 1539 Pa, otherwise according to ISO 8295, as follows below) and we found them to be very close to each other in each case which, as it is known to the skilled person, provides a desirable behaviour of the product once it happens to be shear-loaded to an extent where it starts to slip. According to our test results, the coefficient of friction of the roughened side 7, with itself, is 0.96, which is considered to be a value high enough for many practical applications, and which is economical, with regard to the inexpensive coating 16 material, to the low coating 16 weight of 7 g/m$^2$ and to the high conversion speed of at least 160 m/minute. The coefficient of friction of the roughened side 7 with a smooth polyethylene surface is 0.5, where the mentioned smooth polyethylene surface has, with itself, a coefficient of friction of 0.44.

Example 6: Method for Forming an Antislip Flexible Material 2 and Antislip Flexible Material 2 (Film Carrier 13, Elastomeric Coating 16)

Figure 32:
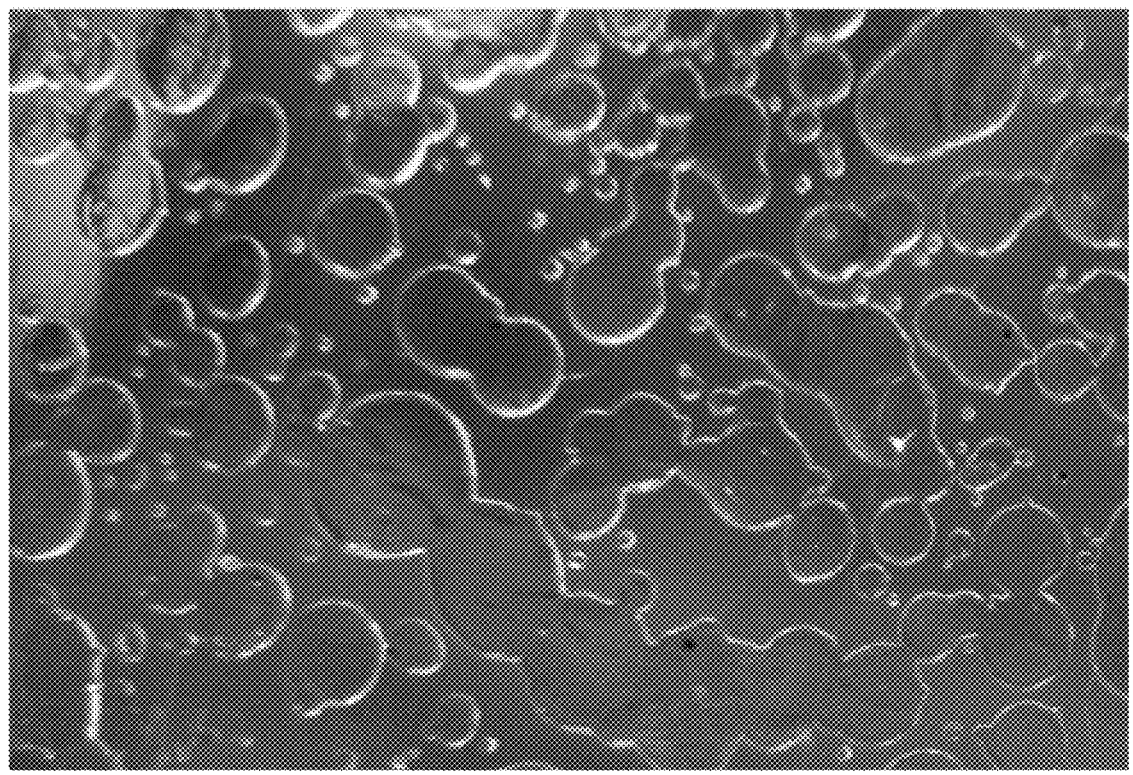
FIG. 32. is a photograph of an antislip flexible material.

This example is based on actual manufacturing results. A photograph of the antislip flexible material 2 is in FIG. 32. This example essentially differs from Example 5 as follows. We provide a powder 46 (ground from pellets) of a blend of low density polyethylene and ethylene-vinyl acetate (EVA), the second polymer, of a melt mass flow rate of 150 determined at 190° C. under a load of 2.16 kg in accordance with ISO 1133-1. In order of avoiding a later blocking of the product, the second polymer is relatively poor in EVA and is free from tackifiers. The DSC meting temperature of the second polymer is between 97° C. and 108° C. The size of the powder 46 is 100-400 micrometres. The average surface mass of the scattered powder 46, and of the coating 16 provided, is about 16.3 g/m$^2$. We apply a manufacturing line speed of 80 metres per minute. We keep the discrete particles 39 of the provided first layer 29 sitting on the hot release surface 45 for 8.00 seconds which is long enough to provide virtually all of the discrete particles 39 in an at least semiliquid state and having first contact angles 28, estimated to be between about 59 and 64 degrees, with the release surface 45. We apply a nip 36 pressure of 4.9 N/lineal cm. We apply a contacting time of about 0.024 seconds. With the mentioned parameters of the process we reach the following result. As can be seen in the photograph, many particles 39, originating from respective powder granules 49, are made to merge in the coating 16, but the coating 16 is still discontinuous. This antislip flexible material 2 can be used where greater coefficients of friction are necessary.

Example 7: Method for Forming an Antislip Flexible Material 2 and Antislip Flexible Material 2 (Printed Film Carrier 13, Elastomeric Coating 16)

This example is based on actual manufacturing results. This example essentially differs from Example 5 as follows. The carrier 13 we provide is a heavy duty packaging film tube of a recycled polyethylene blend rich in low density polyethylene, of a thickness of 100 micrometres, whose front surface 14 has been printed, with customer graphics, using a solvent-based flexographic ink of an acrylic base. The average surface mass of the scattered powder 46, and of the coating 16 provided, is about 5 g/m$^2$. We apply a manufacturing line speed of 80 metres per minute. We keep the discrete particles 39 of the provided first layer 29 sitting on the hot release surface 45 for 8.00 seconds which is long enough to provide virtually all of the discrete particles 39 in an at least semiliquid state and having first contact angles 28, estimated to be between about 59 and 64 degrees, with the release surface 45. With the mentioned parameters of the process we reach the following result. Utilising the great heat energy of the hot coating 16 we are able to form a definitely strong bond 12 between the printed carrier front surface 14 and the discontinuous coating 16, despite the fact that the second polymer, of the coating 16, is free of tackifier. The roughening projections 50 appear to be impossible to scrape off, from the printed film surface, with a fingernail. Our opinion is that suitably selected solvent-based or water-based ink materials, for example of a low heat resistance (for example primarily of acrylic base), may be virtually possible to be welded-through in our method, even if the powder 46 used is polyethylene or polypropylene without EVA or other similar adhesive agent, though some modification of their pigment colour may happen, which, in the given case, we do not consider an impairing of the product. The weldability and colour-keeping of the print can also depend on the kind of pigment it contains. Alternatively, a transparent heat-seal-lacquer layer (printed from, for example, a solvent-based or water-based polyolefin solution) might also provide a suitable welding of the coating 16 to the printed-and-lacquered front surface 14.

Example 8: Method for Forming an Antislip Flexible Material 2 and Antislip Flexible Material 2 (Various Shape Examples)

Figure 17:
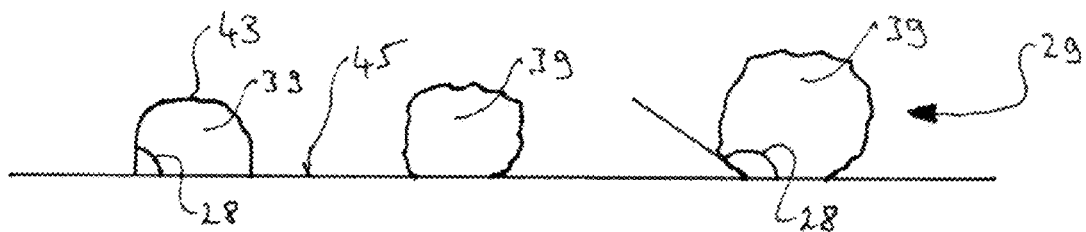
FIG. 17. is a side view of a provided first layer.
Figure 18:
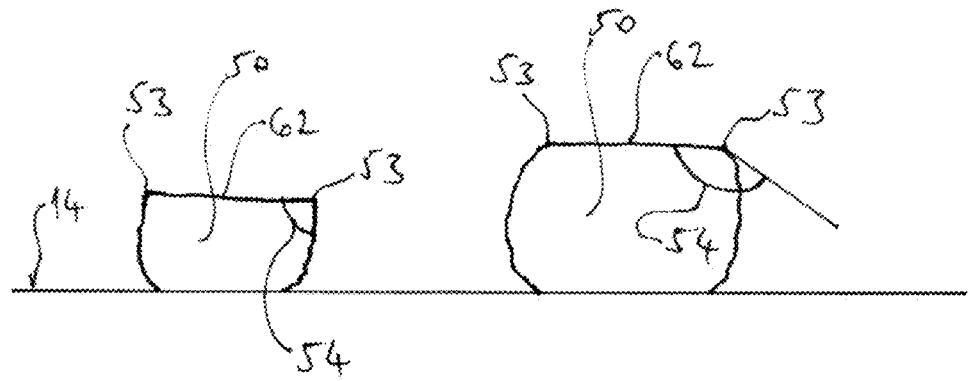
FIG. 18. is a side view of an antislip flexible material.
Figure 19A:
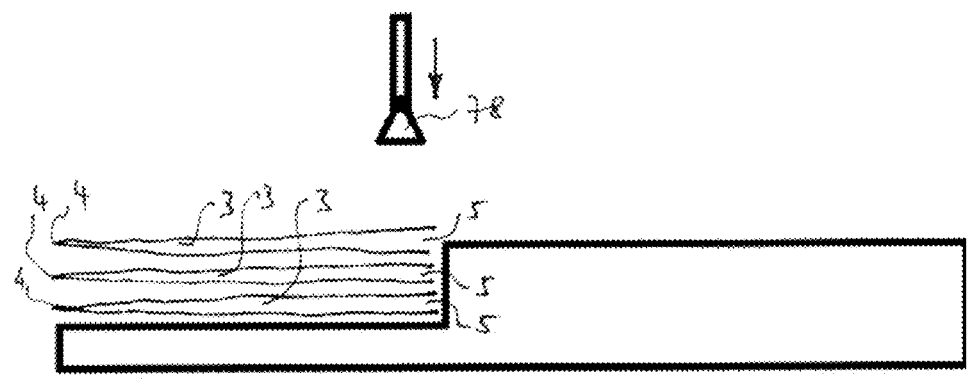
FIGS. 19a-19c are schematic side sections of an automatic bag 3 placing apparatus, according to the background art, implementing an automatic bag 3 placing process according to the background art.
Figure 19B:
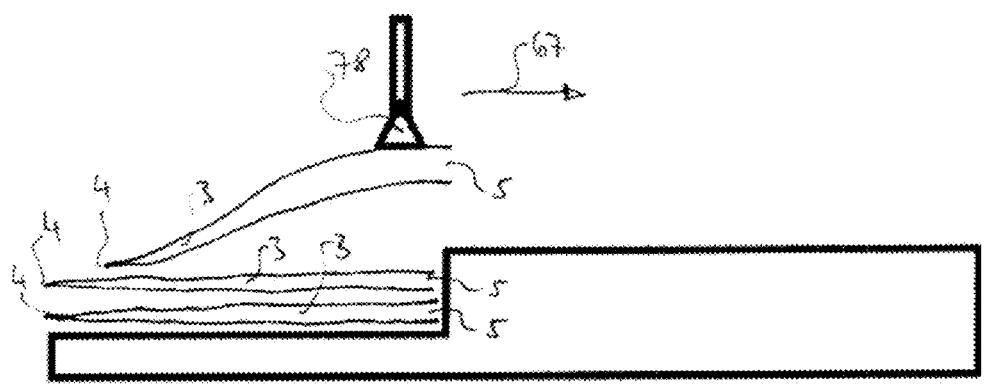
Figure 19C:
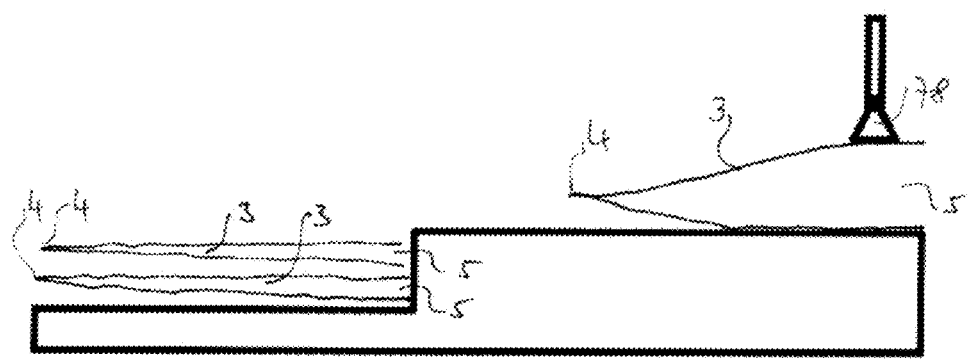
Figure 20A:
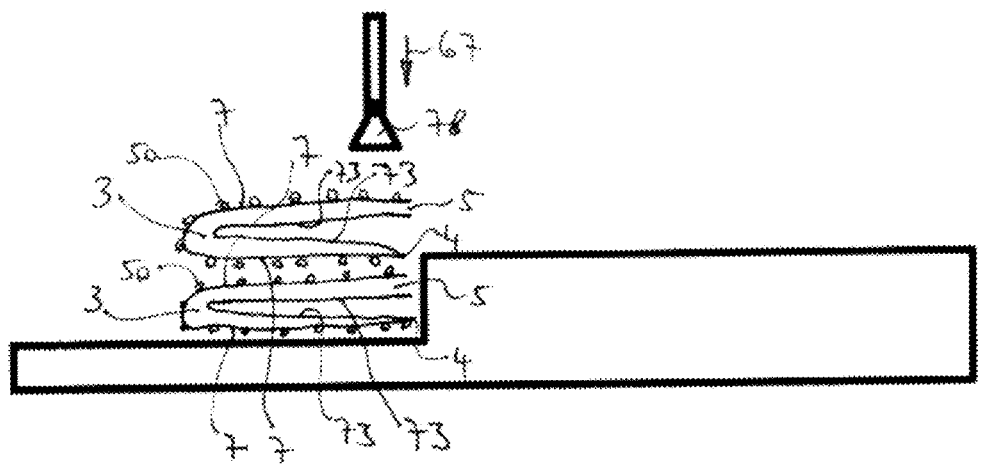
FIGS. 20a-20d include schematic side sections of an automatic bag placing apparatus implementing an automatic bag 3 placing process in which a stack of empty bags 3 contains the bags 3 in a form in which each bag 3 is individually folded in a way in which the bag bottom 4 is made parallel and adjacent the bag mouth 5.
Figure 20B:
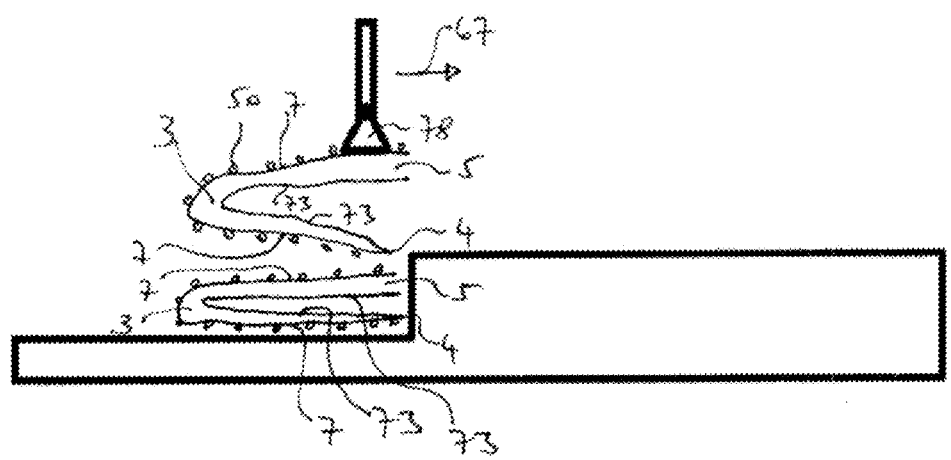
Figure 20C:
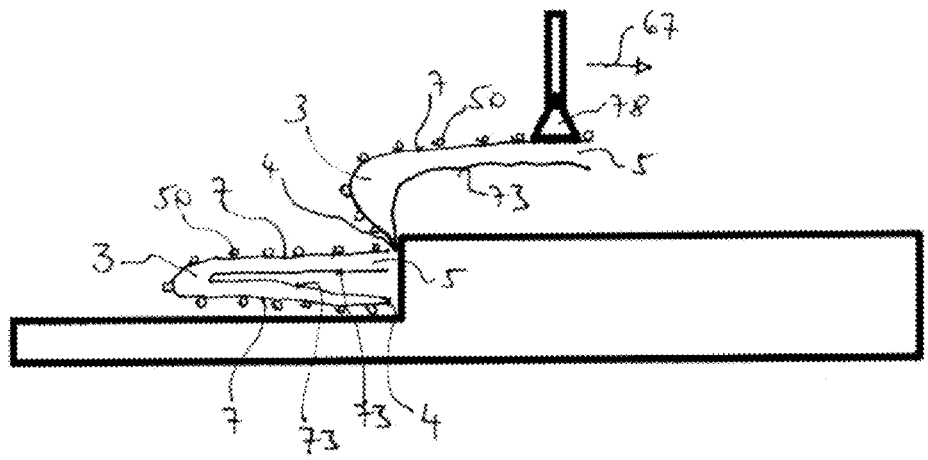
Figure 20D:
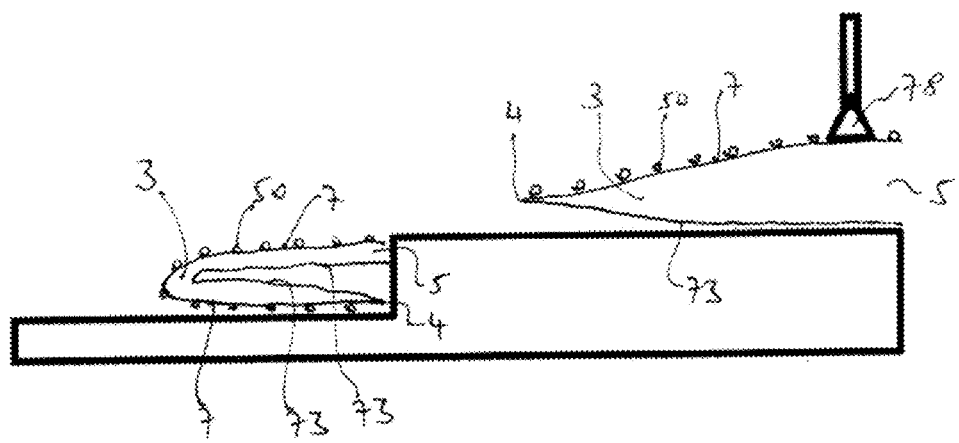
Figure 21A:
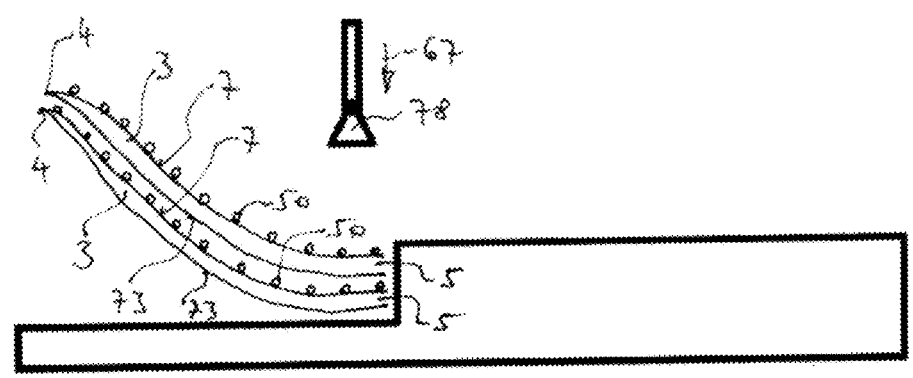
FIGS. 21a-21d include schematic side sections of an automatic bag placing apparatus implementing an automatic bag 3 placing process in which in a stack of empty bags 3 the empty bags 3 are prepared in a way in which their bag bottoms 4 are positioned higher than their bag mouths 5.
Figure 21B:
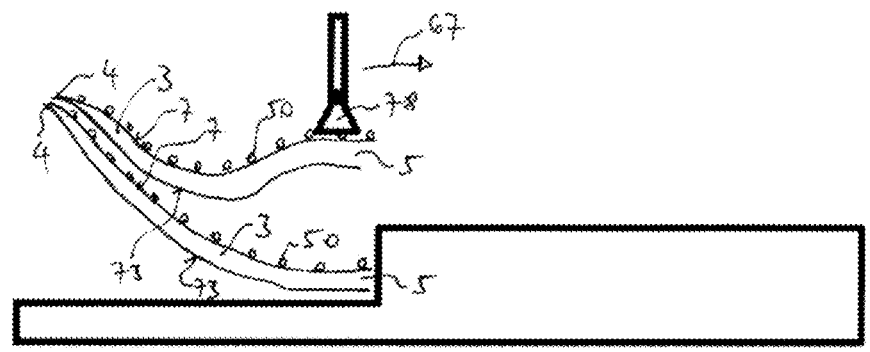
Figure 21C:
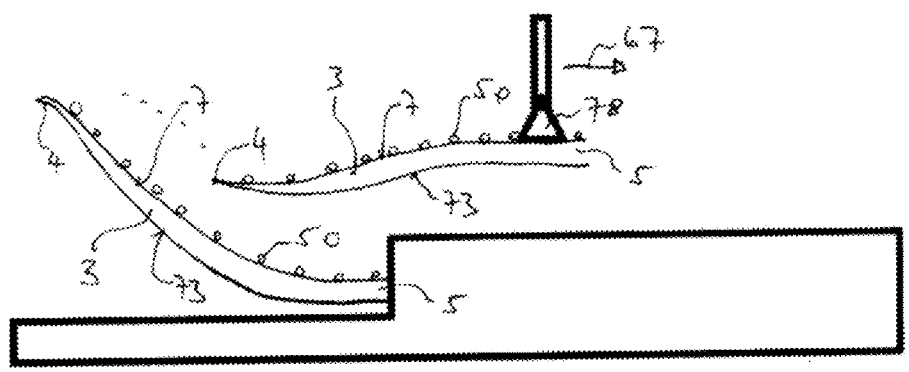
Figure 21D:
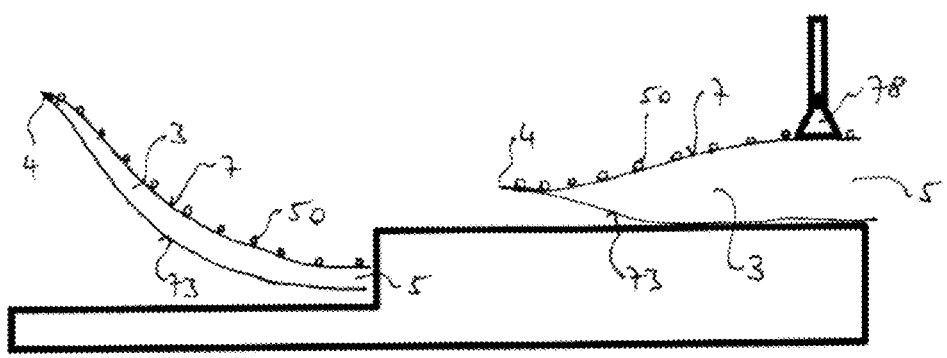
Figure 22A:
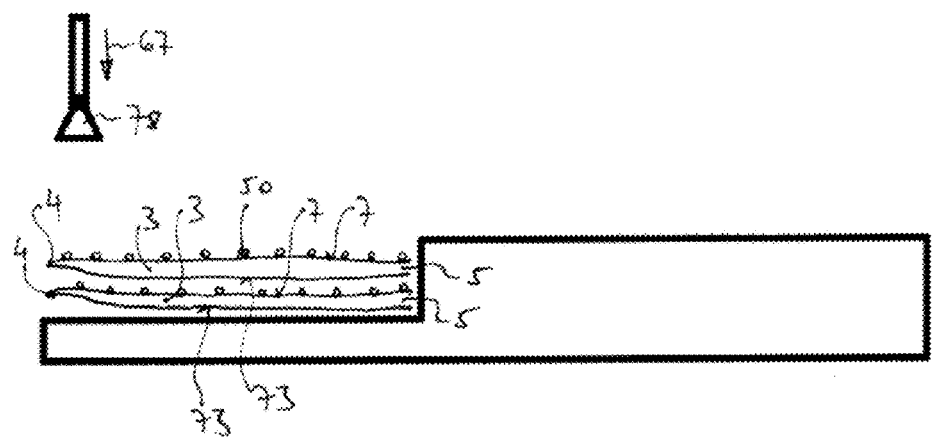
FIGS. 22a-22c include schematic side sections of an automatic bag placing apparatus implementing an automatic bag 3 placing process.
Figure 22B:
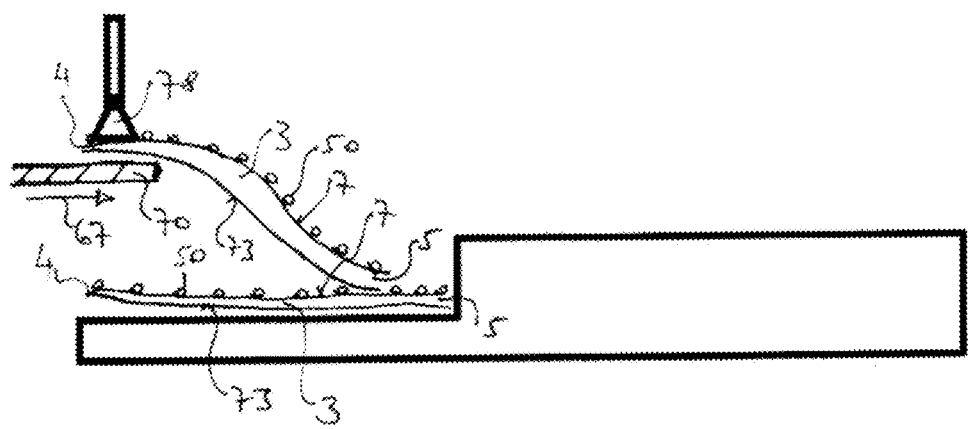
Figure 22C:
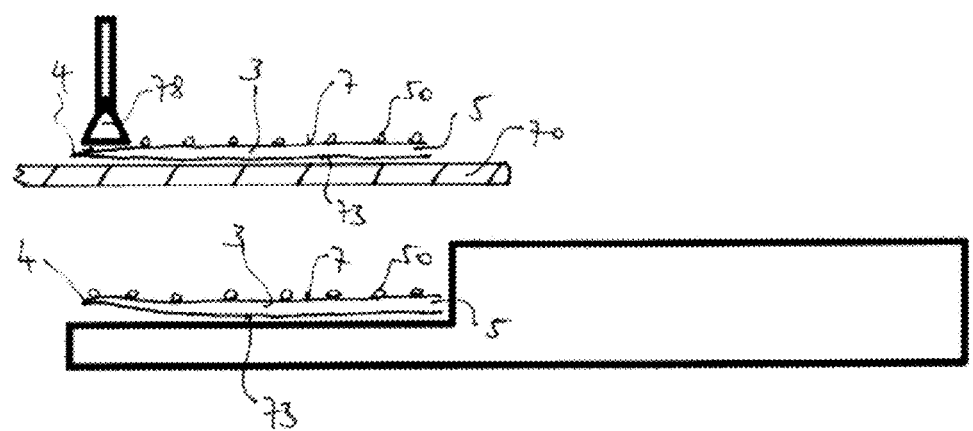

See the drawings, particularly FIGS. 17-18. In FIG. 17. side views of provided discrete particles 39 of different shapes can be seen. First contact angles 28 (between particle 39 and release surface 45) can be provided to be relatively great, i.e., for example at or above 90 degrees, if we keep the powder granules 49 sitting on the hot release surface 45 for a relatively short time and/or provide a second polymer of a relatively low melt mass flow rate, i.e., for example, lower than 4.0. From the illustrated provided discrete particles 39 such roughening projections 50 can be formed, see FIG. 18, whose edge angles 54 are relatively great, i.e., for example at or above 90 degrees.

Example 9: Methods of Use

Figure 23:
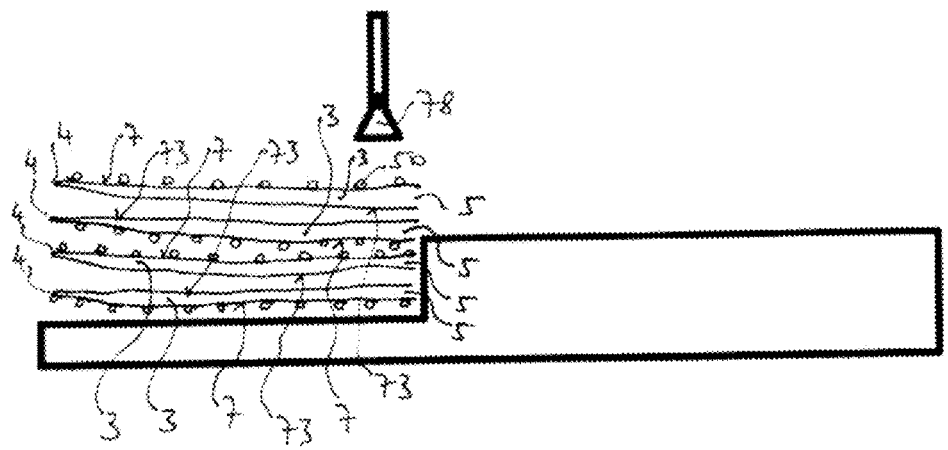
FIG. 23. is a schematic side section of a portion of an automatic bag placing apparatus.
Figure 24:
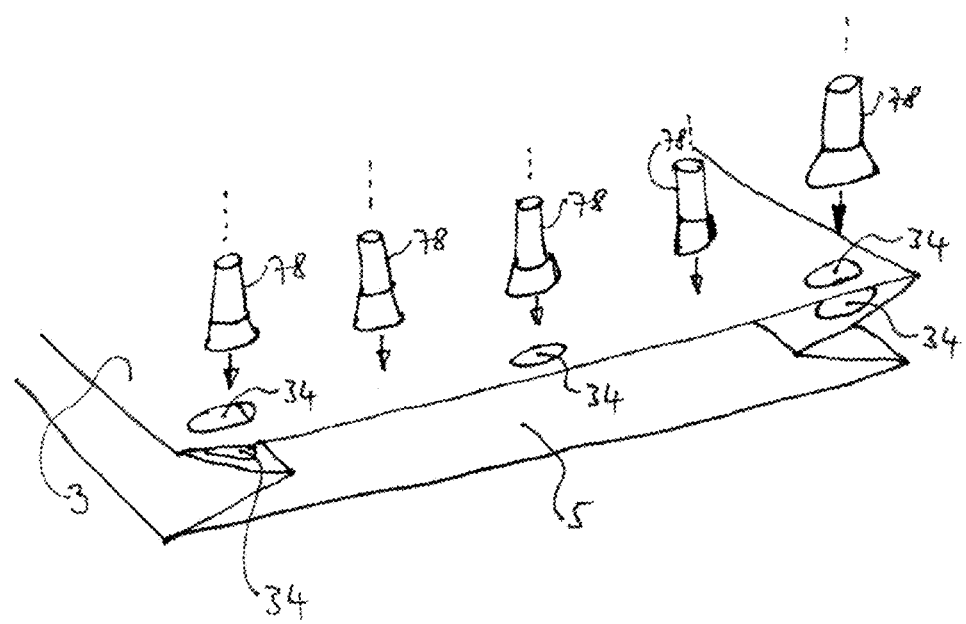
FIG. 24. is a perspective view of a packaging bag of an antislip flexible material.
Figure 25:
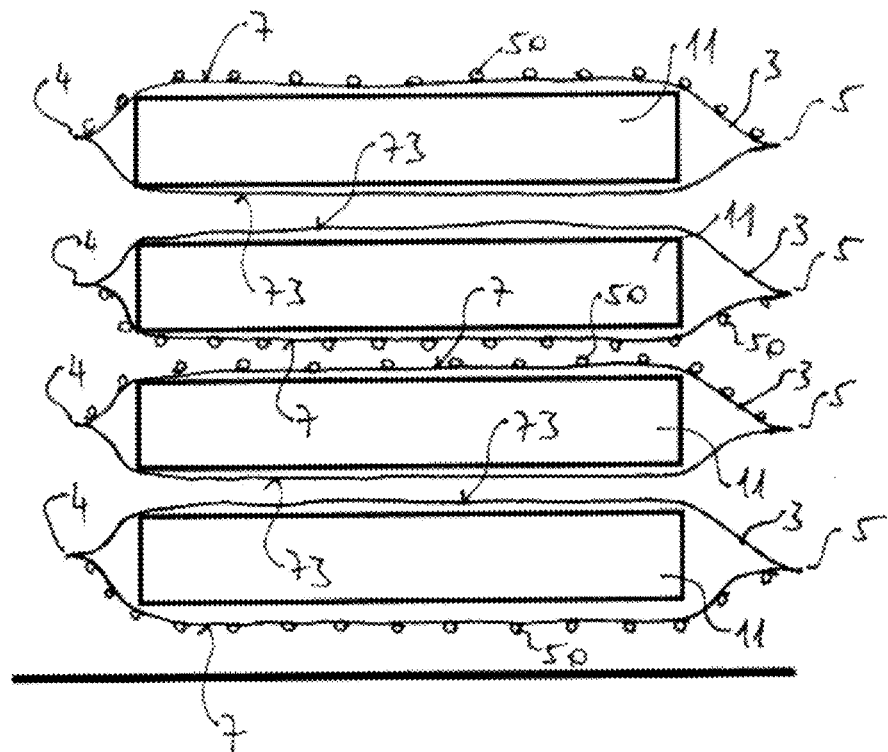
FIG. 25. is a side section of a stack of packages.
Figure 26:
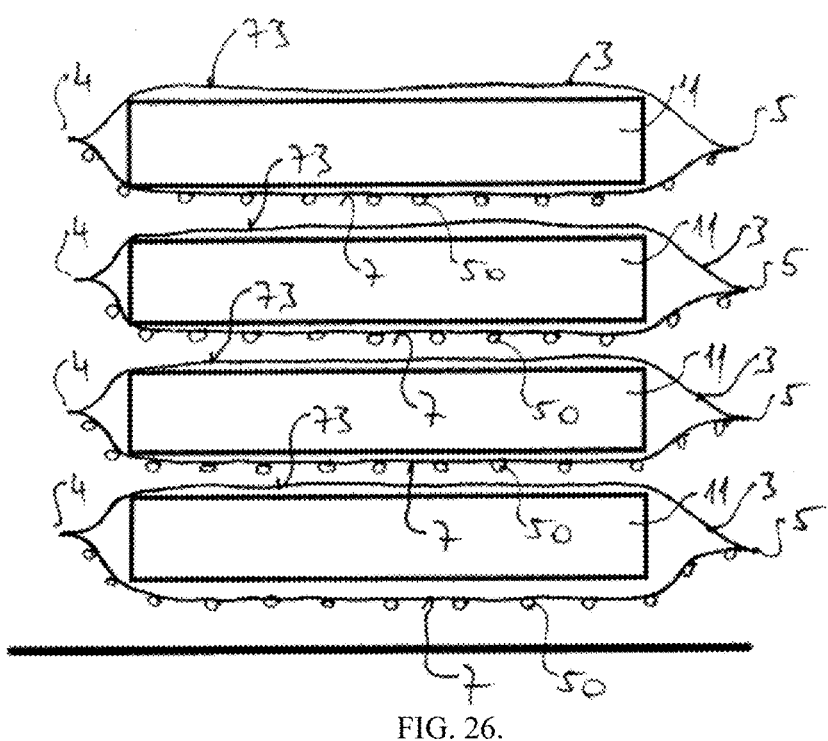
FIG. 26. is a side section of a stack of packages.

See FIGS. 19-26. Antislip packaging bags 3, for example those made in Example 3, can be used, among others, in the following ways. FIGS. 19a, 19b, 19c illustrate an automatic bag 3 placing process according to the background art, in side section. A vacuum head 78 picks up the bag mouth 5 of the top bag 3 in a stack of empty layflat bags 3 and pulls it off the other bags 3. With our current bags 3, made in Example 3, this operation is not always possible because the layflat bags 3 do not slip on each other if the roughened side 7 of a first bag 3 should slide on the skidproofing material 73 fixed to a second bag 3. One possible solution is illustrated in FIGS. 20*a*, 20*b*, 20*c* and 20*d*. The stack of empty antislip bags 3 contains the bags 3 in a form in which each bag 3 is individually folded in a way in which the bag bottom 4 is made parallel and adjacent the bag mouth 5 and the skidproofing material 73 of the bag 3 is invisible from outside. Thus the bags 3, on top of each other, only contact the roughened sides 7 of each other, with none of the skidproofing materials 73 involved in the inter-bag 3 contacts. The vacuum head 78 is able to pick up the mouth 5 of the top bag 3 and unfold the bag 3 (with slipping its skidproofing material 73 on its skidproofing material 73 without difficulty) to complete the bag 3 placing operation. Another possible solution is illustrated in FIGS. 21*a*, 21*b*, 21*c*, 21*d*. The empty bags 3 are prepared in a way in which their bag bottoms 4 are positioned higher than their bag mouths 5. When the vacuum head 78 picks up the mouth 5 of the top bag 3, the top bag 3 almost fully separates from the bag 3 one layer below, due to the elevated positioning of the bag bottoms 4. If the vacuum head 78 pulls, horizontally, the bag 3 fast enough, the dynamics can be enough to keep the bag bottom 4 of the top bag 3 in the air during its horizontal travel. Another possible solution is illustrated in FIGS. 22*a*, 22*b*, 22*c*. The bag bottom 4 of the top bag 3 is picked up by an extra vacuum head 78 and an extra separating sheet 70 is inserted, pulled in from the direction of the bag bottom 4, under the top bag 3. The separating sheet 70 can be a flexible sheet rolled off from a roll. Then the top bag 3 can be used as usual in the background art and the separating sheet 70 can retrace before the next cycle. Another possible solution is illustrated in FIG. 23. The layflat bags 3 are prepared in an arrangement in which they, in the stack, have alternating orientations regarding the direction into which the skidproofing material 73 looks. The 1st, 3rd, 5th, etc bag 3 has the skidproofing material 73 looking upward while the 2nd, 4th, 6th etc bag 3 has the skidproofing material 73 looking downward. Thus the prepared stack of empty bags 3 can be used, with the vacuum head 78, as usual in the background art. Further, FIG. 24 shows a side gusseted bag 3 whose bag mouth 5 is formed in a way that the upper wall of the lying bag 3 has holes 34 in it adjacently the bag mouth 5, so that some of the vacuum heads 78 are able to directly (temporarily) pick up the lower-lying wall through the holes 34. This can help to avoid problems possibly originating from the bag 3 walls being too soft. Further, FIG. 25. shows a schematic side section of a temporary stack of packages of the mentioned bags 3 filled with blocks 11 of plate frozen seafood. Sometimes it is necessary to form a temporary stack of such packages, not needing a stabilisation against slipping but requiring a possibility of an easy dismantling (for example during a manual restacking of a shipment). The flat block 11 shaped packages are prepared in an arrangement in which they, in the stack, have alternating orientations regarding the direction into which the skidproofing material 73 looks. The 1st, 3rd, 5th, etc package has the skidproofing material 73 looking upward while the 2nd, 4th, 6th etc package has the skidproofing material 73 looking downward. Thus the temporarily prepared stack of packages can be manually dismantled as usual in the background art. FIG. 26. shows a schematic side section of a stable stack of packages of the mentioned bags 3 filled with blocks 11 of plate frozen seafood. The packages have uniform orientations.

The invention claimed is:

1. A method for forming an antislip flexible material, comprising:
    providing a flexible carrier having a front surface, the provided carrier at least partly including a thermoplastic first polymer, the carrier having at the providing a temperature sufficiently low to keep the first polymer from melting or softening;
    providing a hot release surface hotter than a softening temperature of a thermoplastic second polymer;
    defining a first temperature;
    providing a first layer of discrete particles including the second polymer, sitting on the hot release surface and projecting from the hot release surface to corresponding terminal ends, in the provided first layer the discrete particles being at least partly of or above a second temperature, the second temperature being above the softening temperature of the second polymer, providing in the first layer a tackiness of at least the particle terminal ends;
    bringing into an, at least partial, contact, and keeping in the contact for a contacting time, the front surface of the provided carrier with the tacky first layer sitting on the hot release surface hotter than the softening temperature of the second polymer, for at least partly sticking the first layer to the front surface, and thereafter
    removing the carrier, and therewith at least partly the tacky first layer stuck to its front surface, from the release surface of the first temperature, thereby providing the carrier with a coating of a hot state, and utilising a heat energy of the hot coating forming a bond between the carrier and the coating, thereby providing an antislip coated flexible material including the carrier and the coating bonded thereto;
    the removing of the carrier including pulling the carrier out of the contact with a pulling-out force, wherein:
    defining the first temperature above the softening temperature of the second polymer; and
    defining the first temperature above any one or both of a melting temperature and a softening temperature of the first polymer;
    selecting a carrier that is spoiled through one or more of breaking, stretching, shrinking, and warping if heated completely to the first temperature and simultaneously exposed to the pulling-out force; and
    selecting the contacting time shorter than a minimum time, which minimum time is determined such that a spoiling of the carrier by exertion of heat by the hot release surface is limited to a predefined allowable extent.

2. The method according to claim 1, wherein the provided flexible carrier being suitable for use as a flexible packaging or wrapping material.

3. The method according to claim 1, further including providing the discrete particles in their entireties of or above the second temperature in the tacky first layer when the front surface of the carrier is brought into the at least partial contact with the tacky first layer.

4. The method according to claim 3, further including keeping, in the tacky first layer, the discrete particles in their entireties of or above the second temperature for the contacting time.

5. The method according to claim 3, further including providing the tackiness of the entireties of the particles in the tacky first layer when the front surface of the carrier is brought into the at least partial contact with the tacky first layer.

6. The method according to claim 5, further including keeping, in the tacky first layer, the discrete particles tacky in their entireties for the contacting time.

7. The method according to claim 1, further including providing the second temperature above any one or both of the melting temperature and the softening temperature of the first polymer.

8. The method according to claim 1, wherein at least portions of the carrier, the portions including the first polymer, are prevented from melting or softening between the bringing into the contact and the forming of the bond.

9. The method according to claim 1, further including:
the provided carrier at least partly including a heat shrinkable second layer including the thermoplastic first polymer,
at the providing of the carrier the carrier having a temperature below a shrinking temperature of the second layer,
providing the first temperature above the shrinking temperature of the second layer,
providing the carrier in original dimensions thereof, and selecting the contacting time sufficiently short for preventing the carrier from contracting more than 25 percent from at least one of its original dimensions.

10. The method according to claim 1, further including providing a carrier that loses its stability if heated completely to the first temperature.

11. The method according to claim 1, wherein the contacting time is selected sufficiently short that the spoiling of the carrier through any one or more of breaking, stretching, shrinking, and warping is limited to at most an unessential extent.

12. The method according to claim 1, wherein the removing includes providing an adhesive force between the front surface and at least a majority of the contacted tacky particles greater than an adhesive force between the release surface and the at least a majority of the contacted tacky particles.

13. The method according to claim 12, wherein the removing further includes providing a cohesive force of the at least a majority of the contacted tacky particles greater than the adhesive force between the release surface and the at least a majority of the contacted tacky particles.

14. The method according to claim 1, further including keeping the discrete particles of the provided first layer sitting on the hot release surface long enough to provide at least some of the discrete particles in an at least semiliquid state and having first contact angles with the release surface.

15. The method according to claim 14, wherein at least some of the first contact angles being smaller than 90 degrees.

16. The method according to claim 1, wherein an outer surface of the discrete particles of the provided first layer is made up of a first portion contacting the release surface and a second portion out of a contact with the release surface, an area of the second portion being greater than an area of the first portion in at least a majority of the provided discrete particles.

17. The method according to claim 1, wherein the provided hot release surface is either essentially flat or it at most has a pattern independent from a distribution of the discrete particles of the provided first layer.

18. The method according to claim 1, wherein the contacting time divided by an average surface mass of the carrier is provided to be at most 0.020 s·m$^2$/g.

19. The method according to claim 1, wherein the discrete particles of the provided first layer sitting on the hot release surface project from the release surface to respective particle heights, in at least some of the discrete particles the particle height equalling at least 0.1 times a smallest top-plan-view extent of the particle.

20. The method according to claim 1, further including providing, in the antislip coated flexible material, an average surface mass of the coating lower than 1.5 times an average surface mass of the carrier.

21. The method according to claim 1, further including providing the heat energy of the hot coating suitably low for maintaining, without a need for a chill-roll cooling, a breaking strength of the carrier sufficient for a rewinding of the carrier.

22. The method according to claim 1, wherein at least some of the discrete particles in the provided first layer are essentially molecularly unoriented.

23. The method according to claim 1, further including providing the first layer of the discrete particles sitting on the release surface with a random distribution.

24. The method according to claim 1, further including providing the carrier including a fabric, and preventing the coating from essentially penetrating the fabric.

25. The method according to claim 1, wherein the coating of the antislip coated flexible material is formed to be discontinuous, and the coating is formed to include a multiplicity of discrete roughening projections projecting from the front surface of the carrier, each roughening projection provided with a foot, the foot being an end of the roughening projection bonded to the carrier.

26. The method according to claim 25, further including providing at least some of the roughening projections with a second contact angle of between 90 and 178 degrees of between 92 and 178 degrees with the front surface in at least one side view of the roughening projection.

27. The method according to claim 25, further including providing at least some of the roughening projections with a substantially flat top forming an edge at least partially surrounding the substantially flat top.

28. The method according to claim 27, further including providing at least a majority of the roughening projections with the substantially flat top.

29. The method according to claim 27, further including the edge completely surrounding the substantially flat top, and the edge essentially forming a circle.

30. The method according to claim 27, further including providing the roughening projection with an edge angle being an angle, measured through the roughening projection, closed between the substantially flat top and a mantle surface extending from the edge to the foot, the edge angle being smaller than 90 degrees in at least one side view of the roughening projection.

31. The method according to claim 27, further including forming at least one side view of the roughening projection strictly tapering from the edge to the foot.

32. The method according to claim 27, further including tops of at least a majority of the roughening projections essentially being in alignment along a plane parallel with a general plane of the front surface.

33. The method according to claim 25, wherein during the contacting time a portion of the front surface, between neighbouring tacky particles, is kept out of a contact with the release surface.

34. The method according to claim 25, further including providing two nip rolls and pressing the carrier toward the hot release surface within a nip between the two nip rolls to provide the contact between the front surface of the carrier and the tacky terminal ends of the particles, exerting on the carrier a nip pressure between 0.001 and 80 N/lineal cm.

35. The method according to claim 25, further including providing both the first temperature and the second temperature above a fusing temperature at which the first polymer and the second polymer are capable of fusing together.

36. The method according to claim 25, further including providing the first temperature at least 30° C. degrees higher than both the softening temperature of the second polymer and at least one of the melting temperature and the softening temperature of the first polymer.

37. The method according to claim 25, further including providing the second polymer of a melt mass flow rate of 0.1 to 300 g/10 min determined at 190° C. under a load of 2.16 kg in accordance with ISO 1133-1.

38. The method according to claim 25, further including providing the carrier including a fabric woven from overlapping warp and weft thermoplastic tapes or yarns, and selecting the utilised heat energy, of the hot coating including the roughening projections, suitably for forming the bond between the carrier and the roughening projections without fusing together the overlapping warp and weft tapes or yarns under at least some of the roughening projections.

39. The method according to claim 25, further including providing the antislip coated flexible material capable of a slip-decreasing mechanical interlock in a shearing direction with a skidproofing material, of a polypropylene spunbonded nonwoven fabric of an average surface mass of 17 g/m² and filament thickness of between 25 and 30 micrometres, due to the roughening projections having suitable closeness and geometric features with respect to the skidproofing material for forming mechanical bonds with the filaments of the skidproofing material in the shearing direction.

40. The method according to claim 25, wherein the forming of the bond between the carrier and the coating including the roughening projections includes fusing the roughening projections with the carrier utilising the heat energy of the hot roughening projections.

41. The method according to claim 1, further including forming a packaging bag or packaging wrap that includes the provided antislip coated flexible material, with at least a part of the coating looking toward an outside of the bag or wrap.

42. A method for forming an antislip flexible material, comprising:
providing a flexible carrier having a front surface, the provided carrier at least partly including a thermoplastic first polymer, the carrier having at the providing a temperature sufficiently low to keep the first polymer from melting or softening;
providing a hot release surface of a first temperature;
providing a first layer of discrete particles including a thermoplastic second polymer, sitting on the hot release surface and projecting from the hot release surface to corresponding terminal ends, in the provided first layer the discrete particles being at least partly of or above a second temperature, the second temperature being above a softening temperature of the second polymer, providing in the first layer a tackiness of at least the particle terminal ends;
bringing into an, at least partial, contact, and keeping in the contact for a contacting time, the front surface of the provided carrier with the tacky first layer sitting on the hot release surface for at least partly sticking the first layer to the front surface, and thereafter
removing the carrier, and therewith at least partly the tacky first layer stuck to its front surface, from the release surface thereby providing the carrier with a coating of a hot state, and utilising a heat energy of the hot coating forming a bond between the carrier and the coating, thereby providing an antislip coated flexible material including the carrier and the coating bonded thereto;
the removing of the carrier including pulling the carrier out of the contact with a pulling-out force, wherein:
providing the first temperature above the softening temperature of the second polymer; and
providing the first temperature above any one or both of a melting temperature and a softening temperature of the first polymer;
selecting a carrier that is spoiled through one or more of breaking, stretching, shrinking, and warping if heated completely to the first temperature and simultaneously exposed to the pulling-out force;
selecting the contacting time shorter than a minimum time, which minimum time is determined such that a spoiling of the carrier by exertion of heat by the hot release surface is limited to a predefined allowable extent; and
providing respective inter-particle distances between neighbouring discrete particles of the provided first layer, and providing the hot release surface in a form of a revolving endless belt having a running direction, and keeping the endless belt alternatingly shifted, perpendicularly to the running direction, between two lateral end positions, providing a lateral displacement of the belt between the two end positions, the lateral displacement being equal to or greater than an average of the inter-particle distances.

\* \* \* \* \*